(12) United States Patent
Peleg et al.

(10) Patent No.: US 12,277,384 B2
(45) Date of Patent: *Apr. 15, 2025

(54) SYSTEMS AND METHODS FOR GUIDED NATURAL LANGUAGE TEXT GENERATION

(71) Applicant: AI21 LABS, Tel Aviv (IL)

(72) Inventors: Barak Peleg, Givatayim (IL); Dan Padnos, Tel Aviv (IL); Amnon Morag, Tel Aviv (IL); Gilad Lumbroso, Kfar Saba (IL); Yoav Shoham, Tel Aviv (IL); Ori Goshen, Tel Aviv-Jaffa (IL); Barak Lenz, Tel Aviv (IL); Or Dagan, Tel Aviv (IL)

(73) Assignee: AI21 LABS, Tel Aviv (IL)

( * ) Notice: Subject to any disclaimer, the term of this patent is extended or adjusted under 35 U.S.C. 154(b) by 0 days.
This patent is subject to a terminal disclaimer.

(21) Appl. No.: 18/680,337

(22) Filed: May 31, 2024

(65) Prior Publication Data
US 2024/0320422 A1    Sep. 26, 2024

Related U.S. Application Data

(63) Continuation of application No. 18/202,615, filed on May 26, 2023, now Pat. No. 12,061,867, which is a continuation of application No. 17/703,596, filed on Mar. 24, 2022, now Pat. No. 11,699,033, which is a continuation of application No. 17/592,839, filed on Feb. 4, 2022, now Pat. No. 11,574,120, which is a continuation of application No. PCT/US2020/041846, filed on Jul. 13, 2020.
(Continued)

(51) Int. Cl.
*G06F 40/186* (2020.01)
*G06F 3/0482* (2013.01)
(Continued)

(52) U.S. Cl.
CPC .......... *G06F 40/186* (2020.01); *G06F 3/0482* (2013.01); *G06F 40/117* (2020.01);
(Continued)

(58) Field of Classification Search
CPC .... G06F 40/186; G06F 3/0482; G06F 40/117; G06F 40/166; G06F 40/247;
(Continued)

(56) References Cited

U.S. PATENT DOCUMENTS 5,847,708 A   12/1998   Wolff
7,231,343 B1   6/2007   Treadgold et al.
(Continued)

OTHER PUBLICATIONS

International Search Report issued in International Application No. PCT/US2020/041846, dated Nov. 18, 2020 (14 pages).
(Continued)

*Primary Examiner* — Hassan Mrabi
(74) *Attorney, Agent, or Firm* — Finnegan, Henderson, Farabow, Garrett & Dunner, LLP

(57) ABSTRACT

The presently disclosed embodiments may include a computer readable medium including instructions that when executed by one or more processing devices cause the one or more processing devices to perform a method. The method may include initiating a writing assistant application in response to input received from a user; receiving a first user input, wherein the first user input includes a collection of two or more words that convey at least one idea; automatically constructing, using one or more trained models providing a natural language generation function, a first complete sentence option that expresses the at least one idea; causing the first complete sentence option to be shown to the user via the display; receiving a second user input, and, in response to the received second input; and causing a second complete sentence option, different from the first complete sentence option, to be shown on the display.

16 Claims, 68 Drawing Sheets

Related U.S. Application Data

(60) Provisional application No. 62/943,493, filed on Dec. 4, 2019, provisional application No. 62/882,734, filed on Aug. 5, 2019, provisional application No. 62/882,732, filed on Aug. 5, 2019.

(51) Int. Cl.
*G06F 40/117* (2020.01)
*G06F 40/166* (2020.01)
*G06F 40/247* (2020.01)
*G06F 40/253* (2020.01)
*G06F 40/30* (2020.01)

(52) U.S. Cl.
CPC .......... *G06F 40/166* (2020.01); *G06F 40/247* (2020.01); *G06F 40/253* (2020.01); *G06F 40/30* (2020.01)

(58) Field of Classification Search
CPC ...... G06F 40/253; G06F 40/30; G06F 40/274; G06F 40/56; G06F 40/58; G06N 3/045; G06N 3/047; G06N 3/088
See application file for complete search history.

(56) References Cited

U.S. PATENT DOCUMENTS

| | | | |
|---|---|---|---|
| 8,380,875 B1* | 2/2013 | Gilmour | G06Q 99/00 370/352 |
| 8,601,019 B1 | 12/2013 | Weininger et al. | |
| 8,898,595 B2 | 11/2014 | Cragun et al. | |
| 10,055,103 B1 | 8/2018 | Ozuysal | |
| 10,241,648 B2 | 3/2019 | Houseworth | |
| 10,303,762 B2* | 5/2019 | Markman | G06F 40/30 |
| 10,311,144 B2 | 6/2019 | Bellegarda et al. | |
| 10,351,263 B2* | 7/2019 | Remond | G02B 23/24 |
| 10,489,462 B1* | 11/2019 | Rogynskyy | G06F 16/288 |
| 10,521,189 B1 | 12/2019 | Ryabov et al. | |
| 10,579,725 B2* | 3/2020 | de Mello Brandao | G06F 40/253 |
| 10,594,757 B1* | 3/2020 | Shevchenko | G06F 17/18 |
| 10,599,756 B1 | 3/2020 | Mirho | |
| 10,678,402 B1 | 6/2020 | Parande | |
| 10,699,064 B2 | 6/2020 | Kawahara et al. | |
| 10,775,967 B2 | 9/2020 | Houseworth | |
| 11,182,540 B2 | 11/2021 | Satterfield et al. | |
| 11,189,283 B2 | 11/2021 | Tran et al. | |
| 11,263,399 B2* | 3/2022 | Ivan | G06F 40/211 |
| 2002/0158850 A1 | 10/2002 | Sun | |
| 2004/0093567 A1 | 5/2004 | Schabes et al. | |
| 2004/0186705 A1 | 9/2004 | Morgan et al. | |
| 2006/0190804 A1 | 8/2006 | Yang | |
| 2006/0206806 A1 | 9/2006 | Han et al. | |
| 2008/0077859 A1* | 3/2008 | Schabes | G06F 40/232 715/257 |
| 2008/0208567 A1 | 8/2008 | Brockett et al. | |
| 2009/0037421 A1* | 2/2009 | Gamble | G06F 16/951 |
| 2009/0049422 A1* | 2/2009 | Hage | G06F 8/10 717/104 |
| 2009/0076792 A1 | 3/2009 | Lawson-Tancred | |
| 2009/0300526 A1 | 12/2009 | Port | |
| 2010/0190143 A1 | 7/2010 | Gal et al. | |
| 2011/0061017 A1 | 3/2011 | Ullrich et al. | |
| 2011/0065082 A1 | 3/2011 | Gal et al. | |
| 2011/0086331 A1 | 4/2011 | Karov Zangvil | |
| 2011/0161068 A1 | 6/2011 | Lesher et al. | |
| 2012/0239381 A1 | 9/2012 | Heidasch | |
| 2012/0265597 A1* | 10/2012 | Saha | G06Q 30/02 705/14.66 |
| 2012/0284199 A1* | 11/2012 | Lundberg | G06F 16/345 705/310 |
| 2013/0317994 A1* | 11/2013 | Tran | G06Q 50/184 705/310 |
| 2014/0088954 A1 | 3/2014 | Shirzadi et al. | |
| 2014/0164893 A1 | 6/2014 | Pariente et al. | |
| 2014/0244622 A1 | 8/2014 | Lindsay et al. | |
| 2014/0257902 A1* | 9/2014 | Moore | G06F 40/279 705/7.18 |
| 2014/0288990 A1* | 9/2014 | Moore | G06Q 10/1093 705/7.19 |
| 2014/0379744 A1 | 12/2014 | Kuo et al. | |
| 2015/0019463 A1 | 1/2015 | Simard et al. | |
| 2015/0121285 A1 | 4/2015 | Eleftheriou et al. | |
| 2015/0153949 A1 | 6/2015 | Yeung et al. | |
| 2015/0169530 A1 | 6/2015 | Otero et al. | |
| 2015/0278196 A1 | 10/2015 | Dua et al. | |
| 2015/0324339 A1 | 11/2015 | Gubin et al. | |
| 2015/0347379 A1 | 12/2015 | Chaudhri et al. | |
| 2016/0041957 A1 | 2/2016 | Finsterwald et al. | |
| 2016/0063006 A1* | 3/2016 | Belogolov | G06F 16/3322 707/767 |
| 2016/0092405 A1 | 3/2016 | Lee et al. | |
| 2016/0224524 A1 | 8/2016 | Kay et al. | |
| 2016/0275070 A1 | 9/2016 | Corston et al. | |
| 2016/0283458 A1* | 9/2016 | Okajima | G06F 40/18 |
| 2016/0360336 A1* | 12/2016 | Gross | H04W 4/025 |
| 2017/0045953 A1 | 2/2017 | Rogers | |
| 2017/0060819 A1 | 3/2017 | Rucine et al. | |
| 2017/0131867 A1 | 5/2017 | Anbil Parthipan et al. | |
| 2017/0177180 A1 | 6/2017 | Bachmann et al. | |
| 2017/0220360 A1 | 8/2017 | Chiba et al. | |
| 2017/0220536 A1* | 8/2017 | Chiba | G06F 9/453 |
| 2017/0249017 A1 | 8/2017 | Ryu et al. | |
| 2017/0249059 A1 | 8/2017 | Houseworth | |
| 2017/0286390 A1* | 10/2017 | Yashpe | G06F 40/253 |
| 2017/0293678 A1 | 10/2017 | McCray et al. | |
| 2018/0101762 A1 | 4/2018 | Gutierrez | |
| 2018/0113873 A1 | 4/2018 | Gulwani et al. | |
| 2018/0137400 A1 | 5/2018 | Deselaers et al. | |
| 2018/0189356 A1* | 7/2018 | Ghafourifar | G06F 16/24575 |
| 2018/0225274 A1* | 8/2018 | Tommy | G06F 16/30 |
| 2018/0232110 A1 | 8/2018 | Cheung et al. | |
| 2018/0278462 A1 | 9/2018 | Bjontegard | |
| 2018/0336184 A1 | 11/2018 | Bellegarda et al. | |
| 2018/0367483 A1 | 12/2018 | Rodriguez et al. | |
| 2018/0367484 A1 | 12/2018 | Rodriguez et al. | |
| 2019/0005028 A1 | 1/2019 | Mago | |
| 2019/0034389 A1 | 1/2019 | Martinez et al. | |
| 2019/0114312 A1* | 4/2019 | Deutsch | G06F 40/30 |
| 2019/0130006 A1* | 5/2019 | Raviv | G06F 3/0486 |
| 2019/0138637 A1* | 5/2019 | Hogan | G06F 40/216 |
| 2019/0220156 A1 | 7/2019 | Houseworth | |
| 2019/0236130 A1 | 8/2019 | Li et al. | |
| 2019/0332659 A1 | 10/2019 | Yang et al. | |
| 2019/0361873 A1* | 11/2019 | Rogynskyy | H04L 41/14 |
| 2019/0364154 A1* | 11/2019 | Hermanek | H04L 51/234 |
| 2020/0174630 A1 | 6/2020 | Rosenberg | |
| 2020/0184018 A1 | 6/2020 | Lal et al. | |
| 2020/0242146 A1 | 7/2020 | Kalukin | |
| 2020/0257377 A1* | 8/2020 | Lee | G06F 40/274 |
| 2020/0311341 A1* | 10/2020 | Chaturvedi | G06N 3/04 |
| 2020/0311798 A1 | 10/2020 | Forsyth et al. | |
| 2020/0334586 A1* | 10/2020 | Petroulas | G06Q 10/02 |
| 2020/0342164 A1 | 10/2020 | Satterfield et al. | |
| 2020/0356254 A1 | 11/2020 | Missig et al. | |
| 2020/0380208 A1 | 12/2020 | Garcia, III et al. | |
| 2021/0082419 A1 | 3/2021 | Tran et al. | |
| 2021/0158815 A1* | 5/2021 | Lee | G06V 10/764 |
| 2021/0342517 A1 | 11/2021 | Ittycheriah et al. | |
| 2021/0365180 A1 | 11/2021 | Kaemmerer | |

OTHER PUBLICATIONS

Examination Report issued in Australian Application No. 2020326435, dated Aug. 16, 2023 (6 pages).

Office Action issued for Indian Patent Application No. 202217009615, dated Feb. 17, 2025 (8 pages).

* cited by examiner

Email Editor 805

Workspace 810 to: Jason Willer

Hi Jason,
It was a great pleasure meeting you at GTC last week. Thanks for taking the time.

It seems like BuyCo has a big appetite for innovation and I believe that together we can acheive great things.

The meeting with Michael and Jessica went very well and it seems like they also see how BuyCo can use SellCo as its innovation engine. Unfortunately, the meeting took place in a crowded places and they didn't get the chance to see a live demo of the platform. We agreed it will be done in a future meeting.

Hanna (CCed), our VP of sales, is passing through NYC on Jan 19-20, on her way to our San-Fransisco office. If you believe it can be helpful, she'd be very happy to pay you a visit and to introduce SellCo to more relevant stakeholders (Hopefully including Adam).

Alex (copied) will be the one to continue the communication with you from now on. Having said that, feel free to reach out with any questions you might have.

Thanks again,
Boris

[Send]

Body Text 815

Second Drafted Text Element 825

Third Drafted Text Element 830

① 3 Recommendations

*Fig. 8d*

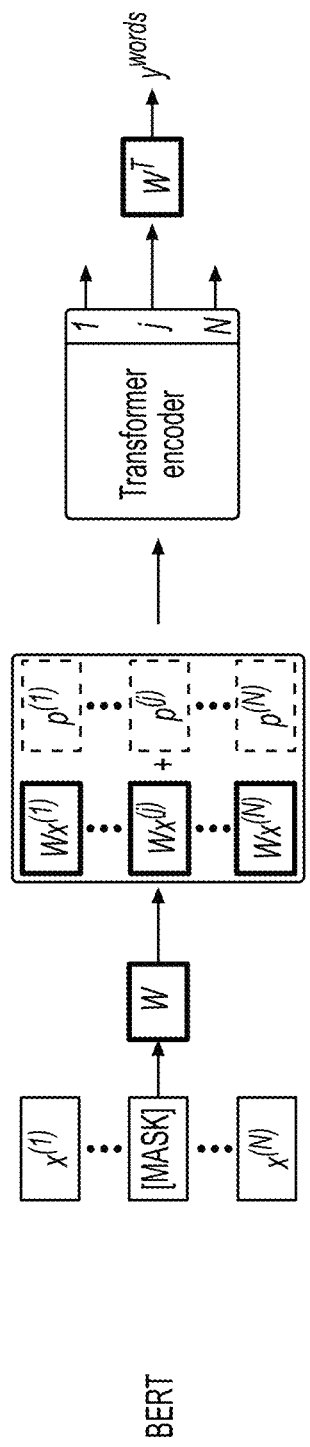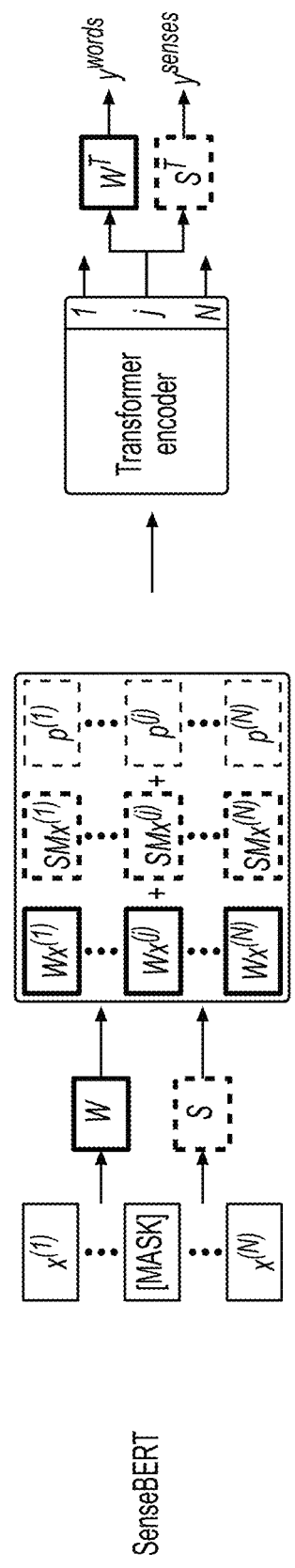
Fig. 10a
Fig. 10b

All Supersenses

■ Verb Supersenses   □ Noun Supersenses   ▨ Other (adv./adj.)

Noun Supersenses

▨ Abstract   ▧ Concrete   ▦ Concrete - Entities

SYSTEMS AND METHODS FOR GUIDED NATURAL LANGUAGE TEXT GENERATION

RELATED APPLICATIONS

This application is a continuation of U.S. patent application Ser. No. 18/202,615, filed May 26, 2023, which is a continuation of U.S. patent application Ser. No. 17/703,596, filed Mar. 24, 2023, now issued as U.S. Pat. No. 11,699,033, which is a continuation of U.S. patent application Ser. No. 17/592,839, filed Feb. 4, 2022, now issued as U.S. Pat. No. 11,574,120, which is a continuation of PCT International Application No. PCT/US2020/041846, filed Jul. 13, 2020, which claims priority from U.S. Provisional Patent Application No. 62/882,732, filed on Aug. 5, 2019; U.S. Provisional Patent Application No. 62/882,734, filed on Aug. 5, 2019; and U.S. Provisional Patent Application No. 62/943,493, filed on Dec. 4, 2019. The entire disclosure of each are hereby incorporated by reference in the present application.

BACKGROUND

The disclosed technology relates generally to controllable natural language generation from an automated computer-based system. Prior systems can generate text, for example, based on words a user has previously typed. These prior systems, however, often rely on probabilities associated with the user's typing habits, or they may rely on statistical models that analyze the probabilities of different words appearing next to or near one another. For example, in some cases, natural language can either be statistically generated to complete users' sentences by predicting highly probable repetitive and mundane short texts. In other cases, prior systems may generate text to resemble human-written texts, but with no effective control over the meaning of the text. That is, the text may appear structurally well-written, but to a reader would be understood as non-sensical, in whole or in part. More importantly, prior systems do not allow a user to control the meaning conveyed by the generated text in such situations and, as a result, while a prior system may generate text that appears structurally well-written, that text is unlikely to convey the meaning intended by the user. This problem is heightened by the fact that a given word form can possess multiple meanings. For example, the word "bass" can refer to a fish, a guitar, a type of singer, etc. Thus, the word itself is merely a surrogate of its actual meaning in a given context, which may be referred to as the word's sense. In many cases, a context of surrounding text may be needed to inform a word's sense. Prior systems tend to generate text based on surface level statistics without accounting for context (e.g., user input indicating the desired meaning of the text; abstract semantic properties of the context, including representations of the abstract meaning conveyed by the surface-level words comprising the context, such as senses; and context found subsequent to the location of text generation), such as the context offered by user input or other available text in a document. As a result, while prior systems may generate text, without accounting for context or word sense, such systems may be useful only in generating simple, statistically formed word groups. There is no capability for generating more complex language based on the context dictated by surrounding text (e.g., text appearing before and/or after a text insertion point). And such systems fail to provide the user with control relative to the text generated and, therefore, the user is unable to predictably control the meaning of the generated text or to refine the meaning of generated text with further input to the system.

In still other cases, prior systems may generate language of apparent complexity, but such systems may be specially tailored to generate language that conveys information from predefined datasets, for predefined use cases, and/or in predefined ways. Certain systems may also automatically account for dictionary spellings of words and certain grammar rules, but, in general, these systems are limited to operating relative to short text segments and without the benefit of contextual analysis of surrounding text or of input provided by a user.

There is a significant need for automated natural language generation systems capable of robust generation of text beyond the limitations of prior systems. The disclosed embodiments provide methods and systems for general-purpose controllable natural language generation. The disclosed embodiments allow for the automatic generation of unique natural language that can express specific meaning, determined based on interaction with users, based on analysis of existing text, etc. The disclosed embodiments can generate unique language, such as sentences that may have never been written before, the meaning of which can be effectively controlled by users or by other parameters, for any desired meaning and context of the use of human language, with no need for tailored pre-configuration.

The disclosed embodiments also include semantically infused language models. Such models may include a neural network-based language model explicitly trained to contain contextual relations between abstract semantic features in text, in contrast with prior art, where models can only be trained to learn contextual relations between surface-level words. For example, the disclosed systems may enable a model to learn contextual relations between words and word senses and between words and the properties of the abstract concepts invoked by the text. To achieve this, the disclosed models may be trained to predict the semantic features of masked tokens in text conditioned by their surrounding context.

As described in the sections below, the disclosed language generation systems may provide a user with a significant level of control in generating language of an intended meaning that agrees with the context of user input text and other available text. For example, in some cases, the disclosed systems may generate text output options as semantic paraphrase substitutions for input provided by the user. In other words, the text output options may be generated to convey the meaning, information, concepts, etc. of textual input provided to the system by the user. Further, the disclosed systems, unlike prior systems, may offer a type of closed loop feedback where if text output options generated by the system do not quite match what the user intended, or if the user would like to supplement the generated text output options, the user can modify the input to the system (e.g., adding words, removing certain words, changing the order of words, etc.), and the system will automatically generate one or more refined text output options based on the modified input (and, in some cases, the context of text surrounding a document location where the generated text is to be inserted).

SUMMARY

Some of the presently disclosed embodiments may include a computer readable medium including instructions that when executed by one or more processing devices cause the one or more processing devices to perform a method. The method may include: analyzing an electronic document text; identifying in the electronic document text a first drafted text element to be modified; causing the first drafted text element to be highlighted to a user on a display; generating at least one text output option that conveys a meaning associated with the first drafted text element but includes one or more changes relative to the first drafted text element; and causing the at least one text output option to be shown to the user via the display.

Consistent with the present embodiments, a system and method for receiving user input of at least one word. The method may automatically construct at least one textual output option that differs from the user input in at least one respect, expresses a meaning associated with the user input, and agrees with a context associated with at least one text element that is different from the user input. The method may also show at least one textual output option on a display.

Consistent with the present embodiments, a system and method for automatically analyzing at least one text element and identifying one or more contextual elements associated with at least one text element. The method may automatically construe at least one textual output option that differs from at least one text element in at least one respect, expresses a meaning associated with at least one text element, and agrees with at least one of the contextual elements identified relative to the at least one text element. The method may also show at least one contextual output option on a display.

Consistent with the present embodiments, a system and method for receiving a request from the user to initiate a writing assistant application. The method may, in response to the request, cause a writing assistant workspace to be shown on a display. The method may receive user input, facilitated by the writing assistant workspace. The user input may include at least one word that conveys at least one idea. The method may also automatically construct at least one textual output option that expresses at least one idea. The method may also be configured to show at least one textual output option in the writing assistant workspace on a display. The method may receive additional user input, facilitated by the writing assistant workspace. The additional user input may include one or more additional words. The method may also update at least one textual output option based on the additional user input.

Consistent with the present embodiments, a system and method for receiving, from a user, an indication of a drafted text element in an electronic document to be moved from a first location in the electronic document to a second location in the electronic document. The method may also move the drafted text element from the first location to the second location in the electronic document. The method may generate at least one text output option for insertion between the drafted text element at the second location and an adjacent text element. The method may also show at least one text output option on a display.

Consistent with the present embodiments, a system and method for receiving, from the user, an indication of a text insertion location in an electronic document. The method may generate at least one text output option for insertion at the text insertion location in the electronic document. The text output option may link at least one aspect of a first text element that precedes the text insertion location with a second text element that follows the text insertion location. The method may also show at least one text output option on a display.

Consistent with the present embodiments, a system and method for identifying in an electronic workspace a first text passage which may include a first plurality of words. The method may identify in the electronic workspace a second text passage which may include a second plurality of words. The method may also analyze the first and second text passages to determine first information conveyed by the first text passage and second information conveyed by the second text passage. The method may automatically generate a third text passage that conveys the first information associated with the first text passage and the second information associated with the second passage. The third text passage may be generated to include a first set of textual revisions relative to the first text passage and a second set of textual revisions relative to the second text passage. The method may also show the third text passage on a display.

Consistent with the present embodiments, a system and method for analyzing an electronic document text. The method may identify in the electronic document text a first drafted text element to be modified. The method may also cause the first drafted element to be highlighted to a user on a display. The method may generate at least one text output option that conveys a meaning associated with the first drafted text element but may include one or more changes relative to the first drafted text element. The method may also show at least one text output option on a display.

Consistent with the present embodiments, a system and method for receiving from a user an indication of a drafted text element in an electronic document to be analyzed. The method may generate at least one text output option that may convey a meaning associated with the drafted text element but may include one or more changes relative to the drafted text element. The method may also show at least one text output option on a display.

Some embodiments may include a user input device. The user input device may include a writing assistant activation button configured to activate an automated writing assistant function, wherein the automated writing assistant function is configured to: receive user input including a collection of two or more words that convey at least one idea, wherein the user input is received via a GUI element shown on a display in response to a user pressing the button; automatically construct at least two complete sentence options that each express the at least one idea; and cause the at least two complete sentence options to be shown to the user via the display.

BRIEF DESCRIPTION OF DRAWING(S)

FIGS. 3a-3i provide diagrammatic representations of a writing assistant interface, according to exemplary disclosed embodiments.

FIGS. 4a-4g provide diagrammatic representations of a writing assistant interface, according to exemplary disclosed embodiments.

FIGS. 5a-5f provide diagrammatic representations of a writing assistant interface, according to exemplary disclosed embodiments.

Figure 6A:
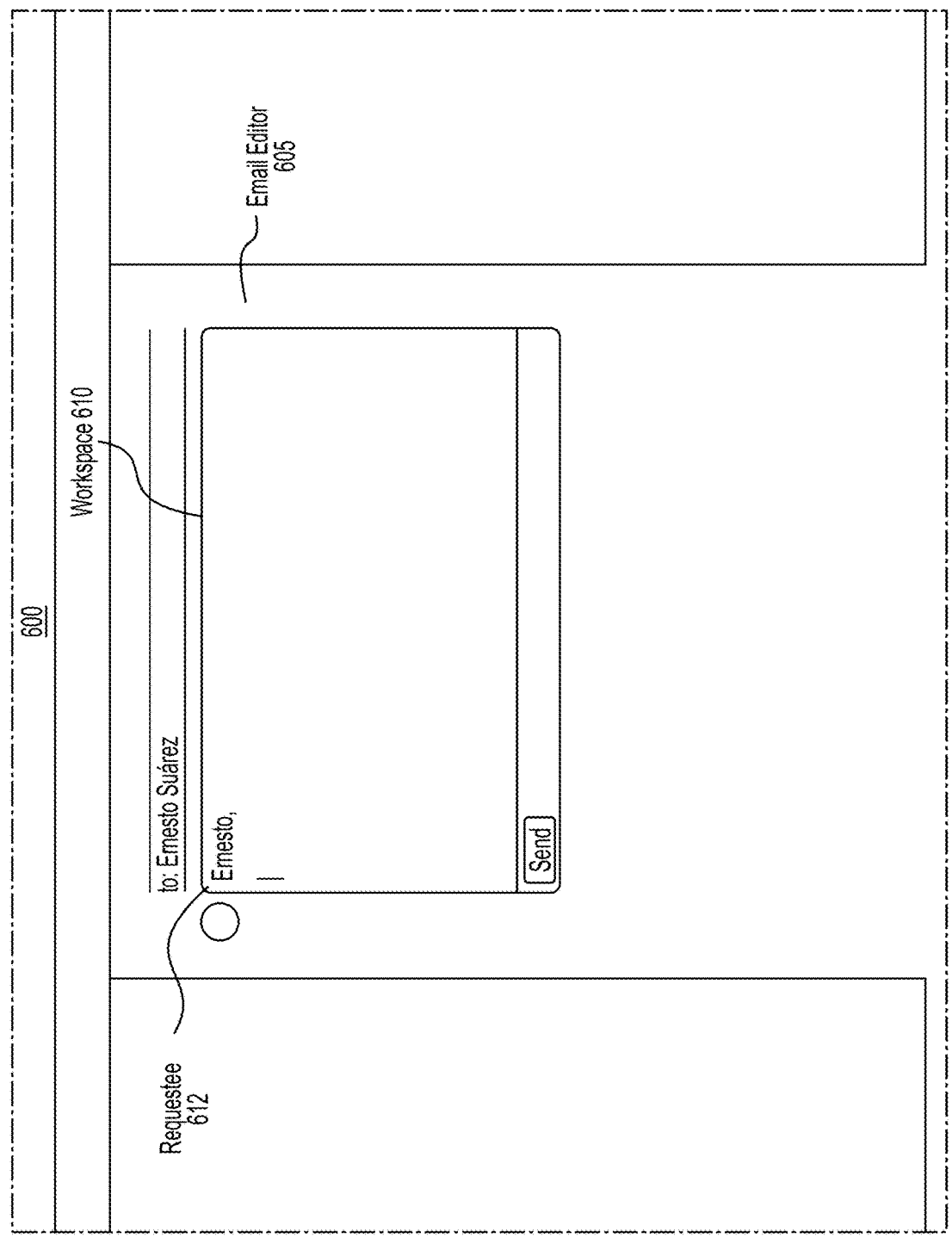
Figure 6B:
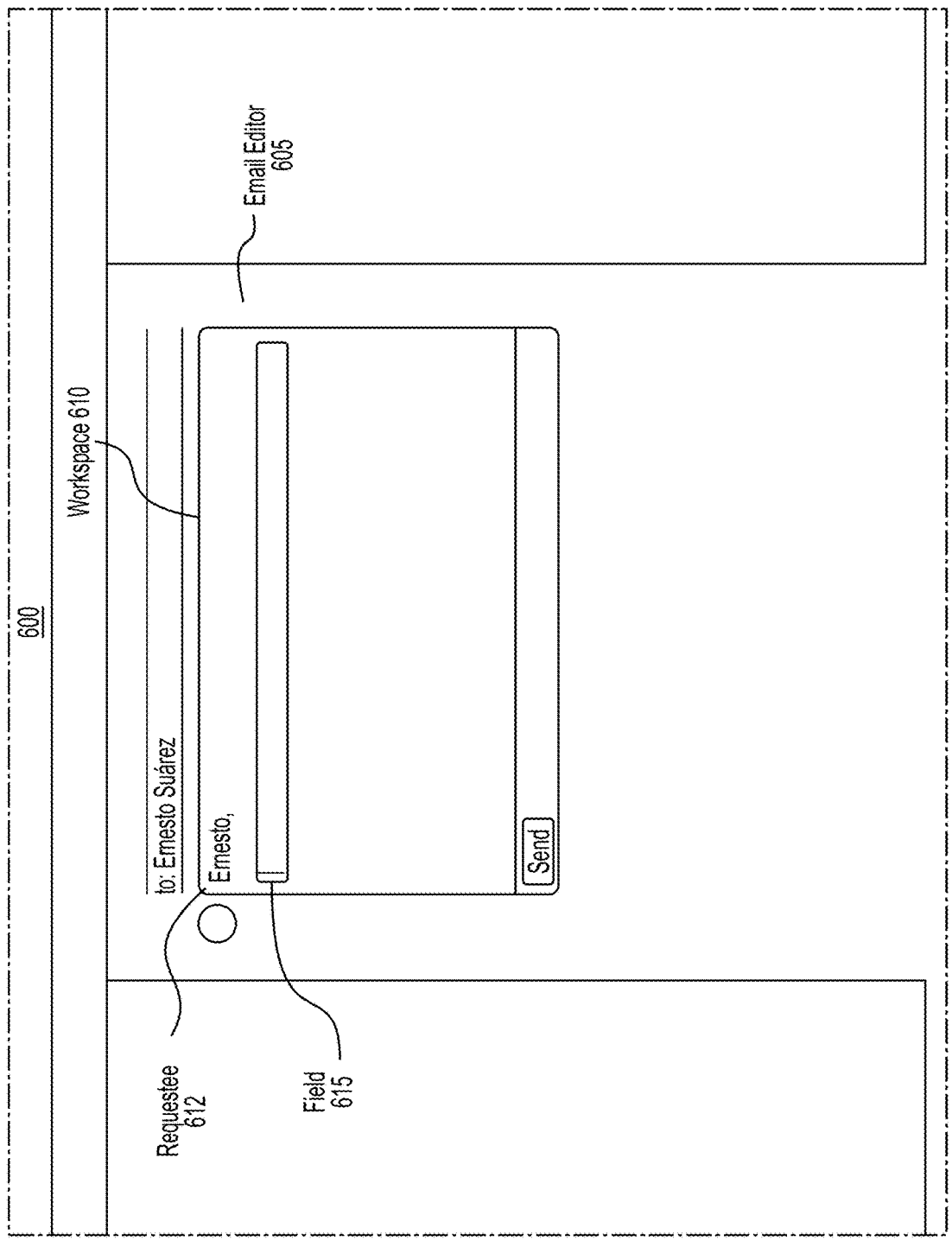
Figure 6C:
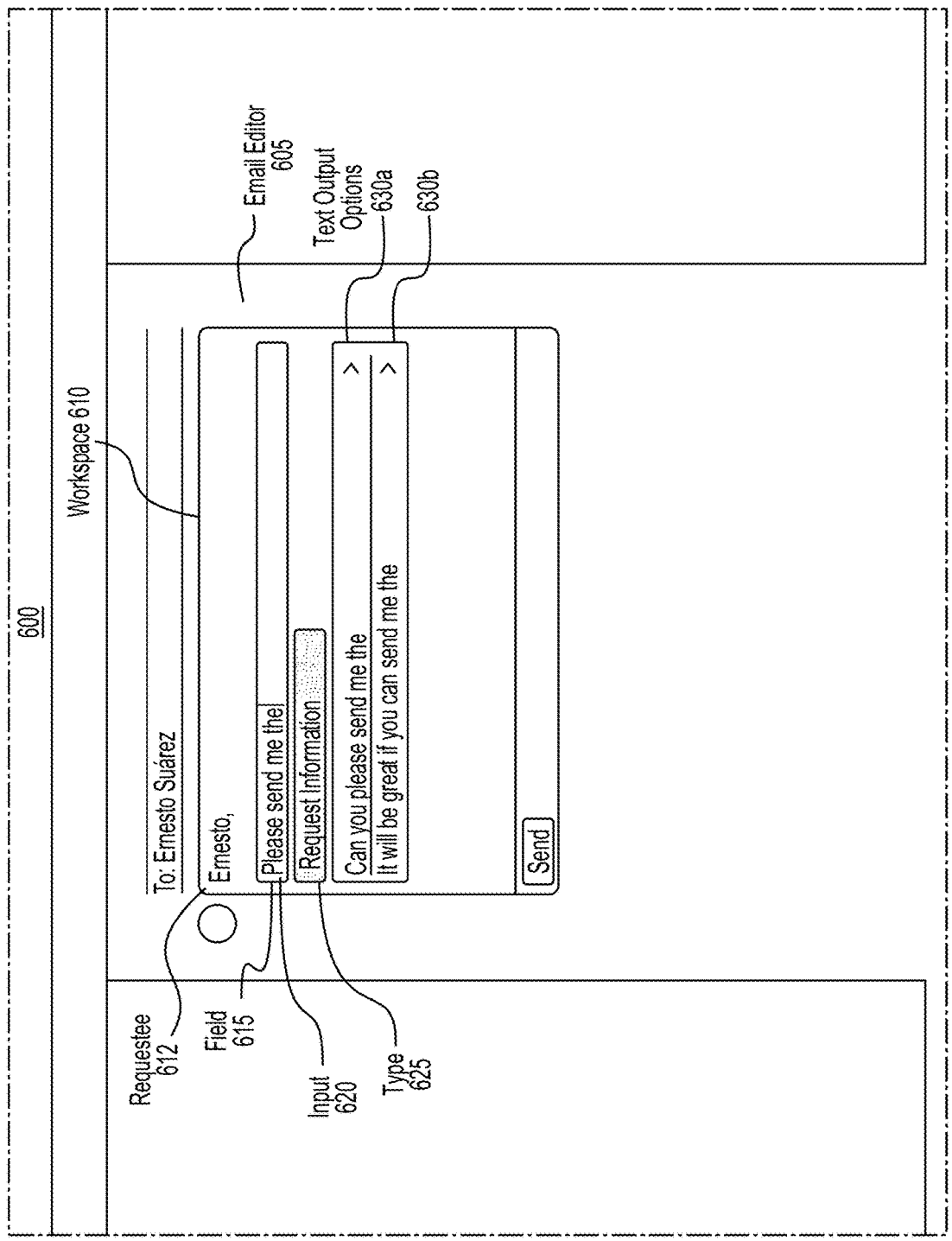
Figure 6D:
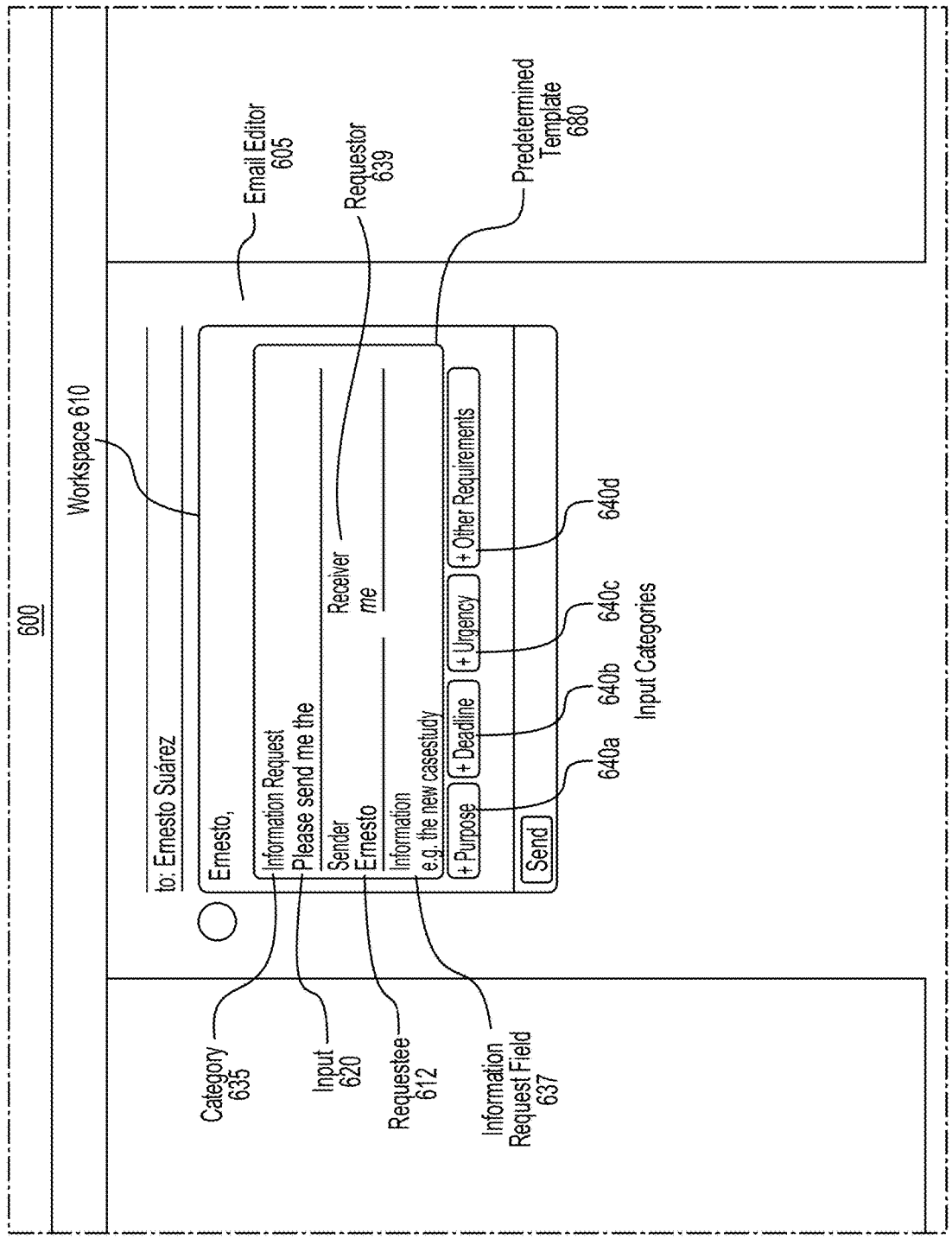
Figure 6E:
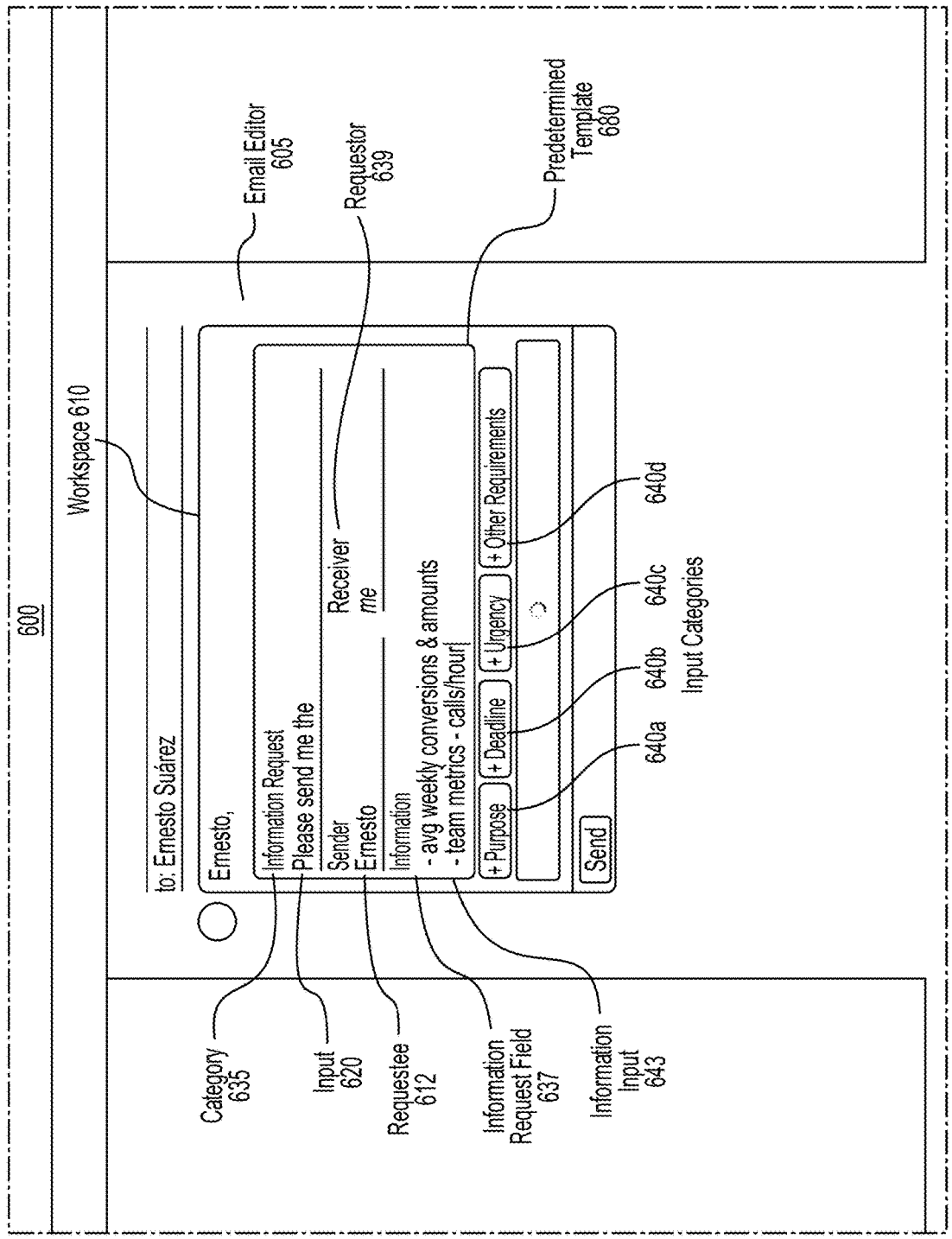
Figure 6F:
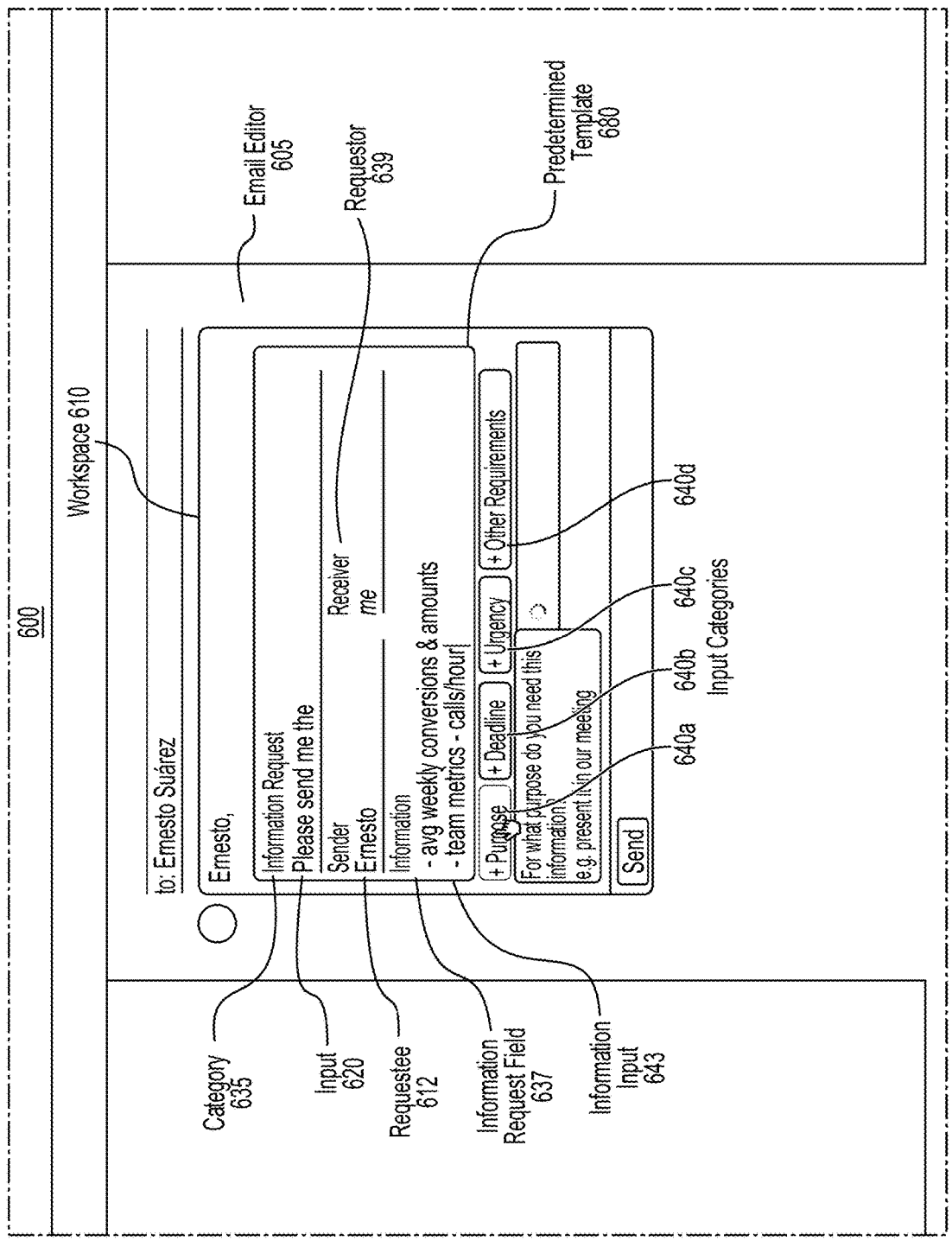
Figure 6G:
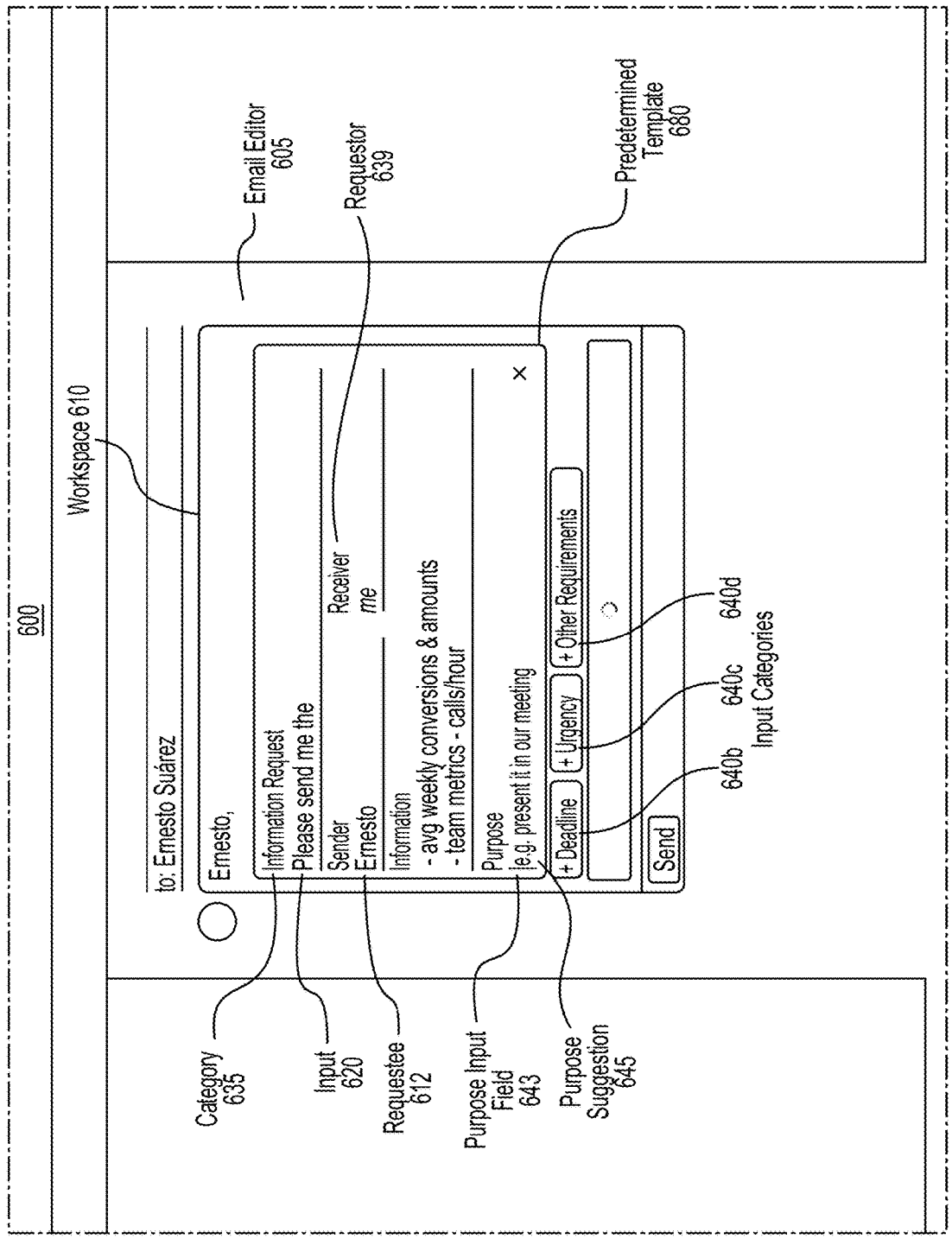
Figure 6H:
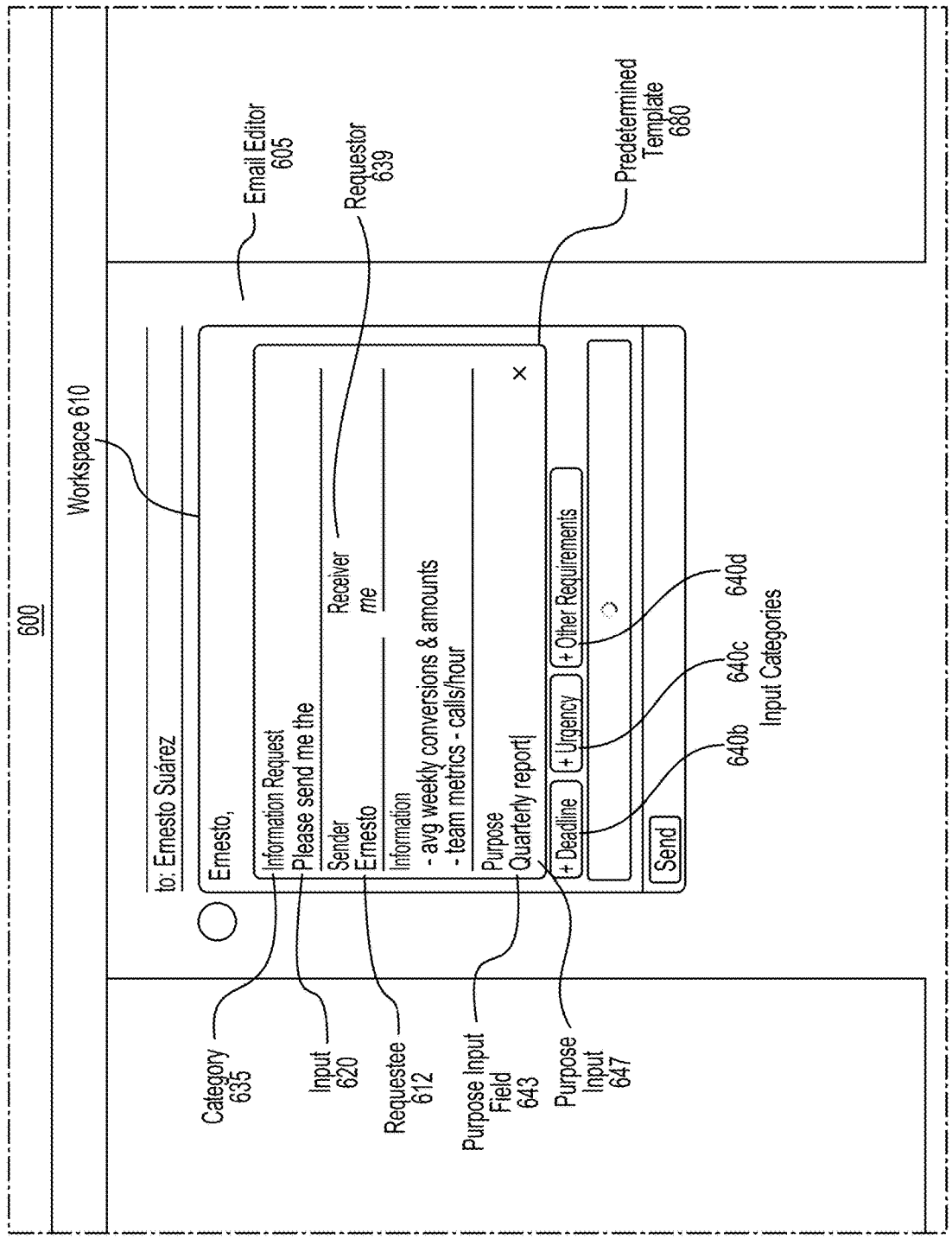
Figure 6I:
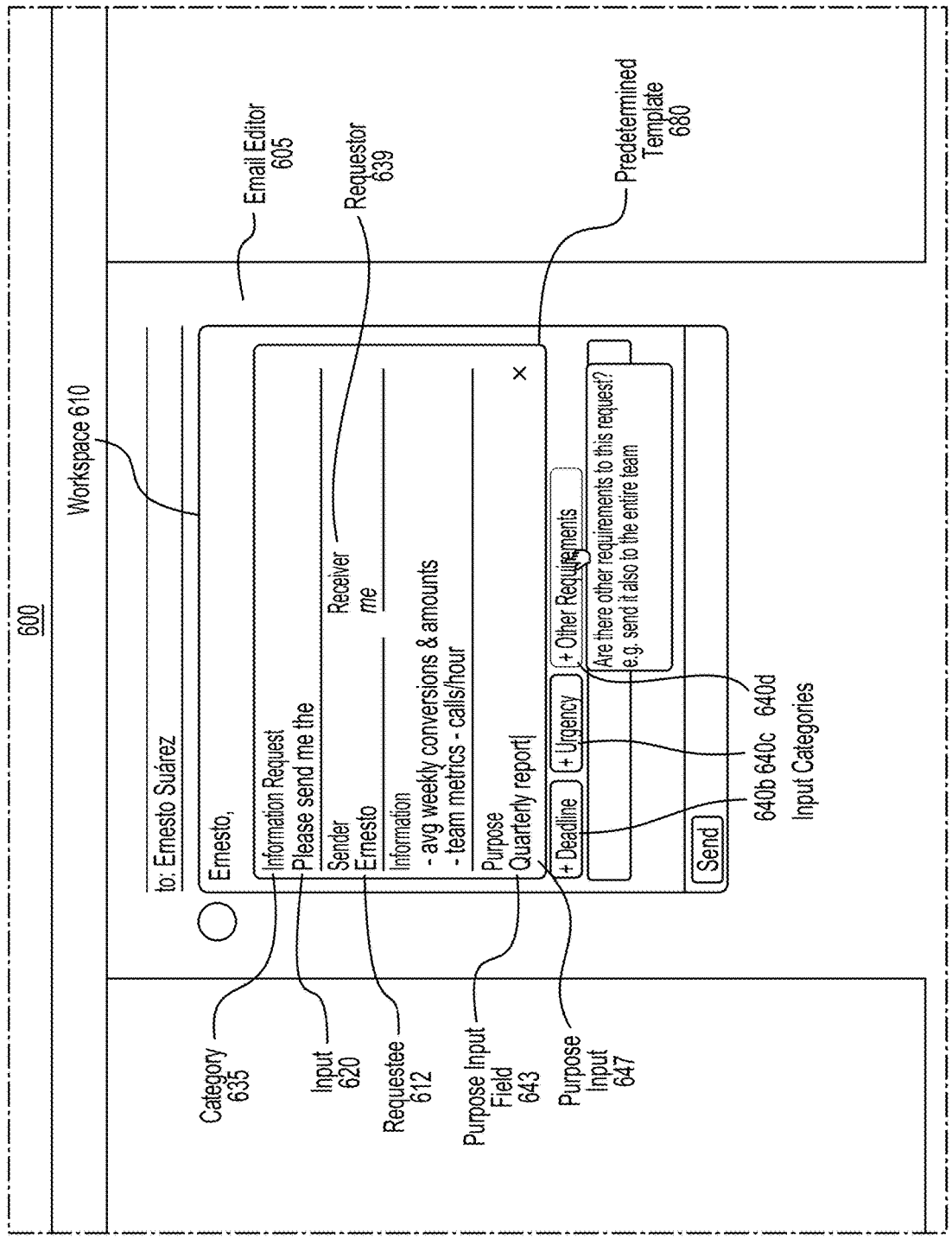
Figure 6J:
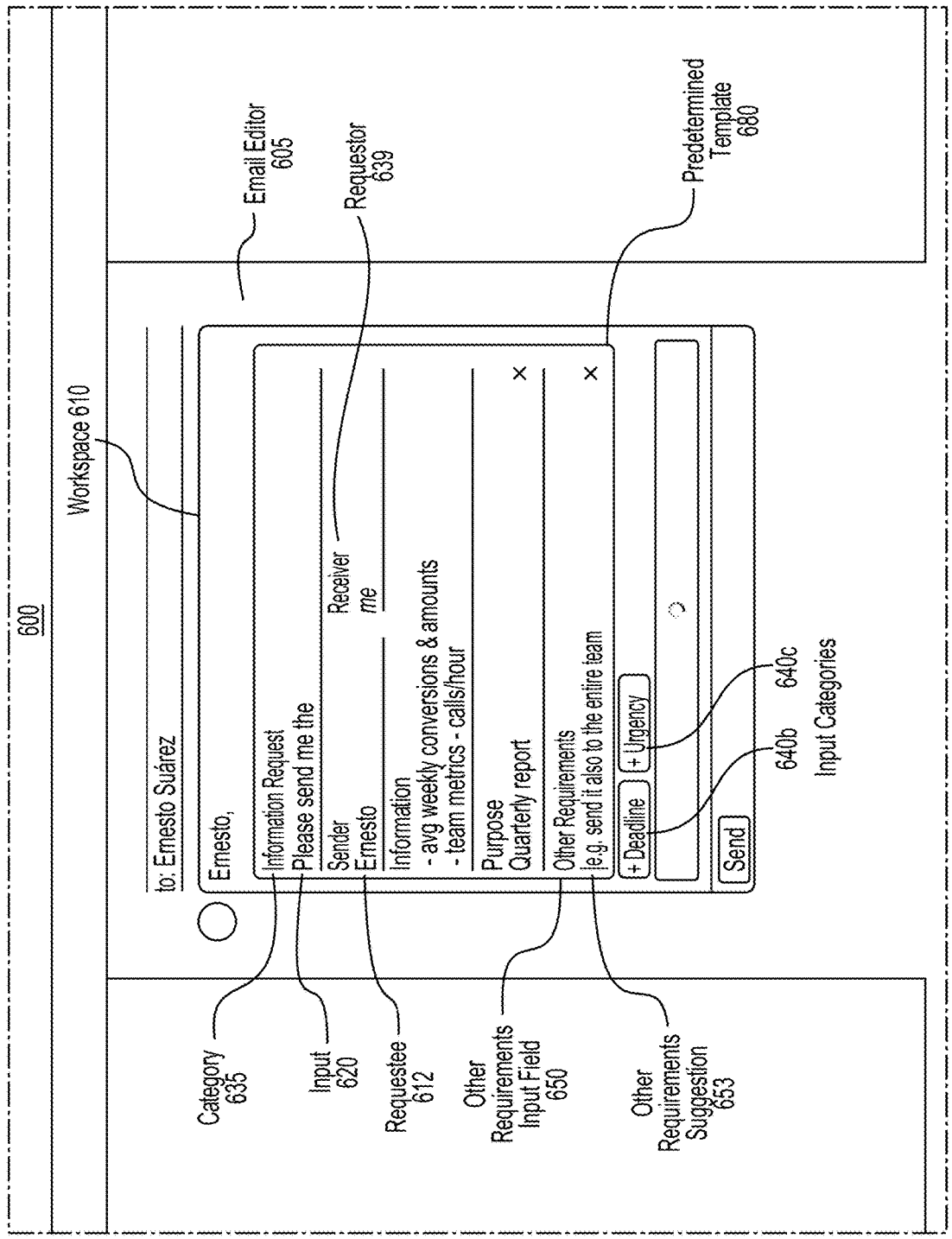
Figure 6K:
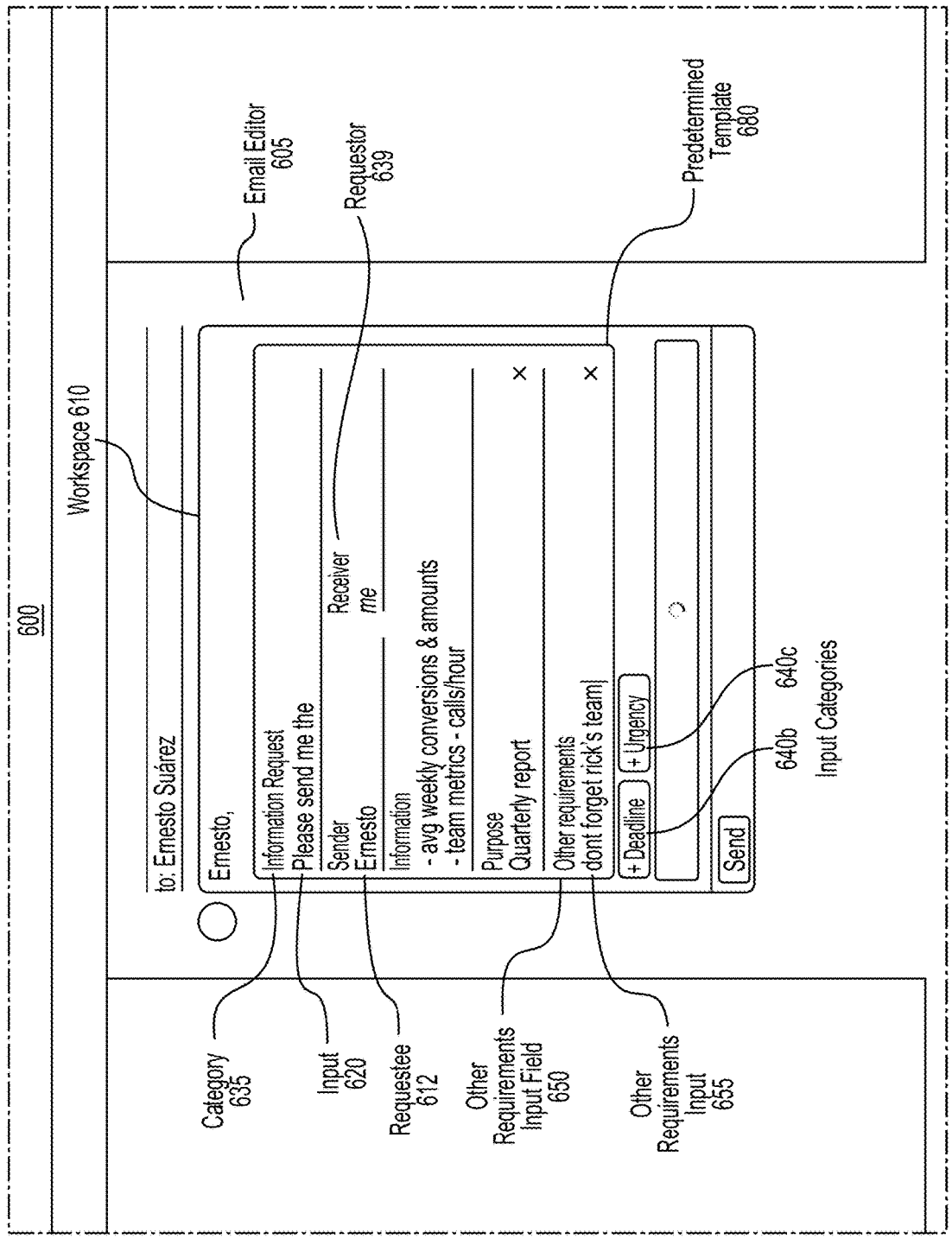
Figure 6I:
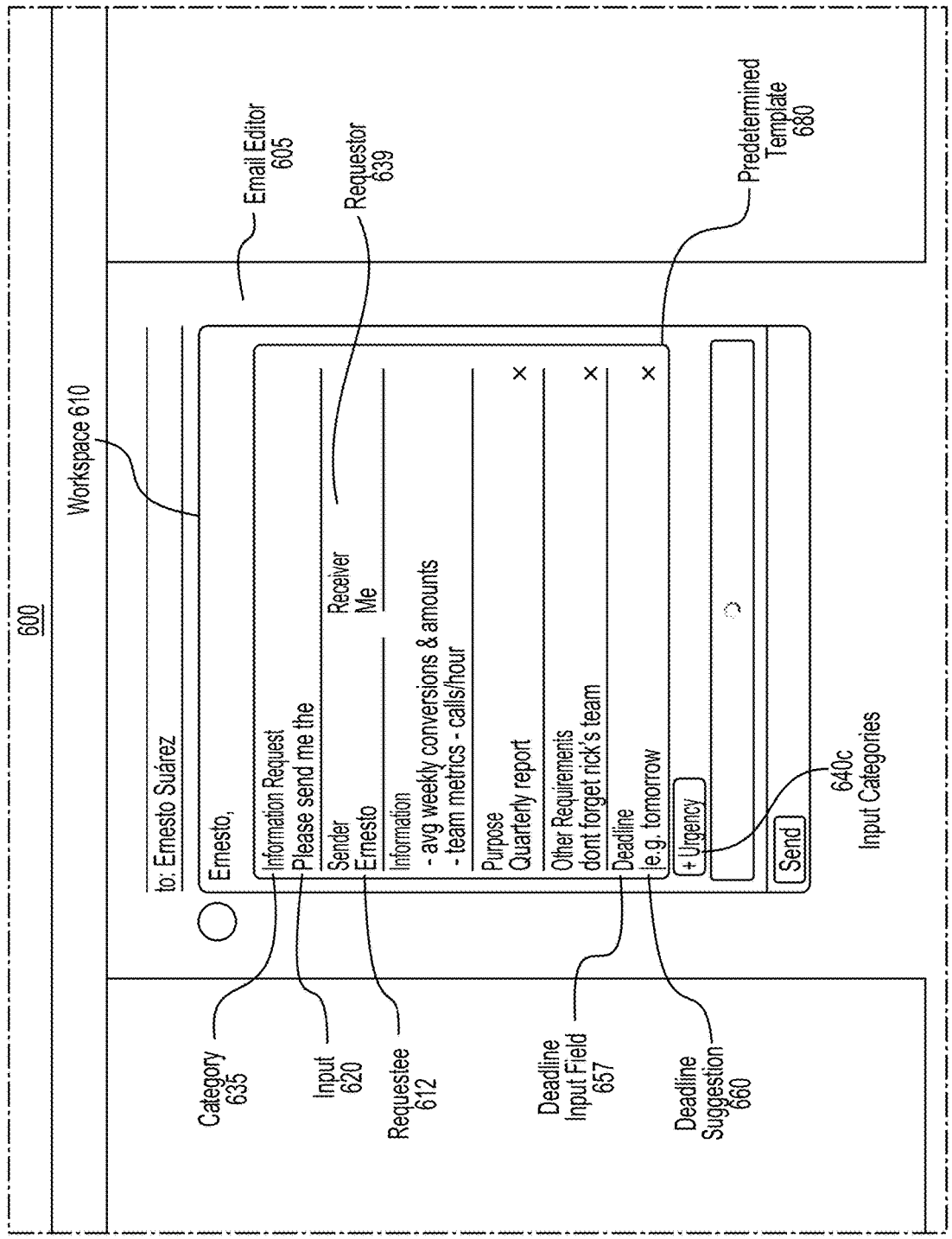
Figure 6M:
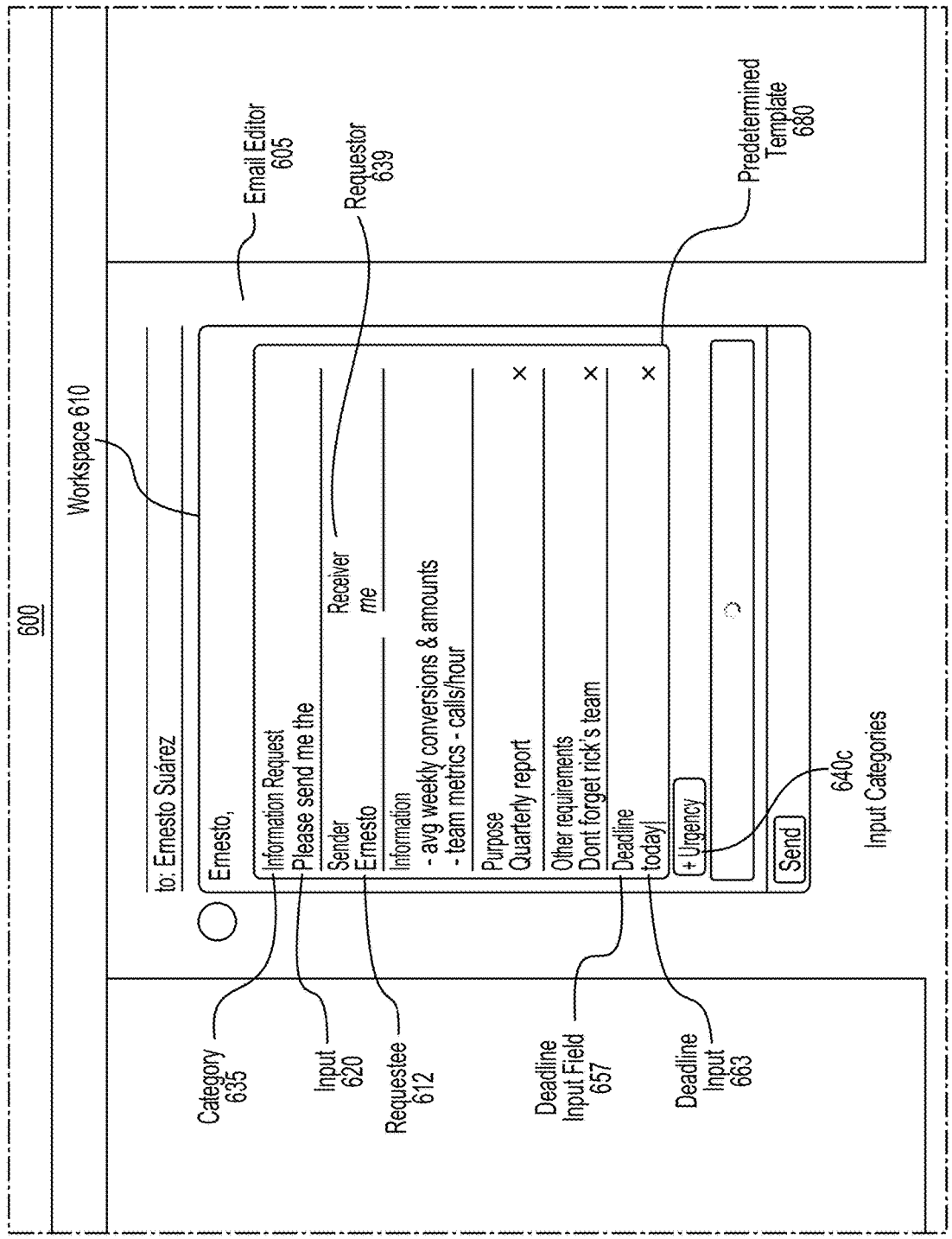
Figure 6N:
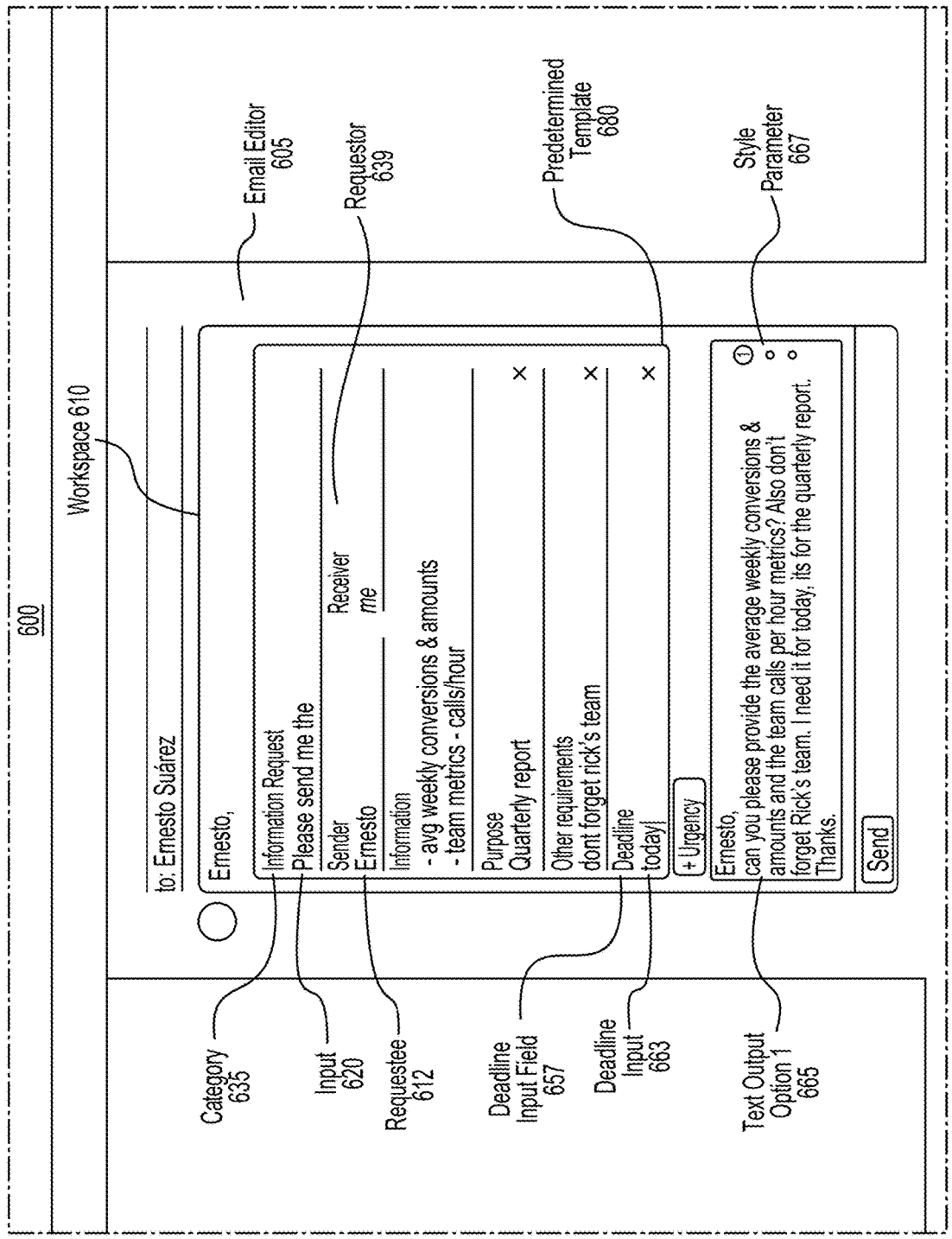
Figure 6O:
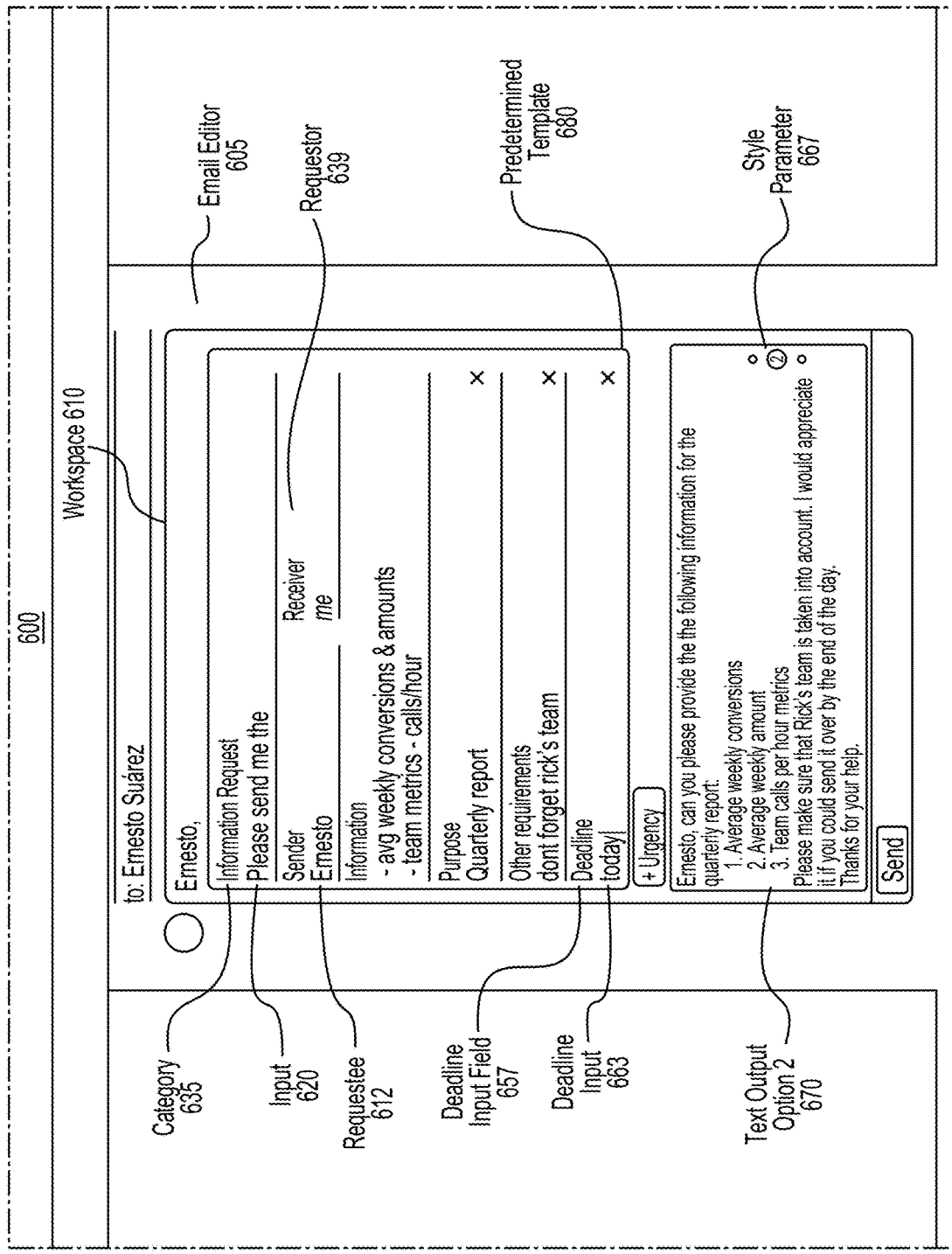

FIGS. 6a-6o provide diagrammatic representations of a writing assistant interface, according to exemplary disclosed embodiments.

FIGS. 7a-7f provide diagrammatic representations of a writing assistant interface, according to exemplary disclosed embodiments.

FIGS. 8a-8d provide diagrammatic representations of a writing assistant interface, according to exemplary disclosed embodiments.

Figure 9A:
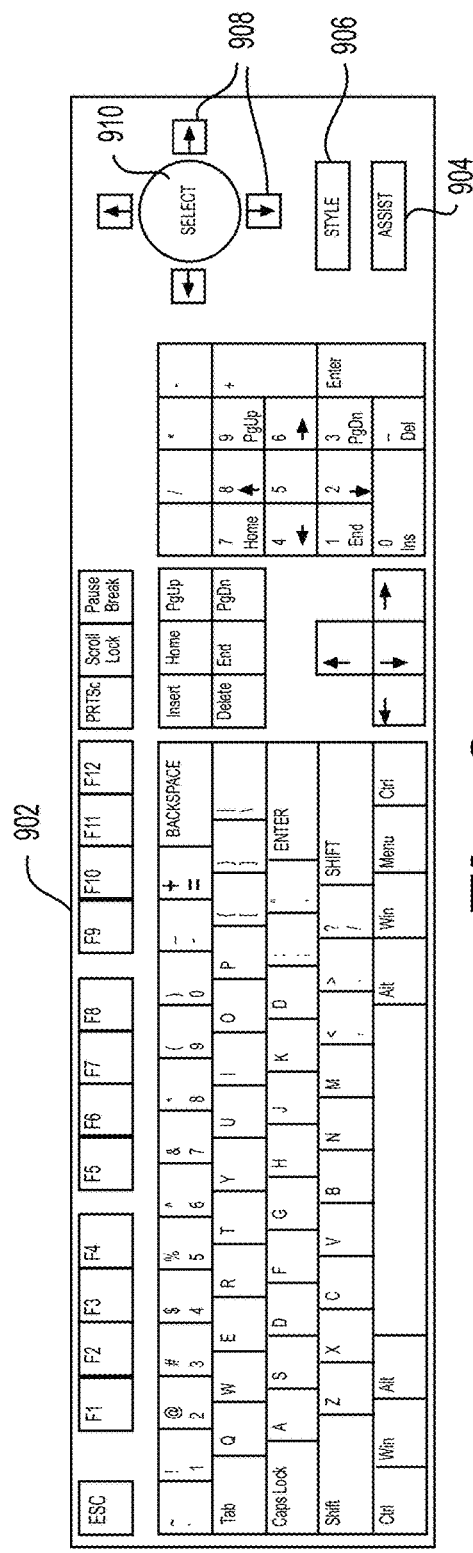
Figure 9A:
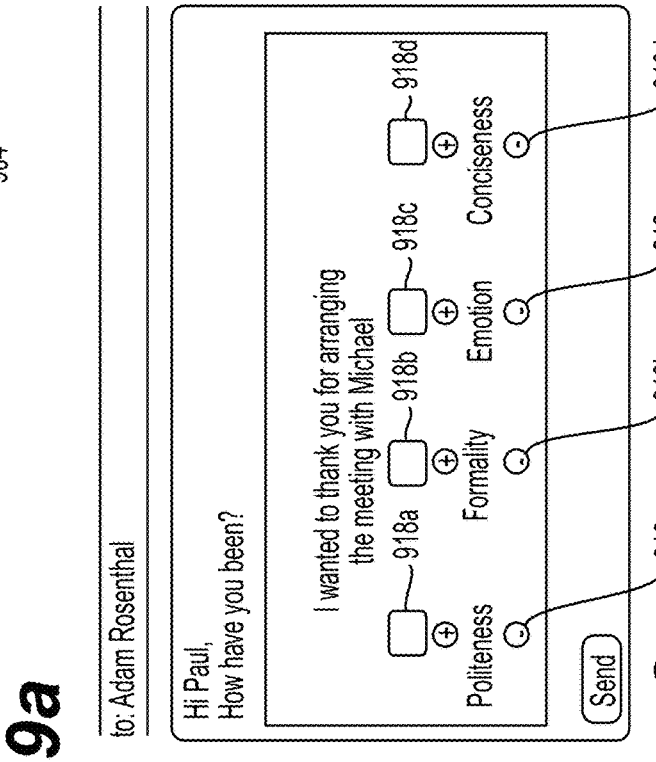

FIG. 9A illustrates an exemplary keyboard for use with the disclosed writing assistant.

Figure 9B:
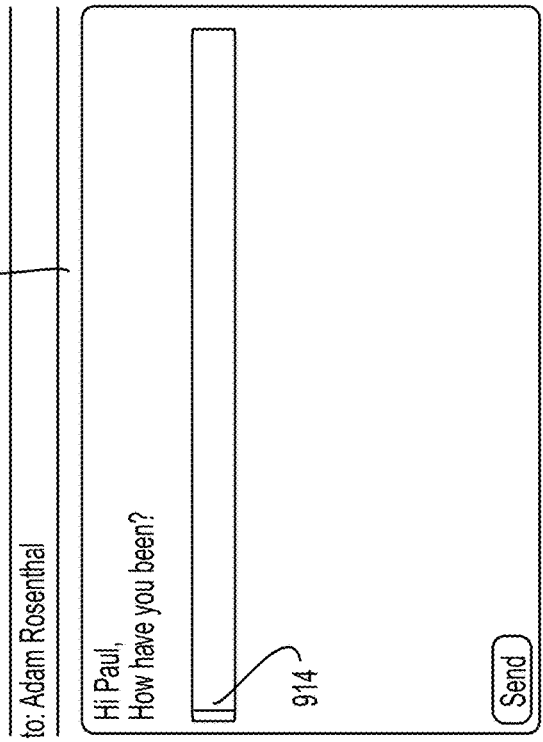
Figure 9C:
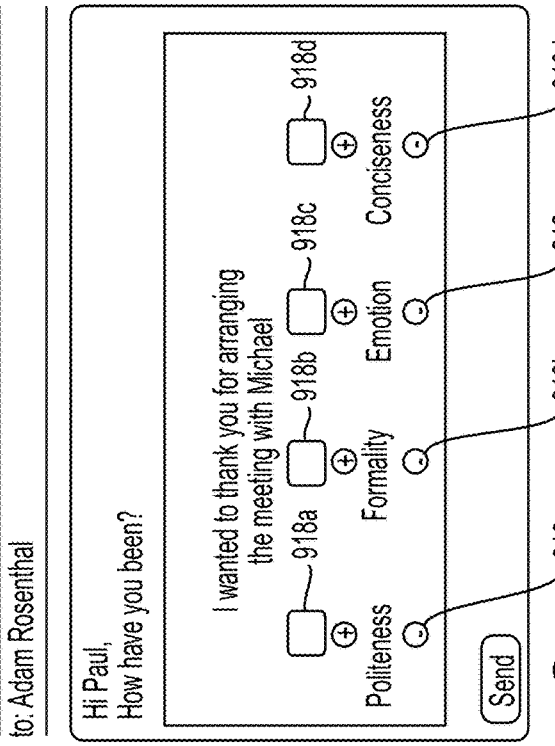

FIGS. 9B and 9C illustrate interface elements controllable using control features associated with the keyboard of FIG. 9A.

FIG. 10A provides a diagrammatic representation of a masked-word prediction task.

FIG. 10B provides a diagrammatic representation of a masked-word supersense prediction task, according to exemplary disclosed embodiments.

Figure 11A:
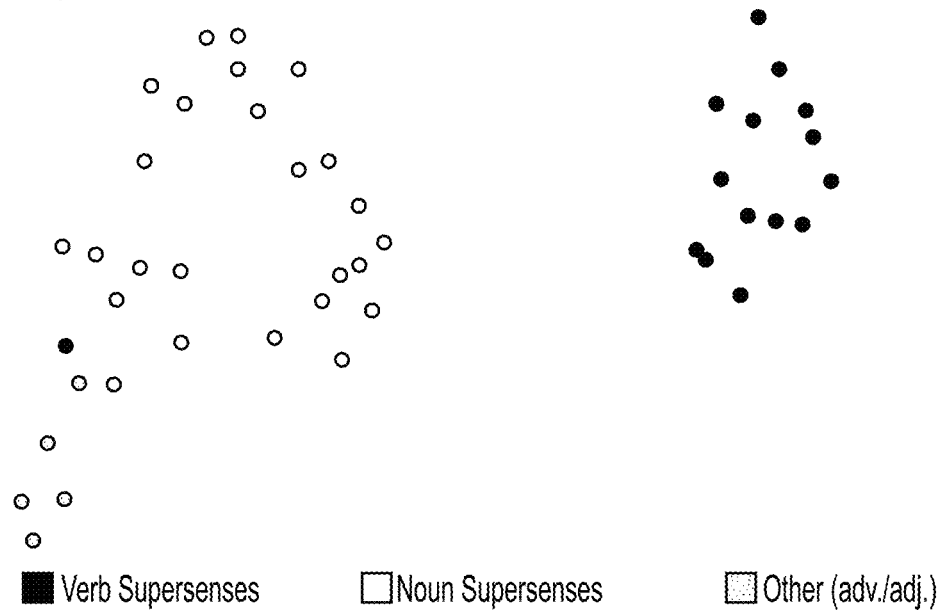
Figure 11B:
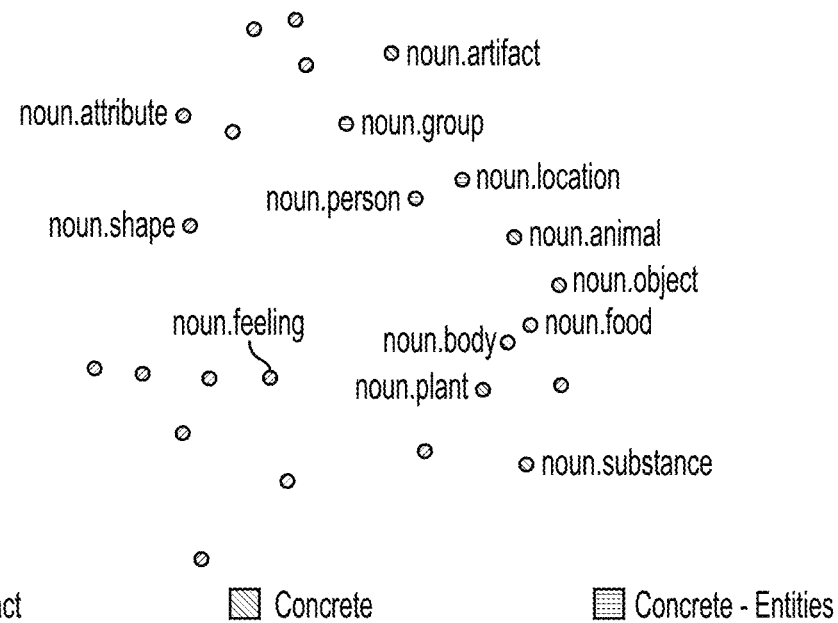

FIGS. 11A and 11B provide diagrammatic visualizations of exemplary supersense vectors learned by SenseBERT at pre-training.

Figures 12A, 12B:
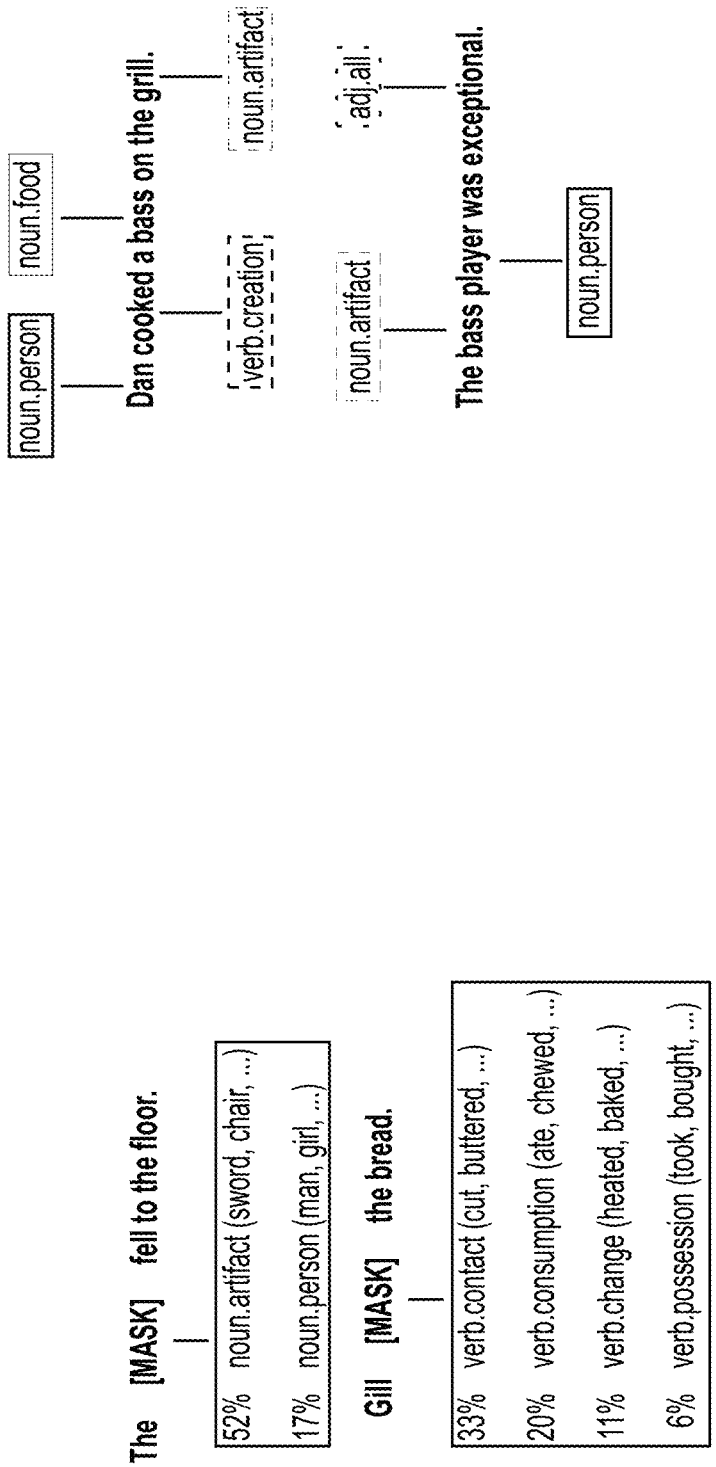

FIG. 12A provides a diagrammatic representation of supersense probabilities assigned to a masked position within context.

FIG. 12B provides examples of SenseBERT's prediction on raw text.

DETAILED DESCRIPTION

The disclosed embodiments relate to a writing assistant system designed to generate useful, natural language output in a variety of situations. For many, tasks associated with writing can be arduous and slow. In many cases, writing may involve or require the generation of sentences and/or text fragments that convey a particular meaning or concept, e.g., when crafting text in support of a particular topic sentence, hypothesis, or conclusion; when developing bridging text (including transition phrases, sentences, or entire paragraphs) that link one section of a document to another; when drafting text simply to convey various thoughts or information; or when generating any other forms of text.

Languages are complex, which can lead to added difficulties when writing. Each language has thousands of words, some of which may have similar meanings (e.g., synonyms) in certain contexts, subtle differences in meaning in other contexts, or quite different meanings depending on the context in which the words are used. In some cases, a phrase may be used to convey an idea that may also be conveyed by a single word, and vice versa. Sentence structure may also influence the meaning of text passages (e.g., order of clauses, proximity of a modifier relative to a subject, etc.). These are just a few of the many types of language variations that can lead to difficulties in developing well-functioning, automatic natural language generator systems.

There is a significant need for systems having enhanced natural language generation capabilities. For example, such systems may significantly alleviate writing-related burdens experienced by users of traditional systems. The disclosed embodiments, in some cases, may receive input from a user (e.g., a word, a phrase, or a grouping of words that may convey one or more ideas or bits of information) and may generate well-formed text that conveys the meaning or information associated with the user input. In view of the significant impact of context on the meaning of words or language, more generally, the disclosed systems seek to generate textual output that agrees with the context associated with other text, other user input, etc.

Such an operation may significantly increase the accuracy of generated text in conveying an intended meaning. For example, some statistics suggest that up to 80% of global commerce is conducted using at least some English language communications for information transfer. But, only about 20% of the world's population speaks English, and far fewer speak English as a native language. This can lead to significant difficulties or errors in conveying business information ranging from simple meeting details to complex agreement provisions or terms for negotiations, among many others. In some cases, the disclosed natural language generation systems may generate one or more words, phrases, sentences, and/or paragraphs in response to input received from a user. For example, one or more English language words entered into the writing assistant may prompt the writing assistant system to generate one or more text outputs that convey the idea and/or information associated with the user input. Such functionality may significantly case the burden of non-native English language speakers in generating business communications (or any other communications) in the form of emails, term sheets, offer letters, supplier letters, contracts, among many others.

The disclosed writing assistant systems are also not limited to operation solely in the English language. The writing assistant system can be trained relative to any language to either receive user input (or any type of text input) in any language and output text generated in the same or different language. For example, in some cases, the disclosed writing assistant systems may receive user input (or text input) in a language other than English and may output text options in English.

The ability of the presently disclosed systems to generate text output (e.g., well-formed text conveying information and/or one or more ideas that may agree with a provided or determined context for the text) in response to input ranging from a single word, phrase, paragraph to a list of words, phrases, or paragraphs may also reduce the amount of time a user needs in drafting certain types of text. For example, a user of the writing assistant system may enter one or more key pieces of information, and in response, the system may generate one or more text output options that convey the information. In one scenario, a user may start an email with the words: meeting, my office, Tuesday at 11 am, and the writing assistant system may return one or more text output options, such as "John, please stop by my office for a meeting on Tuesday at 11 am." among other varied options in text output structure, formality, or context. In embodiments where the system offers multiple text output options, a user may select from among the options that best conveys the intended meeting. In some cases, the user can even select one of the output options that is closest to the intended meaning and have the writing assistant generate one or more additional text output options that are different from one another, but offer more refined options based on the selected text from the initial list of output options. In still other cases, the writing assistant system may update the output text options offered as a user enters additional input into the system or as additional input otherwise becomes available.

In other disclosed embodiments, the writing assistant may generate one or more words, phrases, or paragraphs, etc. that link together available text passages. For example, the writing assistant system may be provided with a specific location in a preexisting text (e.g., using a cursor in an electronic document, etc.) and may offer linking text that bridges between text appearing before and/or after the selected location. Such bridging text may include one or more words, phrases, or paragraphs, etc. that convey concepts consistent with the surrounding text and agree with one or more aspects of the context associated with the preexisting text. The bridging text may be generated with or without prompts from a user (e.g., with or without the user providing the system with entering additional words conveying information and/or ideas for insertion into a text). Such approaches to text generation (and many other described more fully in the sections below) may enable users to more effectively and efficiently generate well-written text in less time than traditional user-generated writing tasks may require.

The disclosed writing assistant systems may also offer significantly improved text output options relative to those offered by traditional language generation systems. For example, traditional systems tend to be highly rule-based and tied to probabilities relative to the appearance of words in sentences, etc. As a result, such systems lack the ability to provide text output options designed to account for available context, either provided by a user or informed by preexisting text. For example, some systems can generate synonym suggestions for selected words, but such systems do not limit their output to synonyms that fit the context of a document or surrounding text. Often, therefore, one or more output options offered may be inappropriate or inconsistent with the context of the user input and/or other text in a particular document.

Further shortcomings of prior word generators may arise from the statistical way in which words are predicted and/or generated. For example, in these types of statistical model-based systems, one or more words may be presented to a user as the user types into an interface. These words or phrases are typically presented to a user, for example, as an optional conclusion to a sentence being typed, and the few relatively simple words provided to the user generally are determined by the system as a statistically most probable grouping of words that typically follow the word or words entered by the user. These statistical systems do not offer text generated as a replacement for text input by the user that, for example, conveys ideas and/or information associated with the user's input. More importantly, such systems do not analyze context of the user input or other text associated with a document in generating a text output. As a result, a text output generated from such a system may be inconsistent with the context of a document text, especially text other than text immediately entered by a user.

In some cases, prior word generators may provide lengthy outputs based on one or more prompts. These systems produce text that may appear complex and well-structured. Indeed, some available systems can receive text input prompts and generate multiple sentences or paragraphs in response. These systems, however, lack the ability to generate text that agrees with or flows together with the information and context of text outside of the prompts provided. As a result (and as one example shortcoming), the text outputs, which may have the structural appearance of well-written text, typically read as nonsensical, randomly generated streams of sentences with little or no relationship to any surrounding text. For example, unlike the presently disclosed writing assistant, prior systems lack an ability to generate textual outputs based on text that follows a document location where a generated text output option is to be inserted. Such text generation systems often fall well short of generating text useful to a user or that matches a user's intended meaning for a communication.

Further, while prior systems may include a graphical user interface (GUI), such prior interfaces are often limited in their functionality and ability to interact with a user. The presently disclosed embodiments are designed to offer a high level of interaction with users, dependent on a particular application. For example, in some examples, the presently disclosed embodiments may provide multiple text output options in response to user input. The text output options, in some cases, may constitute complete sentences that incorporate and convey an idea, meaning, and/or information associated with the user input. Importantly, the text output options may also be generated by taking into account one or more contextual elements associated with the user input and/or other relevant, preexisting text, such that the generated text output options agree contextually with the user input and/or preexisting text. The text output options may be updated as the user continues to provide input such that the updated text output options offer refinements over initially provided text output options in conveying the meaning, and/or information associated with the user input. To insert any of the offered text outputs into a document, for example, the user can make a selection of one of the offered text outputs. Alternatively, the user can select one of the text output options as a prompt for the writing assistant system to generate one or more additional text output options that differ from one other, but may be more closely related to the selected text output options than to other non-selected text output options. Such interactive capabilities may significantly enhance a user experience and the efficiency by which the user can generate well-written text that conveys an intended meaning and agrees with the context of other relevant text.

The sections below describe in detail the functionality and features of the presently disclosed writing assistant systems. The sections also explain in detail how such systems may be constructed to include advanced capabilities such as generating text output that both conveys concepts and ideas included in user input (or other text) and agrees with contextual elements of the user input and/or other text. In some cases, the disclosed writing assistant system may be based on trained machine learning language models trained to recognize complex contextual elements in text. For example, as alluded to above, such models may be trained, for example, using large corpuses of text, masking different segments of text (e.g., tokens), and one or more reward functions that penalize the system during training for generating text replacements that do not match the masked text and reward the system for generating a text replacement that matches the masked text. Such trained systems when placed into use, for example, may offer significantly improved capabilities for generating well-written text that conveys an intended meaning while agreeing with the context of surrounding text or other relevant text. Additional details regarding training of the network(s) associated with the disclosed writing assistant are discussed in more detail in sections that follow.

Before turning to the details, it should be noted that the disclosed writing assistant systems and their associated GUIs may be employed together with any type of computer-based technology. For example, such systems may be incorporated into word processing software, email editors, presentation software, or any other type of computer application in which text is involved. Additionally, the disclosed systems may be operated on a PC, server, tablet, mobile device, laptop, heads up display unit, or any other type of hardware system capable of executing an application including text-based functionality.

Reference will now be made in detail to exemplary embodiments, examples of which are illustrated in the accompanying drawings and disclosed herein. The systems and methods are described below in no particular order and can be performed in any order and combination. Additionally, various embodiments of the disclosed writing assistant technology may include some or all of the disclosed features and functionality in any combination.

Figure 1:
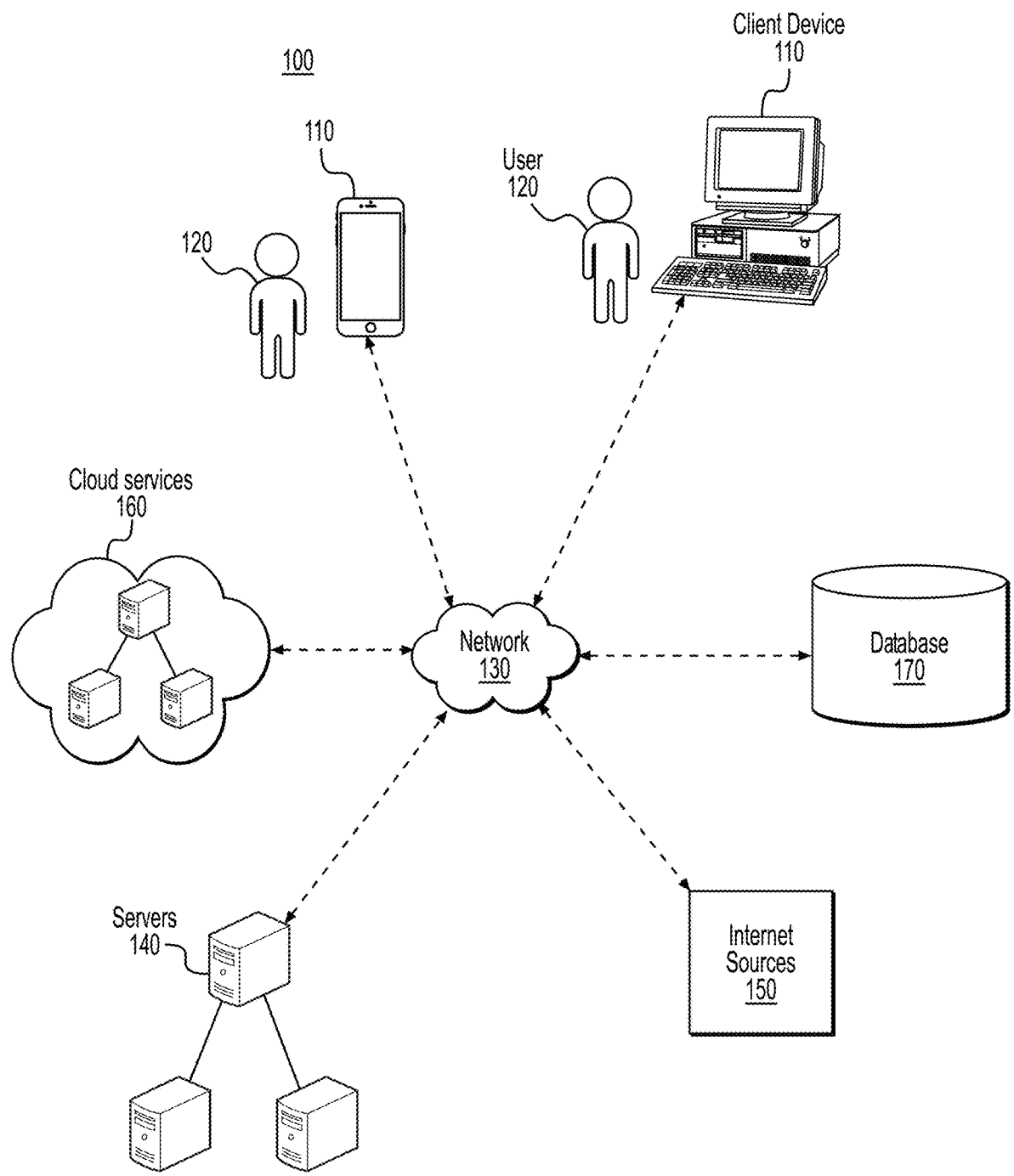
FIG. 1 is a diagram illustrating an exemplary system environment in which the disclosed writing assistant may be used, consistent with disclosed embodiments.

FIG. 1 is a schematic diagram of an exemplary system environment in which the disclosed writing assistant may be employed. For example, system 100 may include a plurality of client devices 110 operated by users 120. System 100 may also include a network 130, server 140, internet resources 150, cloud services 160, and databases 170. The components and arrangement of the components included in system 100 may vary. Thus, system 100 may include any number or any combination of the system environment components shown or may include other components or devices that perform or assist in the performance of the system or method consistent with the disclosed embodiments. The components and arrangements shown in FIG. 1 are not intended to limit the disclosed embodiments, as the components used to implement the disclosed processes and features may vary. Additionally, the disclosed writing assistant system may be implemented on any single component shown (e.g., a single mobile device or single PC included in client devices 110) or may be implemented in a network architecture (e.g., one or more features of the disclosed writing assistant systems and methods being implemented on a server 140, associated with one or more cloud services 160, etc. and having connectivity established with one or more client devices 110 via network 130 (e.g., a WAN, LAN, Internet connection, etc.).

As shown in FIG. 1, client devices 110 may include a variety of different types of devices, such as personal computers, mobile devices like smartphones and tablets, client terminals, supercomputers, etc. Client devices 110 may be connected to a network such as network 130. In some cases, a user 120 may access the writing assistant and its associated functionality via the client device 110 which can display the user interface of the writing assistant. For example, the writing assistant may be operated as a standalone application on a client device 110, or the writing assistant may be incorporated into any text editing application that may be operated on a client device 110 (or other types of computing devices). In some cases, the writing assistant may be incorporated with applications including, but not limited to, email editors, word processing programs, presentation applications, spreadsheet applications, PDF editors, etc.

Network 130, in some embodiments, may comprise one or more interconnected wired or wireless data networks that receive data from one device (e.g., client devices 110) and send it to another device (e.g., servers 140). For example, network 130 may be implemented to include one or more Internet communication paths, a wired Wide Area Network (WAN), a wired Local Area Network (LAN), a wireless LAN (e.g., Bluetooth®, etc.), or the like. Each component in system 100 may communicate bidirectionally with other system 100 components either through network 130 or through one or more direct communication links (not shown).

As noted, the writing assistant may be implemented and run using a variety of different equipment, such as one or more servers, personal computers, mobile devices, supercomputers, mainframes, or the like, connected via various types of networks. In some embodiments, the writing assistant may be configured to receive information from client device 110, database 170, server 140, cloud service 160, and/or Internet sources 150 (among others) and send or return information to the same. The writing assistant can be incorporated into client devices 110 and run locally or be run on a server 140 or from a cloud service 160 accessed by the client device 110 via network 130.

As previously described, the writing assistant can be operated as a standalone application offering its own GUI or may be incorporated into another application (e.g. a parent application) and may offer one or more GUI interface components to the parent application. For example, the writing assistant GUI (or parent application GUI supplemented with writing assistant features) may provide a location to receive user input (e.g., at the cursor in editors, etc.). GUIs associated with the disclosed writing assistant can also provide one or more windows or fields for receiving user input and one or more additional windows or fields for providing text output options in response to received user input. The windows, fields, and/or functions of the writing assistant may be selectively activated or deactivated. The user input may consist of words or text that can be extracted from a document or inputted by the user using a keyboard or other appropriate input method, including dictation by the user using voice recognition software. Multiple embodiments and examples of the writing assistant GUI along with various features associated with the disclosed writing assistant are discussed in the sections below.

In the disclosed embodiments, the writing assistant may allow users to express their ideas simply, for example, through simple natural language, with no regard for correctness, grammar, style, clarity, etc. In response, the writing assistant may generate and provide to the user one or more suggestions (in some cases, several suggestions) for unique, well-written, and context-fitting texts that express the specified meaning of the user input, and which may be inserted into the document that is being drafted. In contrast with existing grammar error correction applications, for example, the disclosed writing assistant can provide text options for the users ex-ante rather than correcting mistakes or making local suggestions ex-post. For example, while drafting initial text in a word processing user interface, a user may call the writing assistant and write "lets make phone call, when is good time for you." In response, the assistant would generate well-written sentences that express the same meaning, such as "When are you free for a quick phone call." "What times are you available for a phone call." or "Can we schedule a phone call? What times are you available?"

Figure 2A:
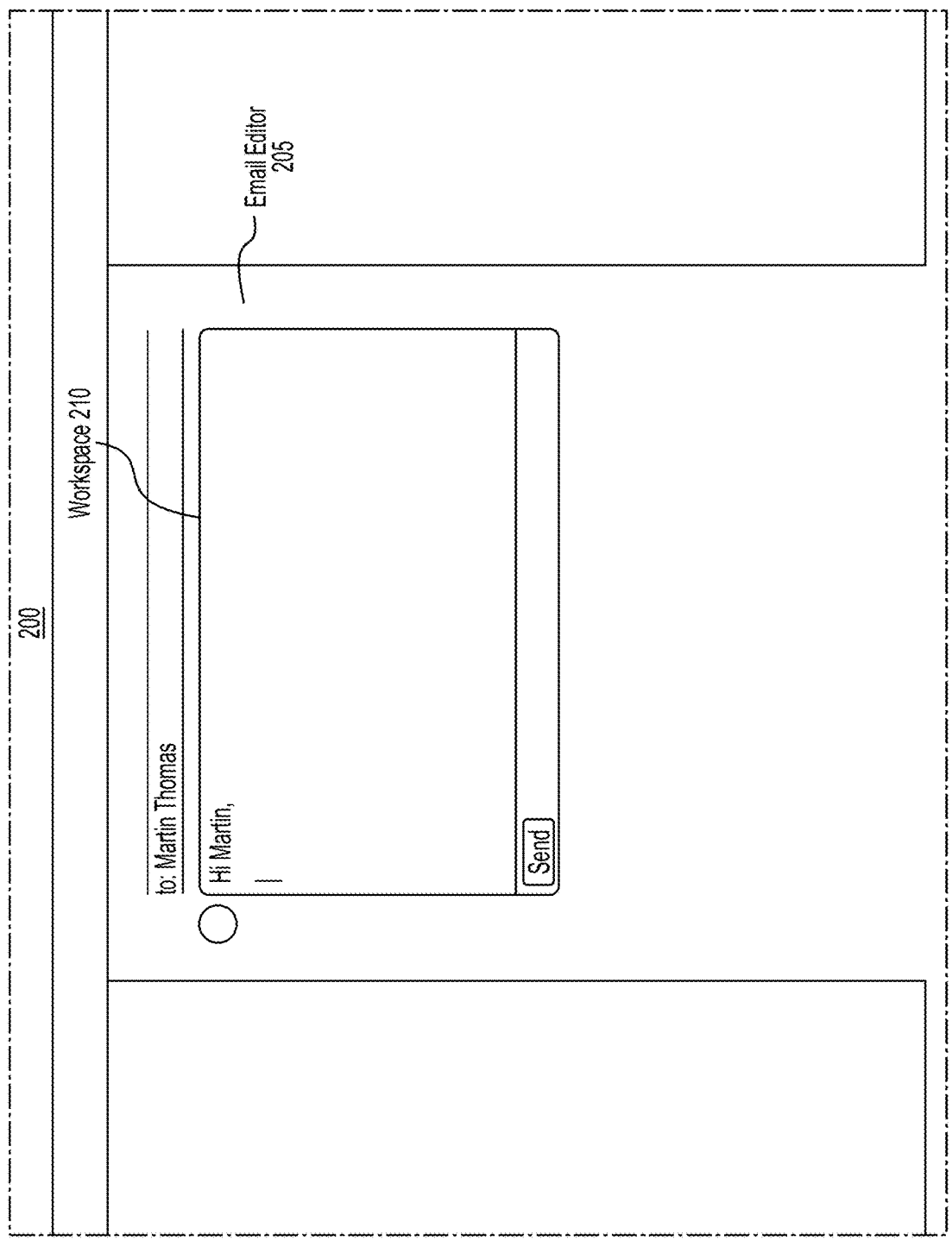
FIGS. 2a-2p show an embodiment of the writing assistant interface, according to exemplary disclosed embodiments.
Figure 2B:
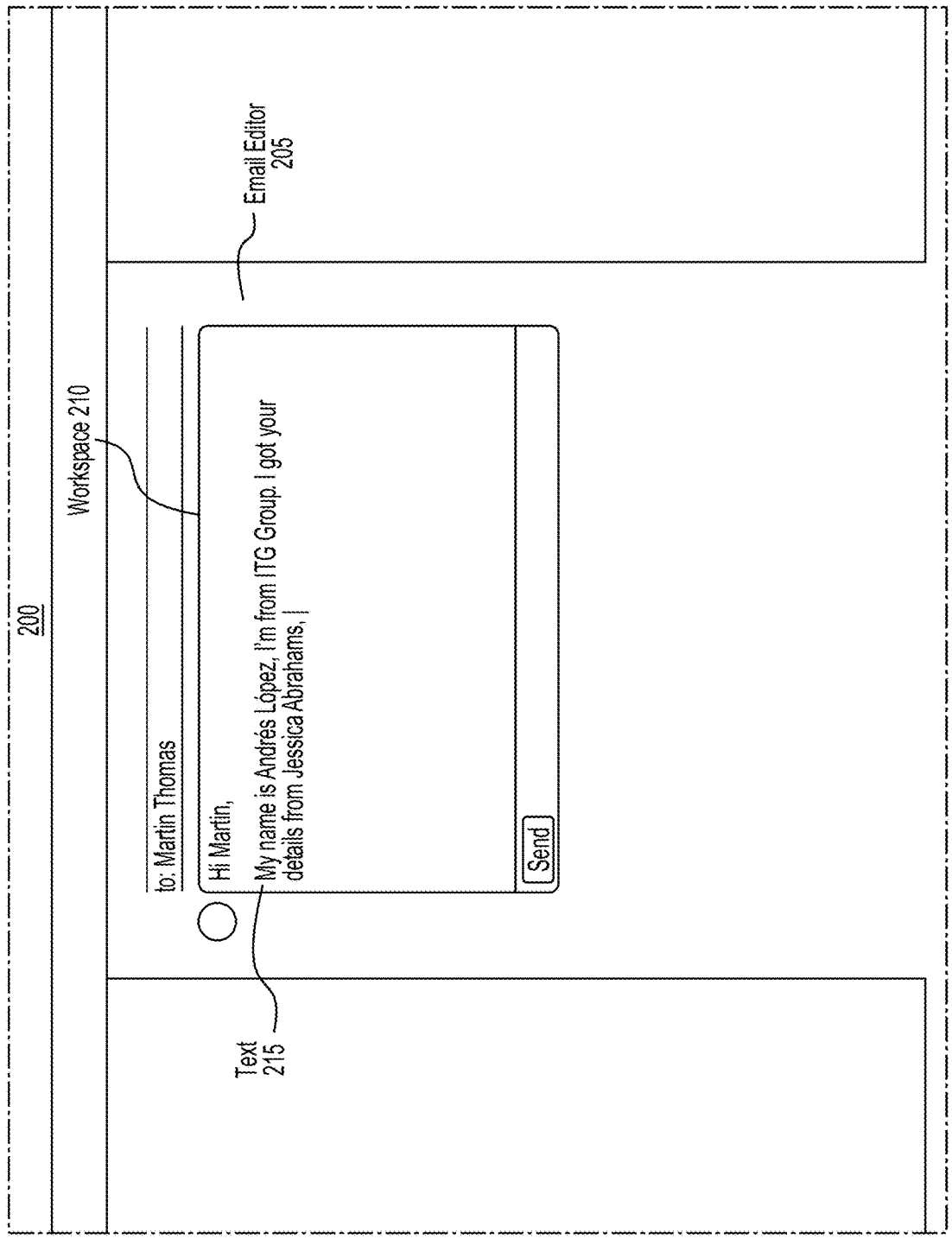
Figure 2C:
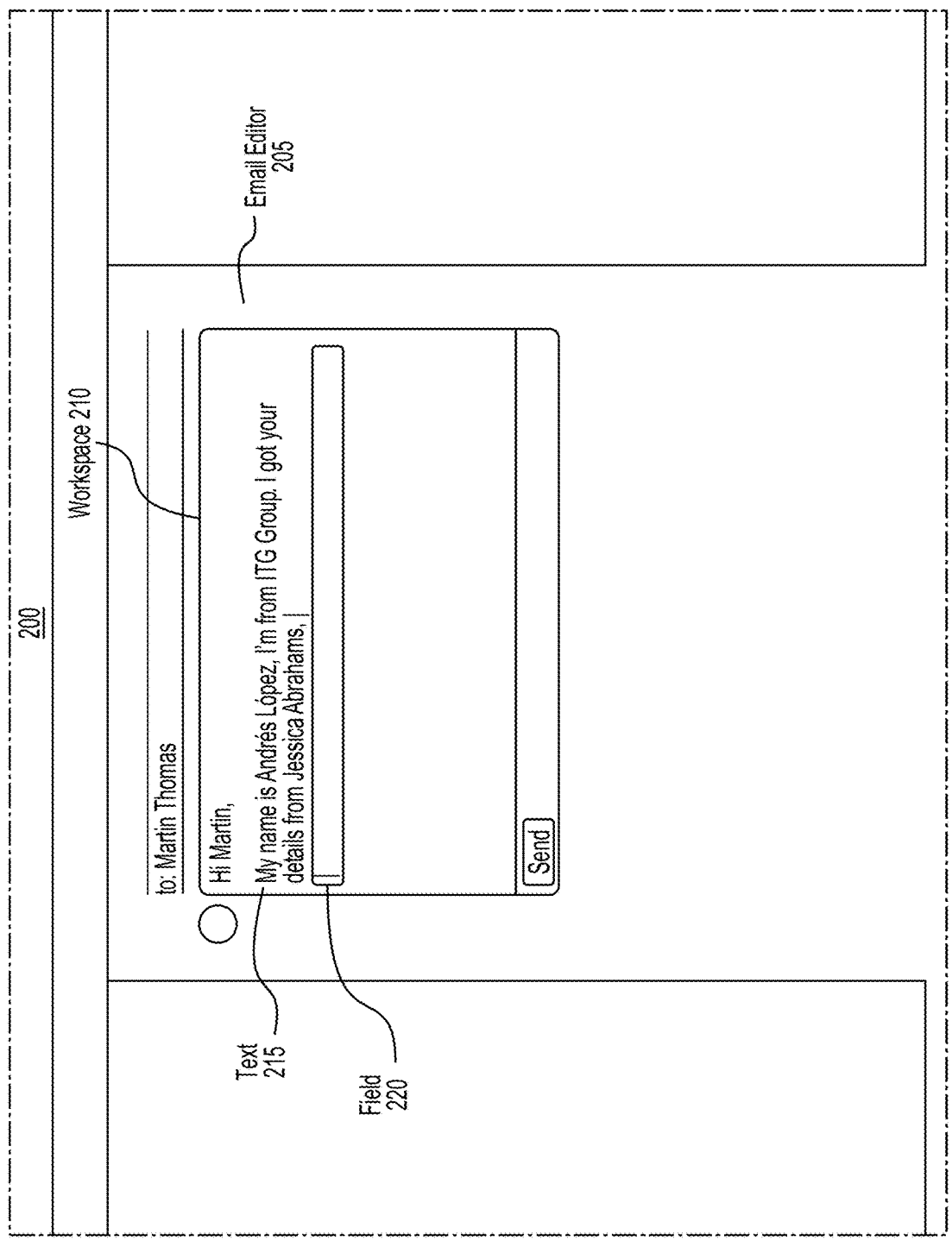
Figure 2D:
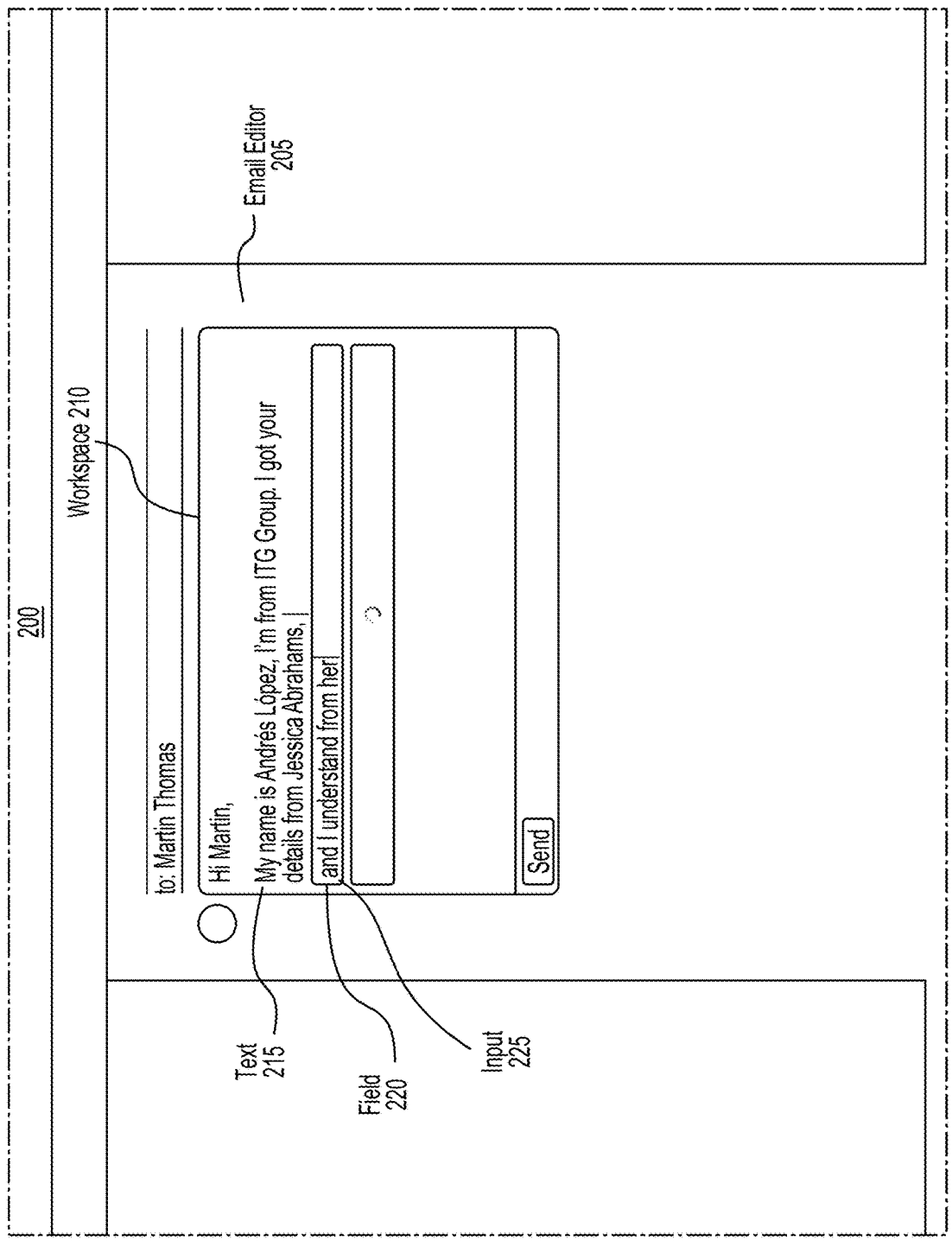
Figure 2E:
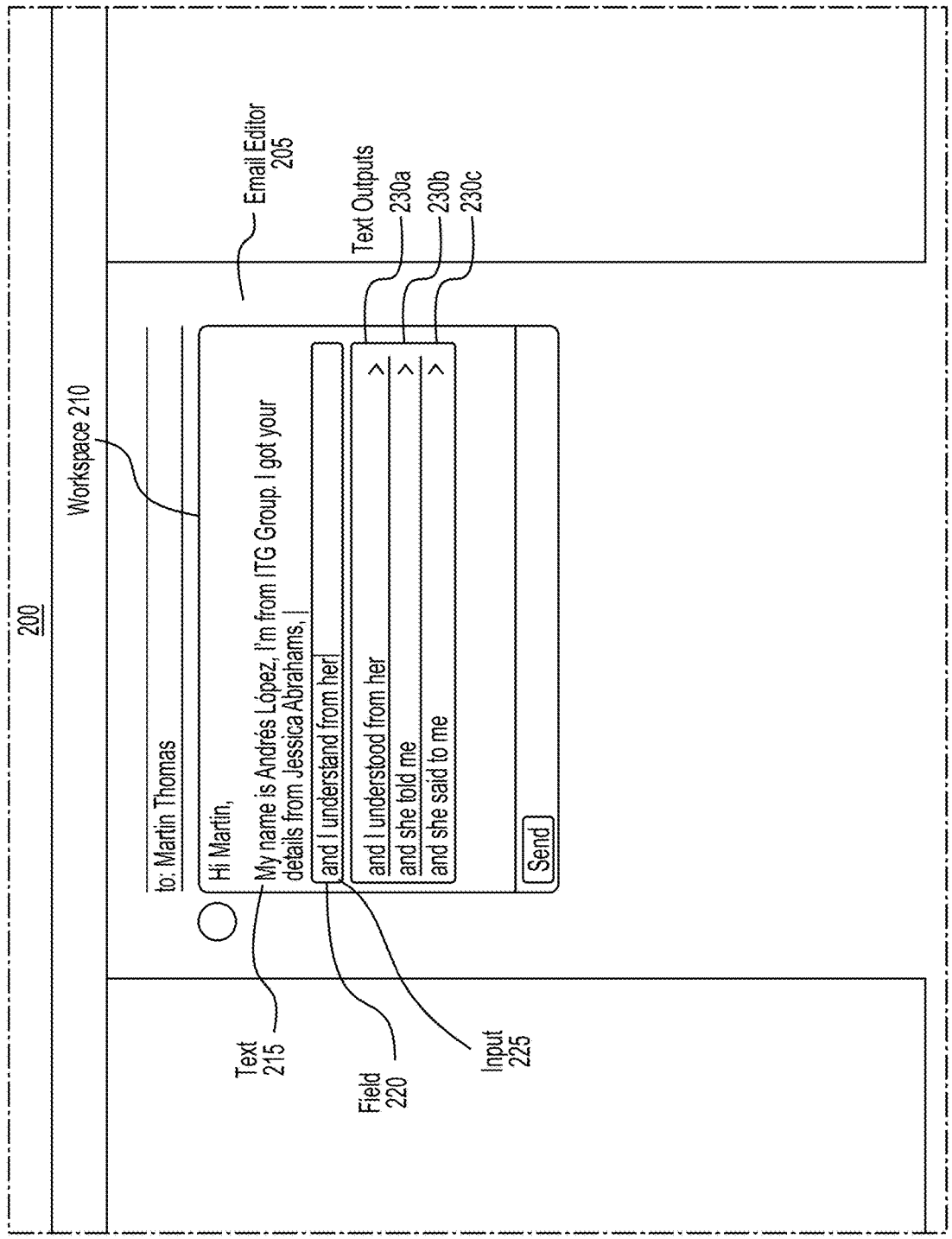
Figure 2F:
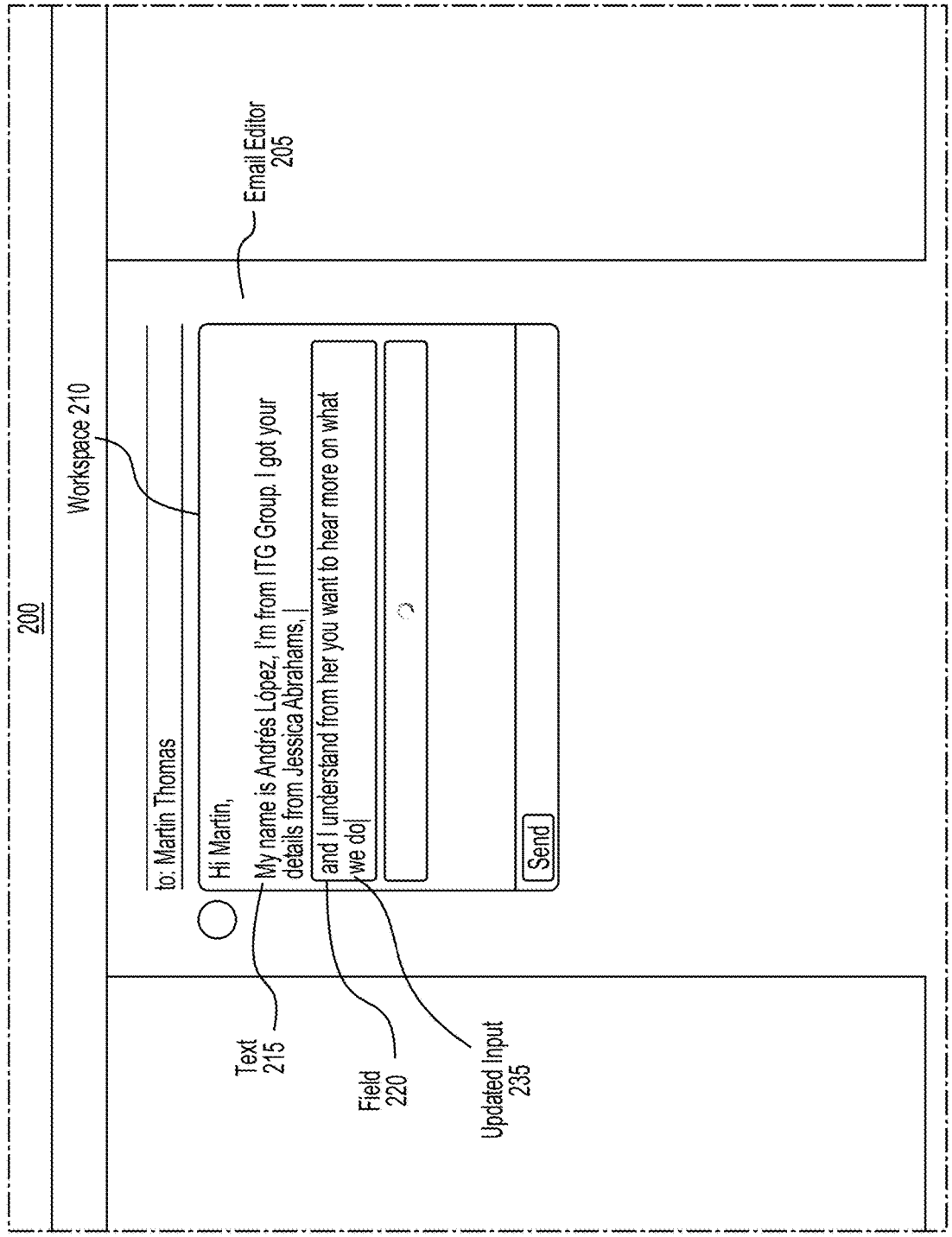
Figure 2G:
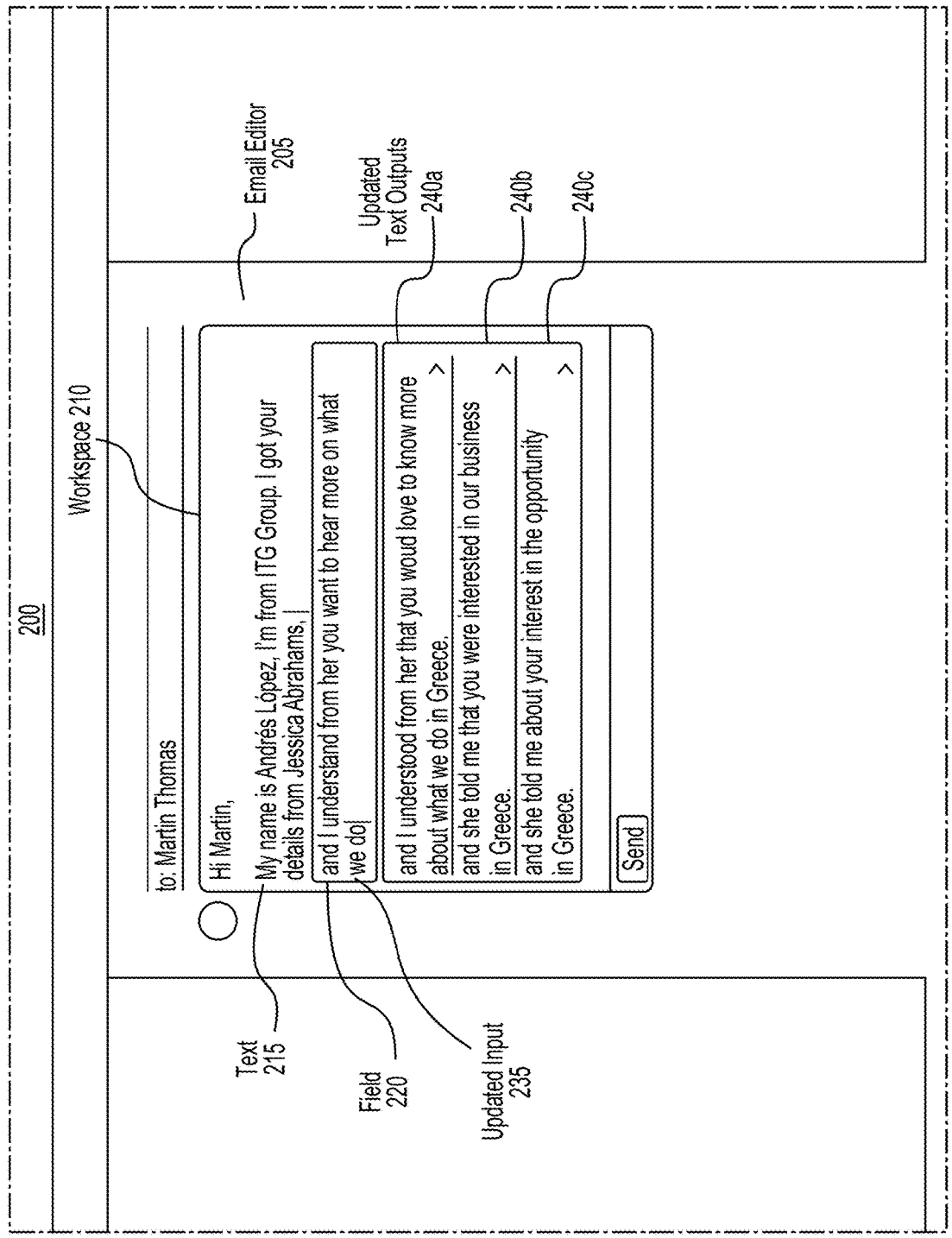
Figure 2H:
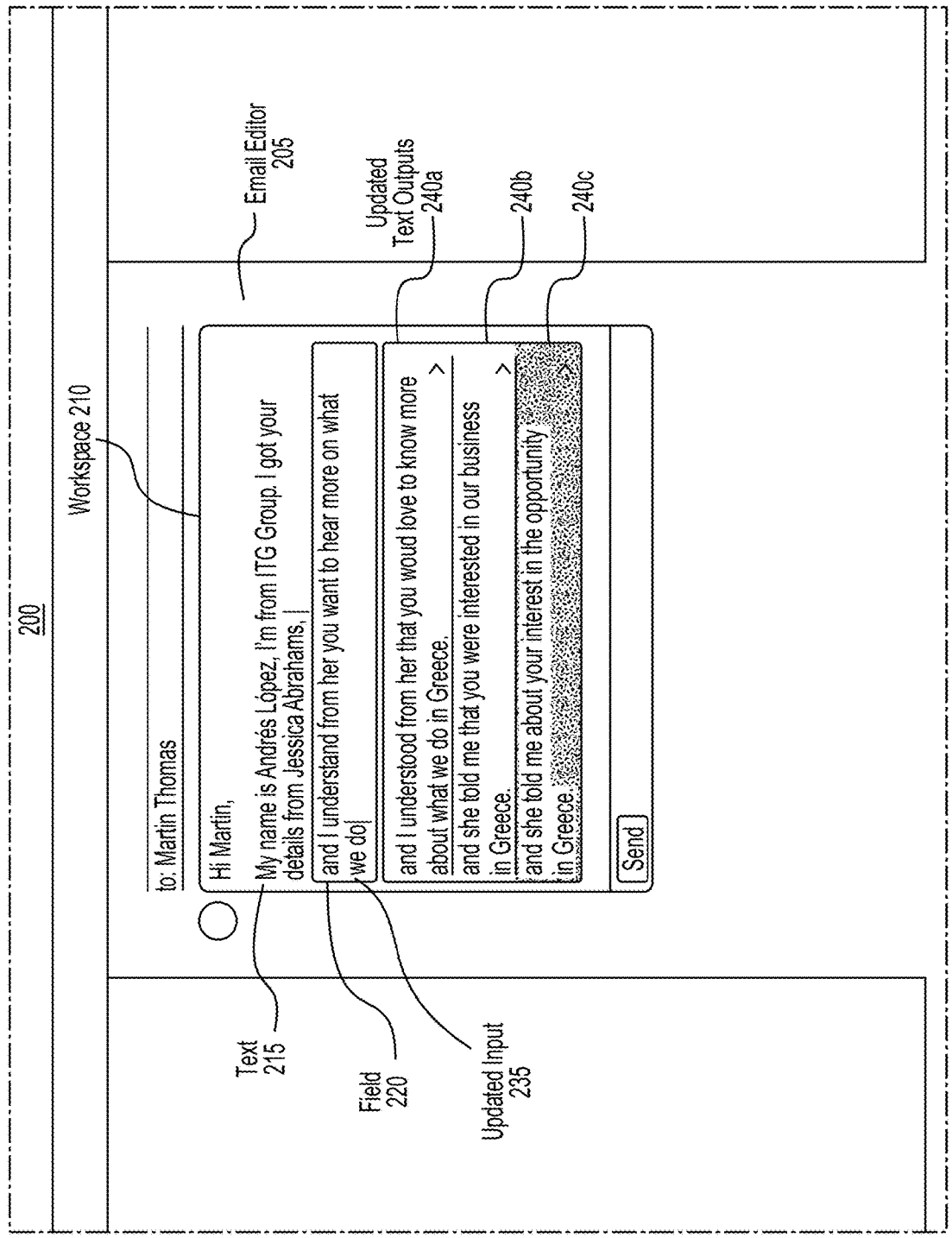
Figure 2I:
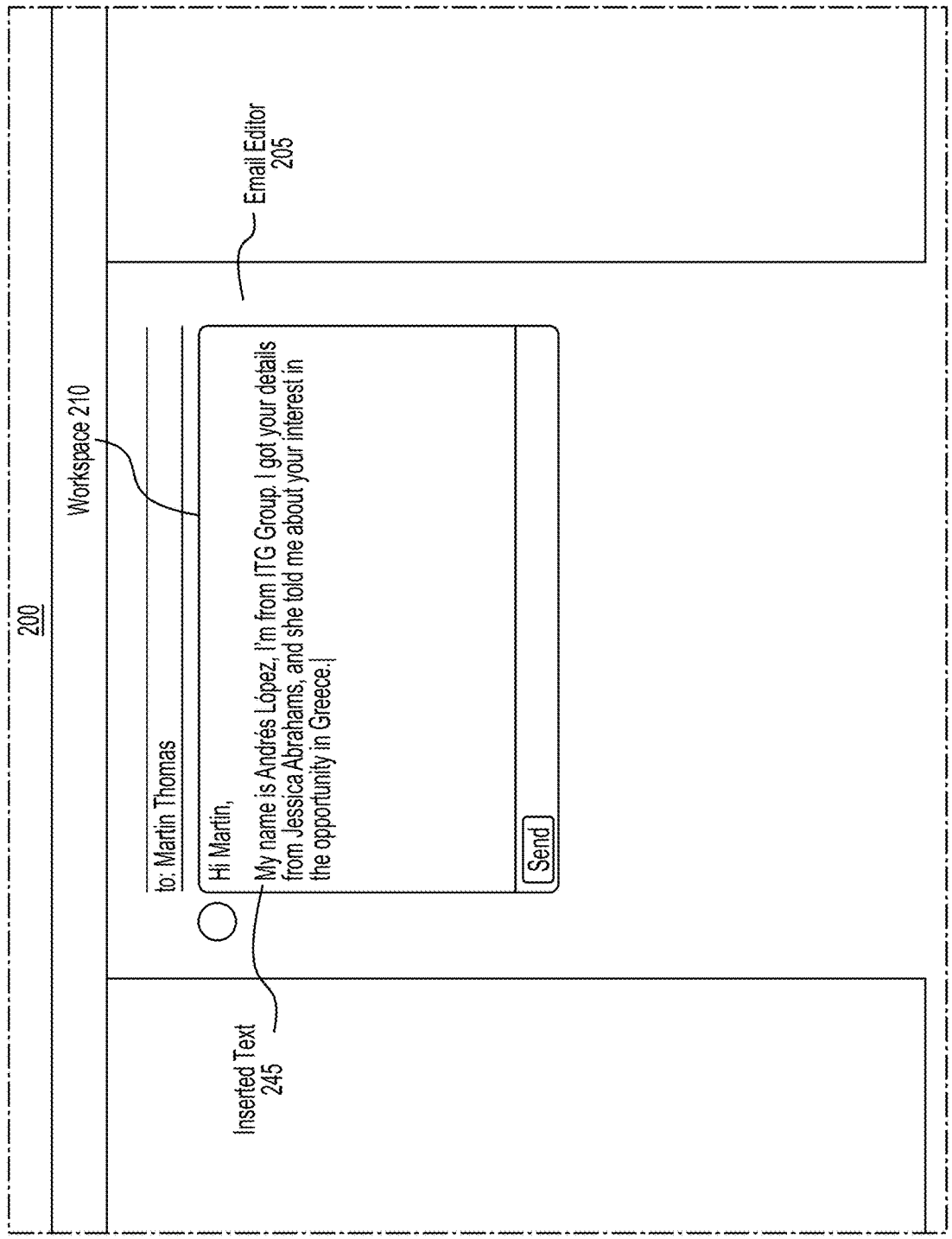
Figure 2J:
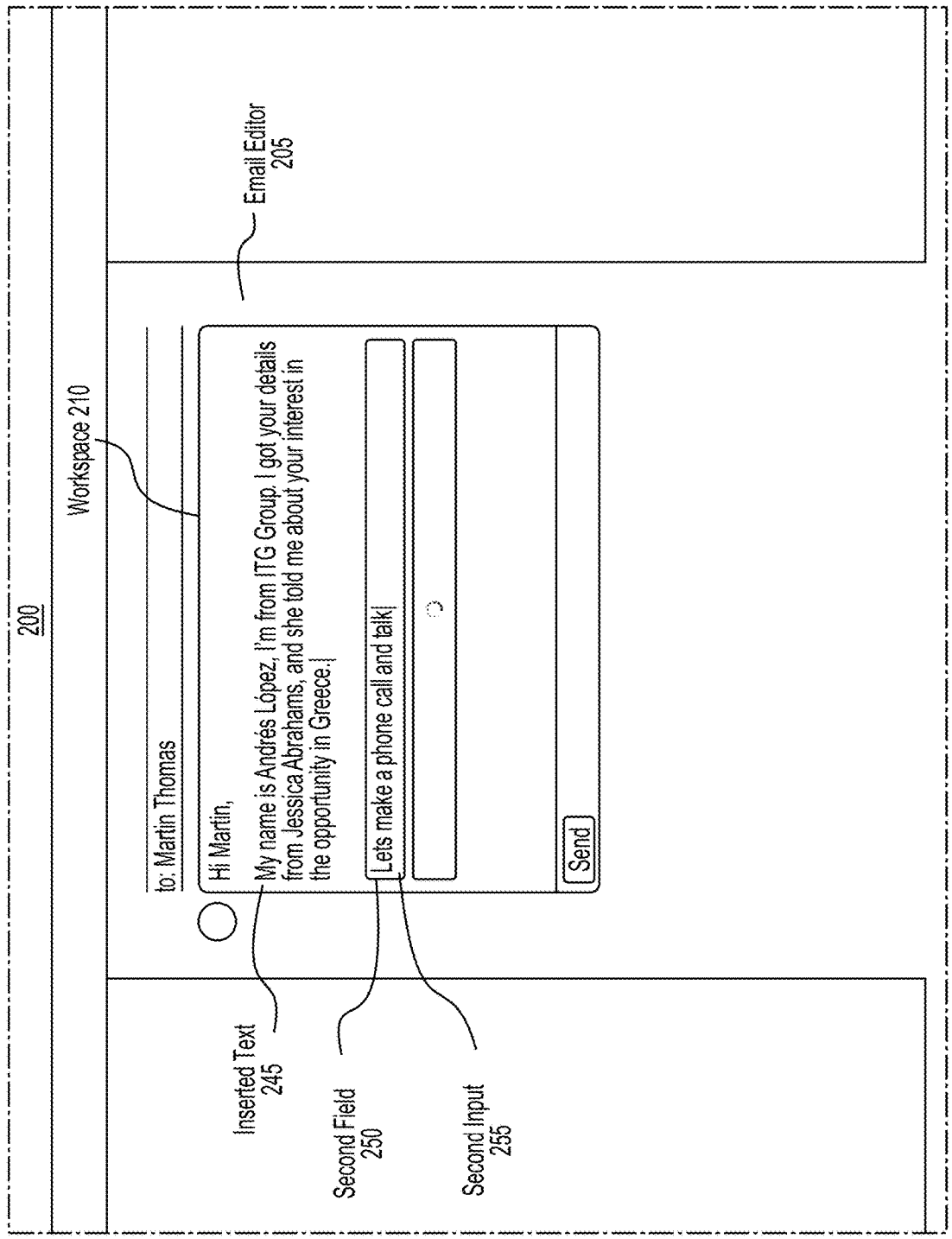
Figure 2K:
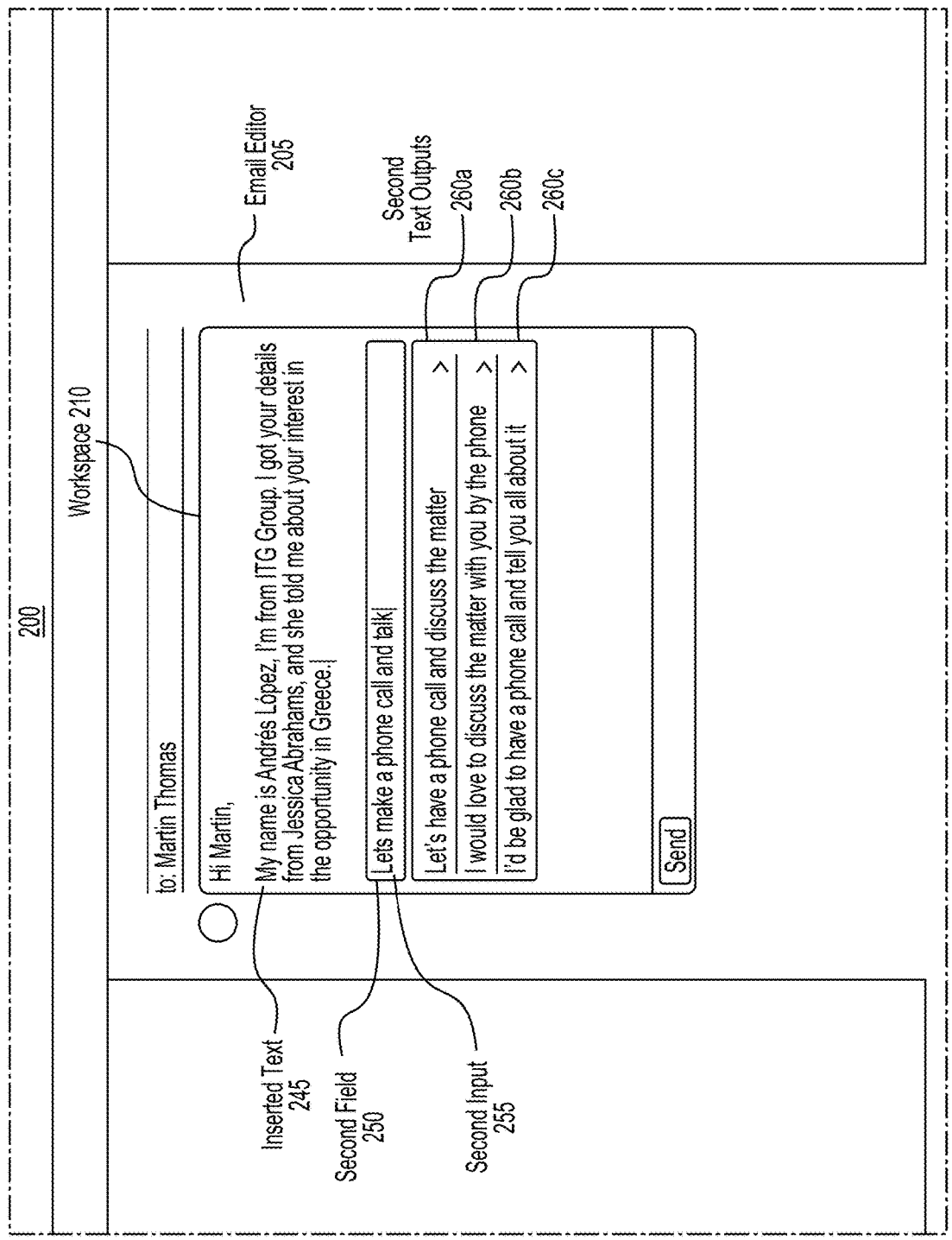
Figure 2I:
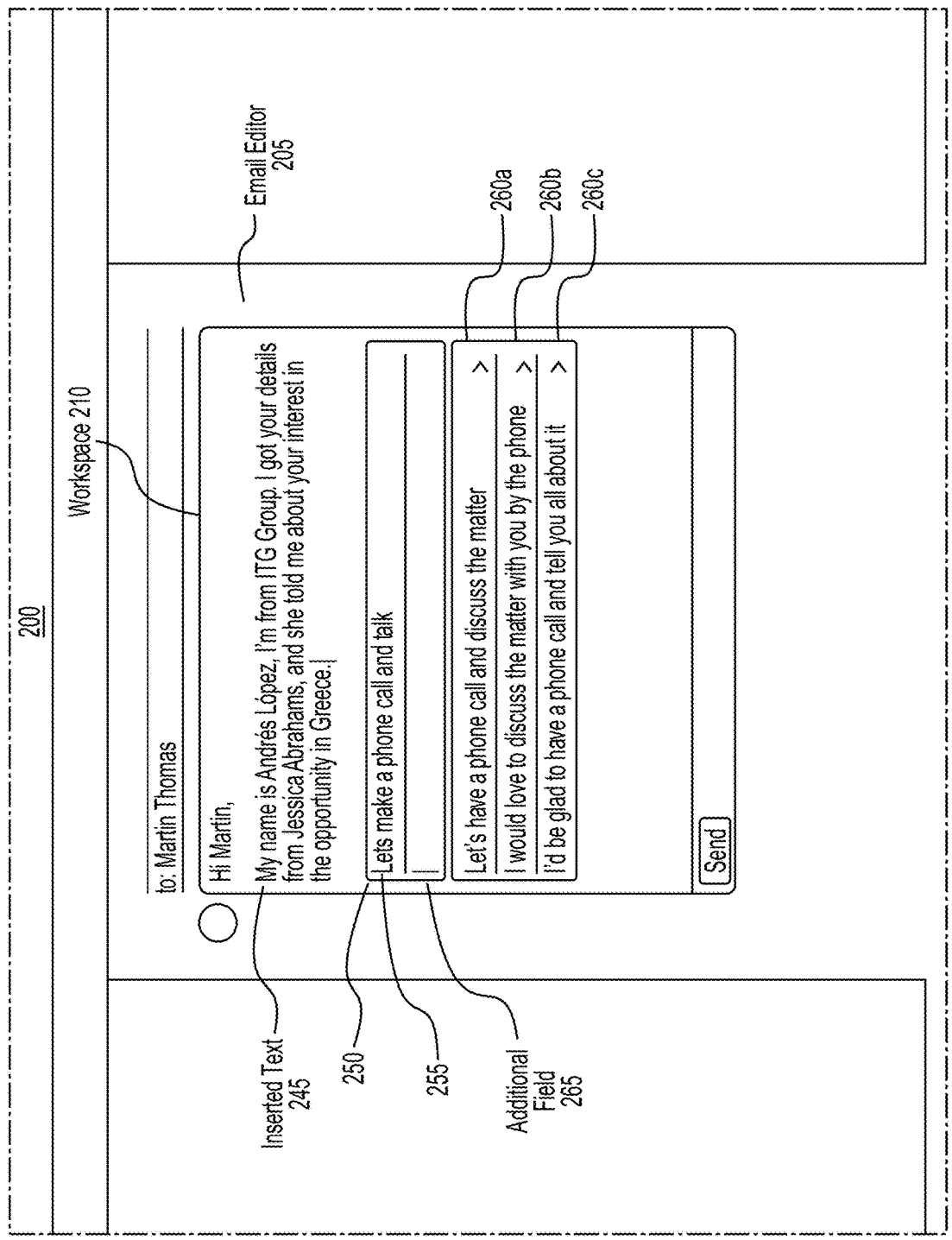
Figure 2M:
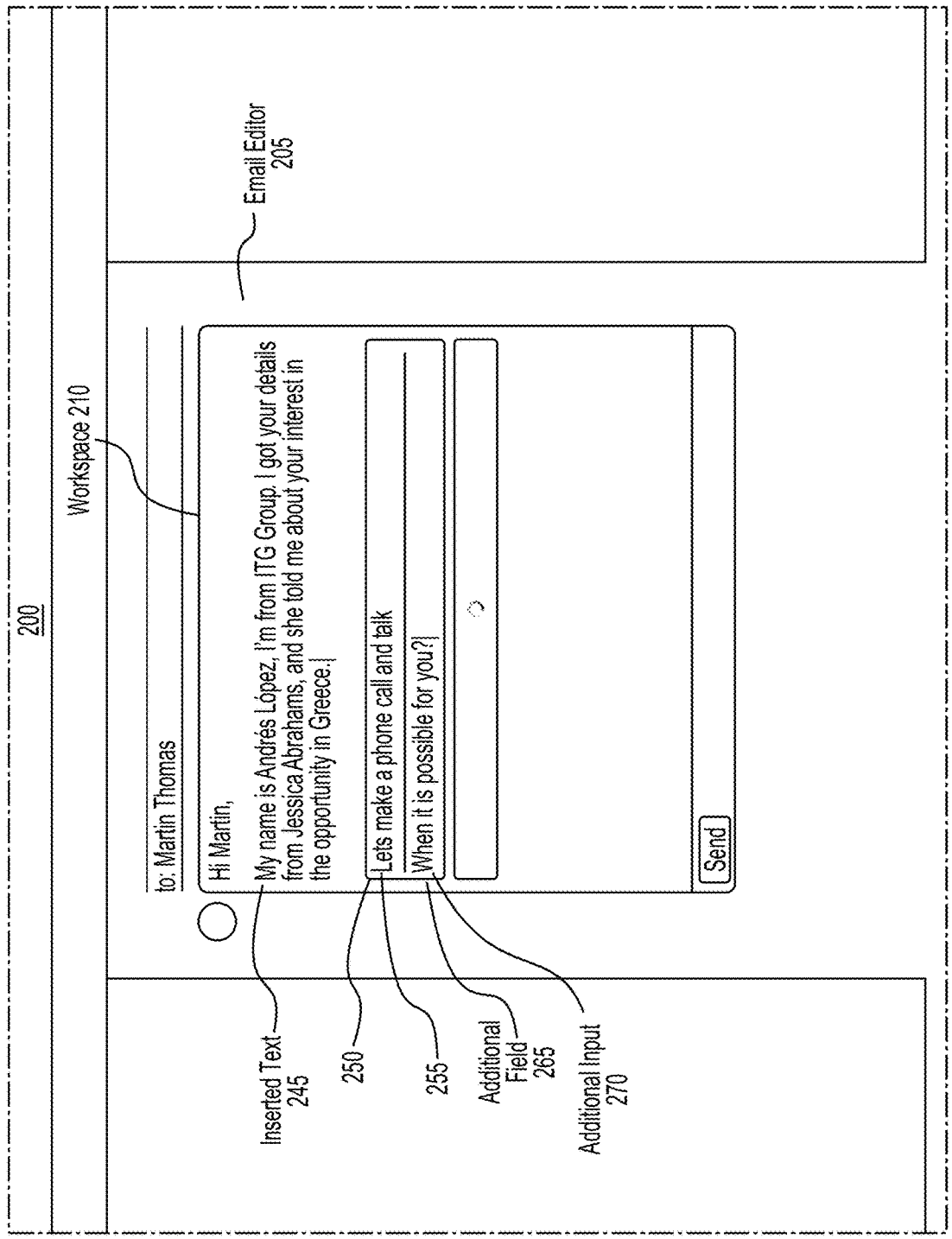
Figure 2N:
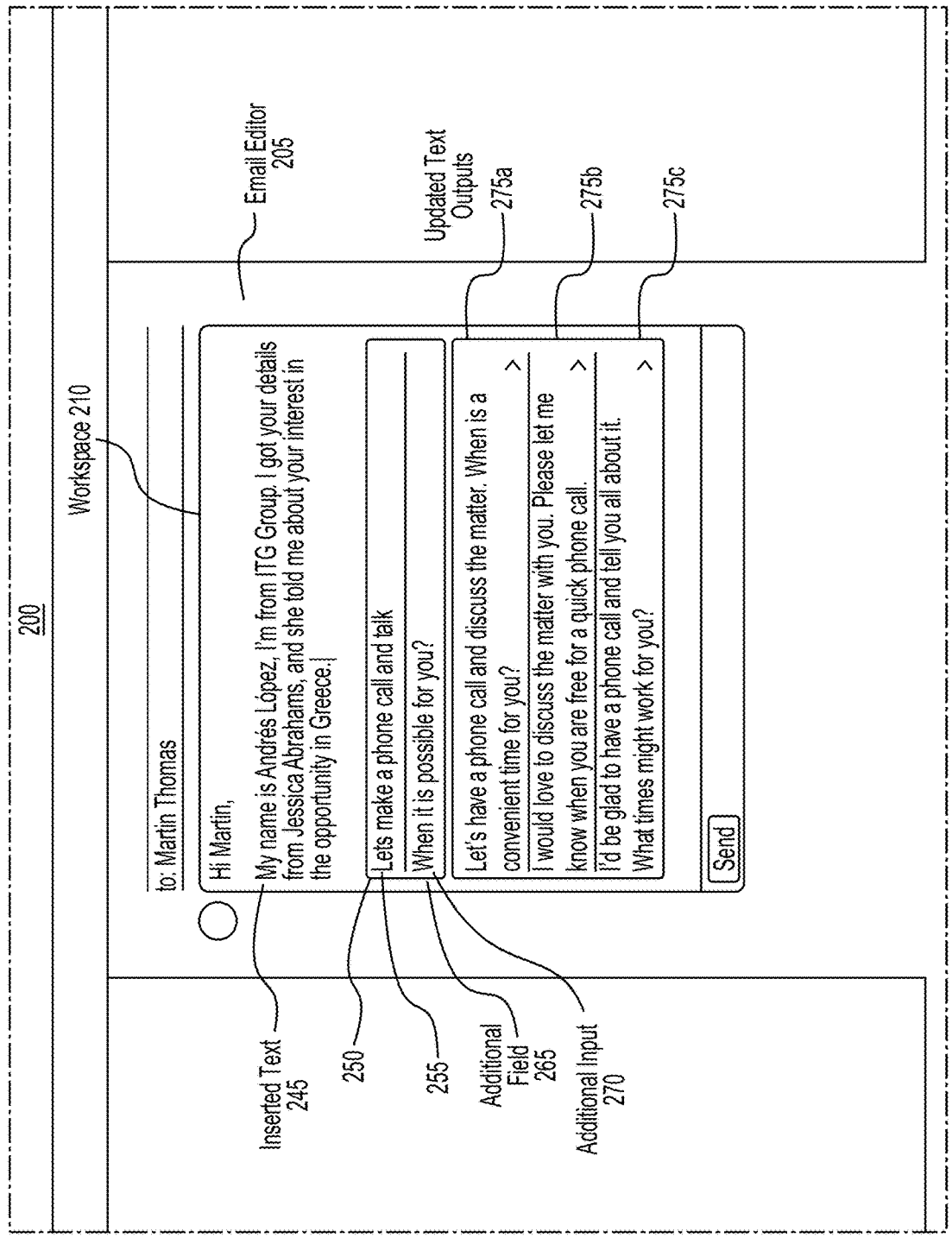
Figure 2O:
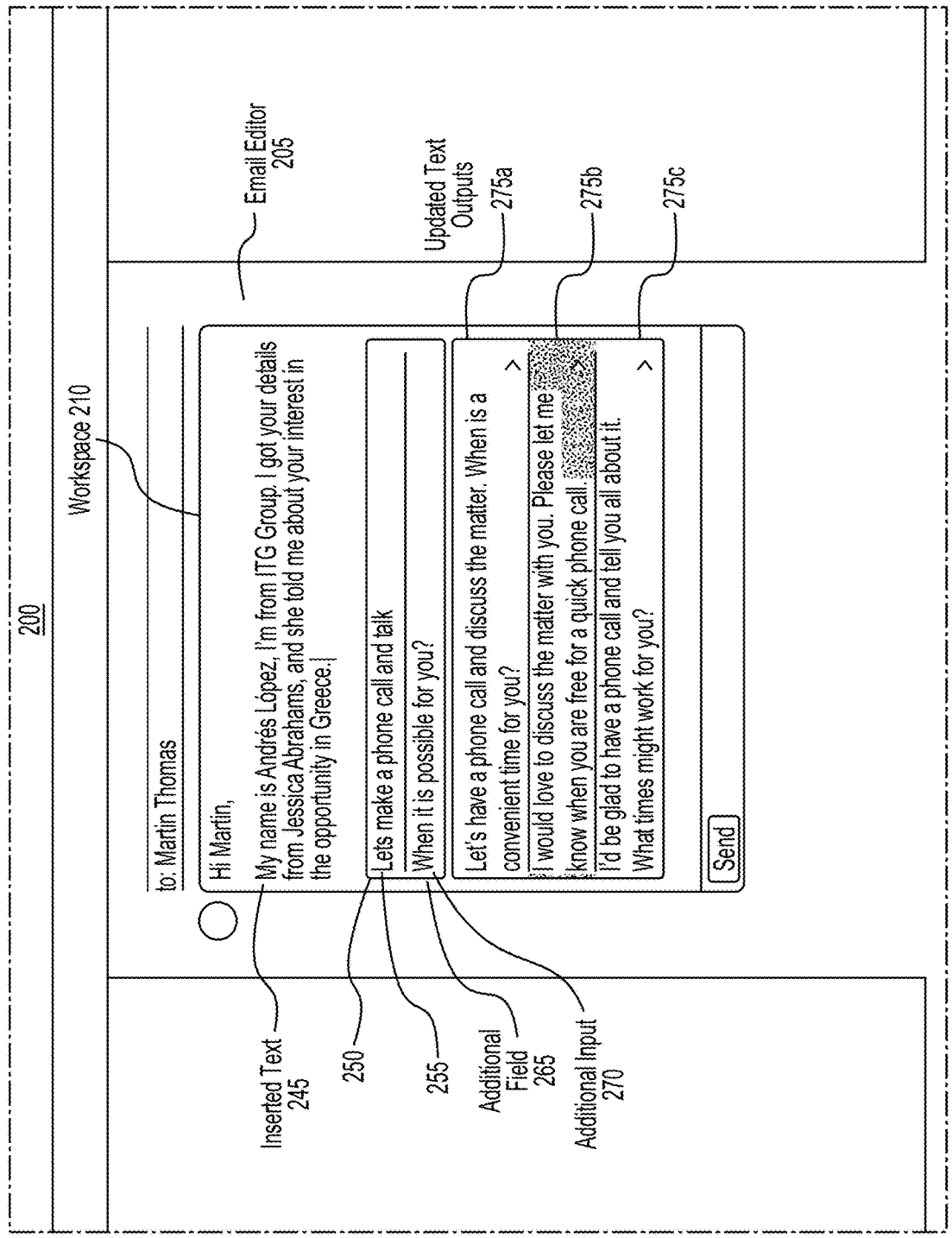
Figure 2P:
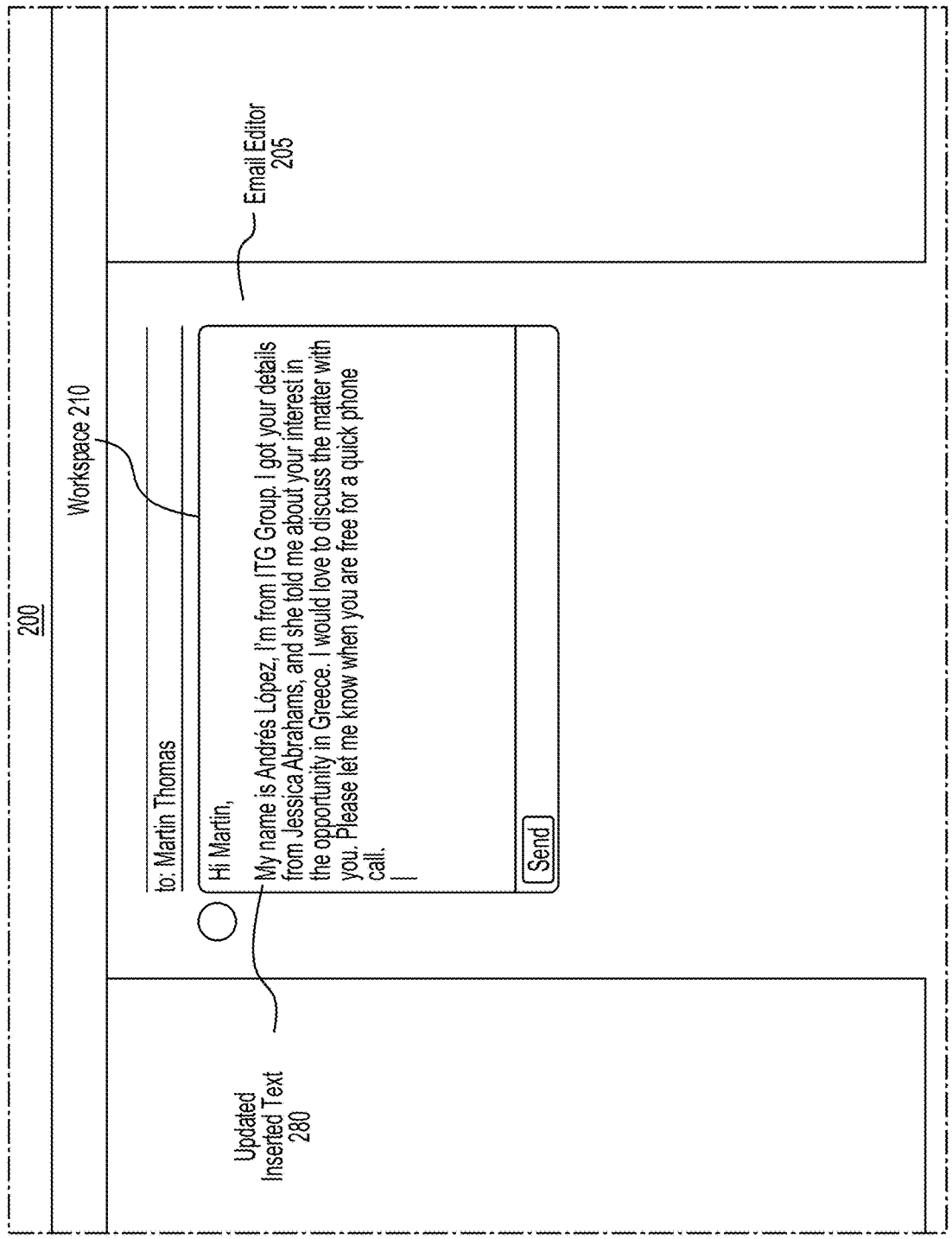

FIGS. 2a-2p show a user interface that may be included with exemplary embodiments of the disclosed writing assistant system. FIGS. 2a-2p show an exemplary GUI 200 that may be associated with certain disclosed embodiments. In the example shown starting at FIG. 2a, GUI 200 may be associated with an email application and may include an email editor GUI 205, which in turn, may include a workspace 210. In some cases, a user may draft email text simply by entering text into workspace 210 without relying upon features of the disclosed writing assistant. In some cases, however, entering text into workspace 210 may automatically trigger certain functionality associated with the disclosed writing assistant including, for example, the generation of text output options generated by the writing assistant as possible replacements for the text entered in workspace 210.

FIG. 2B illustrates an example in which the user enters text into workspace 210 prior to initiating the writing assistant. For example, as shown in FIG. 2B, the user has entered. "My name is Andrés López. I'm from ITG Group. I got your details from Jessica Abrahams.". In embodiments where the initiation of the writing assistant features are not automatic, the user can select a GUI element, for example, to initiate the functionality of the writing editor. Such GUI elements may include, for example, menu items, virtual buttons, icons, etc. (not shown) that the user may select via a touchscreen, using a pointing device, or in any other suitable manner.

FIG. 2c shows an example user input field 220 that may be presented on the GUI in response to initiation of the writing assistant by the user. For example, a user can summon field 220 in the writing assistant, where field 220 is configured to receive text input from the user in the form of characters, words, sentence fragments, phrases, sentences, paragraphs, punctuation, etc. As shown in FIG. 2d, a user can type input 225 into the field 220 (such as "and I understand from her"). In response to user input provided to field 220 by the user, the writing assistant can generate various text output options as possible replacements for the input received at field 220.

For example, as shown in FIG. 2e, in response to receiving the user input, "and I understand from her." the writing assistant can generate one or more text output options, such as text outputs 230a-230c, that convey a meaning or information associated with the user input, but may use different words relative to input 225.

The generated text output option(s) may be provided to the user in any suitable format. In some cases, the generated text output options may be provided to the user via output fields 230a-230c as shown in FIG. 2c. Each of the provided text output options may appear in an individual field 230a. 230b, or 230c, for example. The individual fields may be individually selectable and may provide the user with an option to select from among the provided text output options for substitution into the draft document in place of the text entered in field 220. For example, the selected text output option may be appended to text 215.

As shown in FIG. 2e, the writing assistant can generate multiple output options that each differ from one another. Despite the differences, however, all convey the idea associated with the user input (e.g., that Jessica Abrahams conveyed information to the user, Andres Lopez). Additionally, the text output options all agree with one or more contextual aspects of the preexisting text (a partial sentence) in workspace 210. For example, the phrase "and I understood from her" is similar to the input, but changes "understand" to "understood" for consistency with the tense of the preexisting text (i.e., the word "got" appears in the past tense in text 215). This phrase also indicates that the writing assistant detected that Jessica Abrahams is a female either based on the user input, on the preexisting text 215, or a combination of both. As a result, the writing assistant substituted the pronoun "her" for the name of the person that gave Martin's details to Andres Lopez. Option 2 (i.e . . . "and she told me"), while including different words from Option 1, conveys a similar meaning and replaces Jessica Abrahams with the pronoun "she" to indicate a recognition that Ms. Abrahams is female in agreement with the preexisting text. Option 3 includes yet another organization of words conveying a similar meaning as the user input and also showing agreement with the context of the preexisting text by substituting Jessica Abrahams with the pronoun "she." Options 2 and 3 also use the past tense in agreement with the preexisting text, despite the use of the present tense in the user input. Notably, while option 1 (field 230a) uses the phrase "understood from her." which is similar to the words appearing the user input, options 2 (field 230b) and 3 (field 230c) include very different words, but still convey a similar meaning as the user input. That is, option 2 includes the phrase "she told me." and option 3 includes the phrase "she said to me." which both indicate that Jessica Abrahams conveyed information to Andres López. While the phrases in options 2 and 3 are not synonymous with the phrase in option 1 or with the user input, they all convey similar meanings, especially when considering that speaking is a primary form of communication and one often associated with a characterization of whether a recipient of spoken words understands what the words of the speaker conveys to the recipient.

In some embodiments, the text output options are not static, but rather, can be updated as a user continues to provide input to field 220, for example. In FIG. 2f, the user types updated input 235 that adds the phrase "you want to hear more on what we do" to the originally entered user input. "and I understand from her." In response to receiving the updated user input, as shown in FIG. 2g, the writing assistant will generate a set of updated text output options 240a-240c, which may or may not include the originally generated text output options. In the example shown in FIG. 2g, the writing assistant generates the output option "and I understood from her that you would love to know more about what we do in Greece" (field 240a). In addition to changing "understand" to "understood" for consistency with the tense of the preexisting text, the writing assistant changes "you want to hear more" to "you would love to know more." which indicates that the writing assistant detected the context of the additional text and suggested, among several changes, using "love to know" instead of "want to hear" in this context. This is an example of the writing assistant's ability to use a word or phrase that conveys a similar meaning in the particular context of the user input despite the words/phrases used in the text output option not being recognized synonyms for the words/phrases of the user input. In some cases, however, the writing assistant can also offer text output options that include words that are recognized as synonyms to words of the user input (e.g., word pairs that may be found in a standard thesaurus, such as the Historical Thesaurus of the Oxford English Dictionary).

Returning to FIG. 2g, option 2 (i.e., "and she told me that you were interested in our business in Greece") 240b also conveys a similar meaning to the user input, but uses a different phrase (i.e., "that you were interested in") from the input or the other text output options. Option 3 (i.e . . . "and she told me about your interest in the opportunity in Greece") 240c, again, conveys a similar meaning but with a different phrase (i.e., "about your interest in").

Notably, all three options reference the detail that the activities are occurring in Greece, despite there being no reference to Greece in either the user input in field 220 or in the preexisting text 215. For example, the writing assistant, as evidenced by the text output options, was able to determine that ITG Group is a real estate group operating in Greece. The writing assistant is able to pull contextual information not only from the words of the user input and/or the words of the preexisting text, but also from other available sources of information (e.g., Internet-accessible databases, among others). The feature is discussed in depth later in this disclosure.

Once the text output options provide the user with suitable text, the user can select one of the text options. For example, a user may select text output 240c, as shown in FIG. 2h. In response, as shown in FIG. 2i, the writing assistant can insert the user-selected text output option 240c into the workspace 210 with the initial text 215, creating a coherent and context fitting paragraph (e.g., inserted text 245).

The drafting process can continue with the user entering additional user input (e.g., via a second field 250, which may be a newly displayed field or a continuation of user input field 220), as shown in FIG. 2*j*. Similar to the description above, the writing assistant can use the inserted text 245 (e.g., preexisting text) and additional input included in field 250 to generate additional context-fitting text output options. As shown in FIG. 2*j*, after the inserted text 245 is inserted into workspace 210, the user can summon a second field 250 (e.g., a window, text box, etc.) that may be visible when the writing assistant is active and not visible when the writing assistant is inactive. As noted, in some cases, field 250 may be the same as field 220. Or, in some cases, field 250 may appear if the user hovers over a predetermined region of the GUI in order to activate field 220/250. In the embodiment of FIG. 2*j*, the user may provide second input 255 into second field 250. The user input may include a collection of words (e.g., one or more words, phrases, etc.) that convey at least one idea or piece of information. The collection of words may include a word, a sentence fragment, a complete sentence, or clauses that can each convey a unique idea. The collection of words may also identify a subject and at least one attribute of the subject, for example, a name of person, a name of an organization, a time associated with an event, a name of a place, or a place associated with an event. The subject itself may identify an entity that is a person, a place, a thing, an organization, a corporation, an event, or some other appropriate identifier.

In response to input received from the user (e.g., text entered into second field 250), the writing assistant may generate any number of text output options and may provide those text output options in one or more second text output fields 260*a*-260*c*, as shown in FIG. 2*k*. In some cases, the assistant may generate one text output option in response to the user input. In other cases, two or more text output options may be provided, where the two or more text output options each express at least one idea and where the text output options differ from one another in at least one respect. Offering multiple text output options may enable the user to select the generated text output option that most closely conveys an intended idea or that most closely fits with the context of the document.

As shown in FIG. 2*j*, a user may begin to type a second input 255 in a second field 250 ("Lets make a phone call and talk"). The writing assistant, as shown in FIG. 2*k*, may generate second text outputs 260*a*-260*c* that, like the text outputs described above, are intended to convey the same meaning as the user input, but with well-written, context-fitting text. But, instead of choosing a second text output, a user may, as shown in FIG. 2*l*, prompt the generation/display of an additional field 265. As shown in FIG. 2*m*, a user could enter additional input 270 in the additional field 265 ("When it is possible for you?"). In response, the writing assistant may generate updated text output options 275*a*-275*c* (FIG. 2*n*) that take into account the information from inserted, preexisting text 245, second input 255, and the additional input 270. As shown in FIG. 2*o*, the user can select any of the generated text output options included in fields 275*a*-*c*. It should be noted that text output options included in fields 275*a*-*c* may have been generated as the user began entering text input into field 250, and the writing assistant may have updated the text output options one, two, or more times as the user continued entering text into field 250 and further as the user entered text into field 265.

In the example shown, the user selects text output option 275*b* (FIG. 2*o*), and as shown in FIG. 2*p*, the writing assistant may automatically insert the selected text output 275*b* into the workspace 210, creating a well-written, grammatically correct email (i.e., updated inserted text 280). In some cases, the use of two different input fields 250 and 265 may indicate to the writing assistant that two different sentences are intended, and, as a result, the text output options may be presented with multiple sentences (e.g., each corresponding to the concepts conveyed in a separate user input field).

Figure 3A:
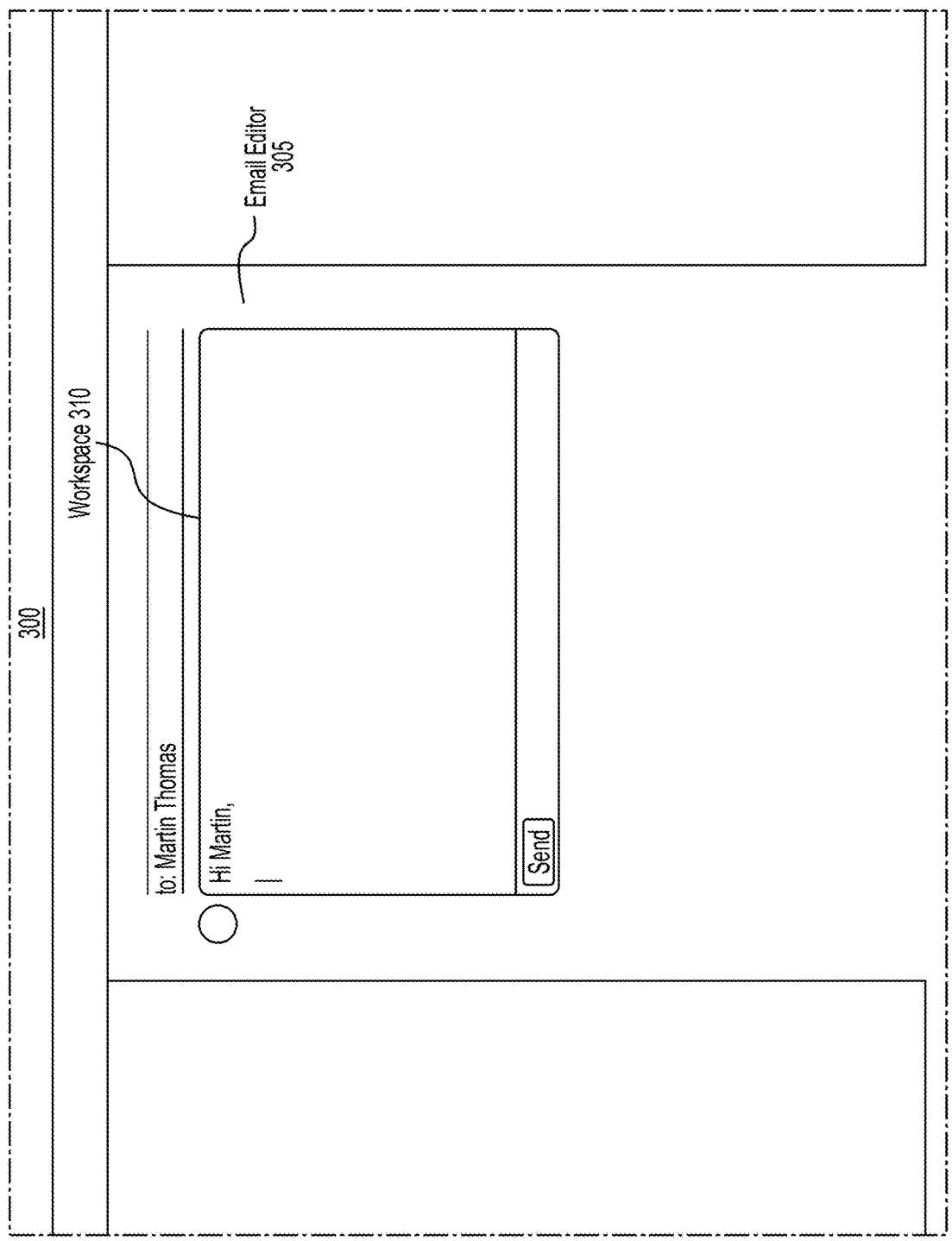
Figure 3B:
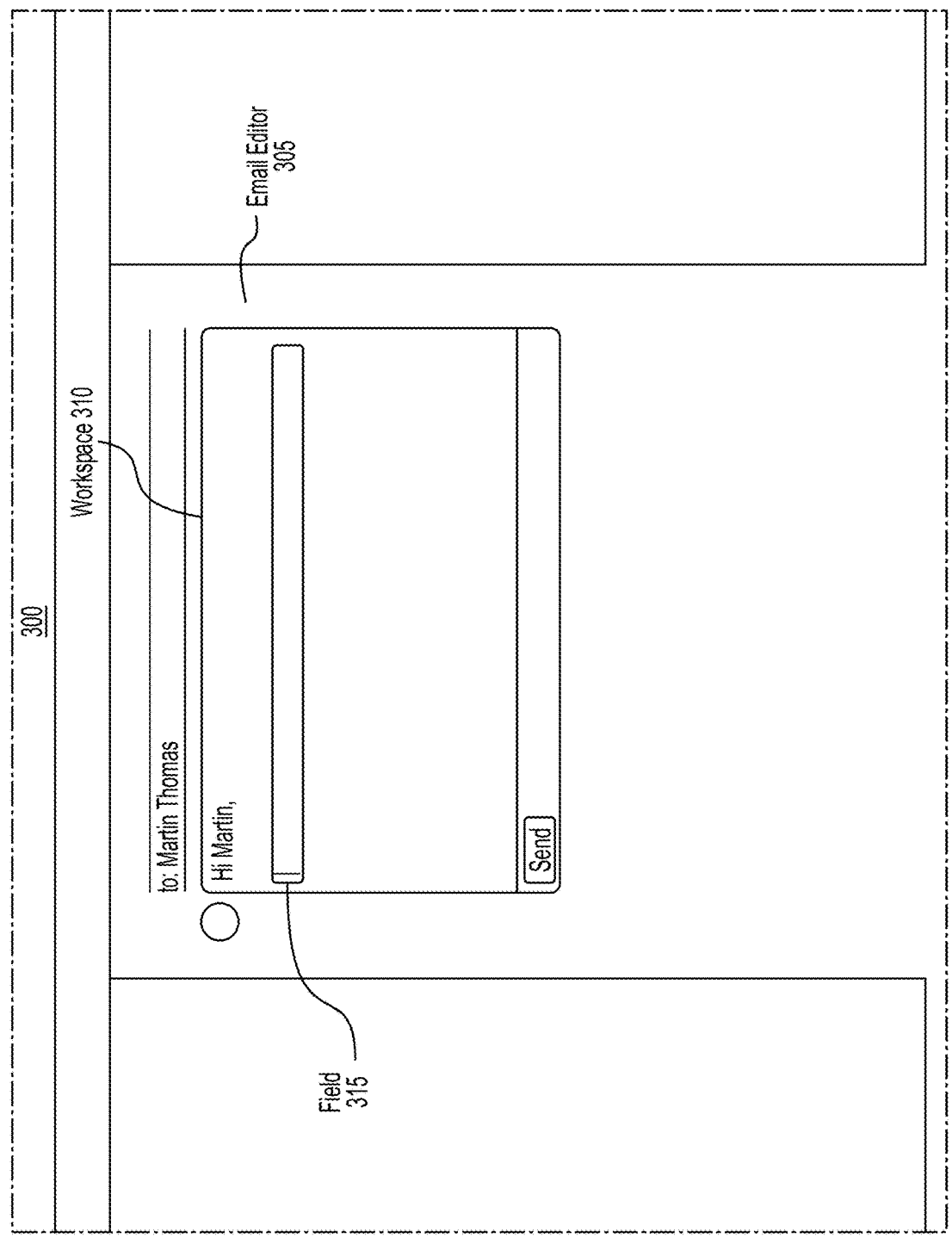
Figure 3C:
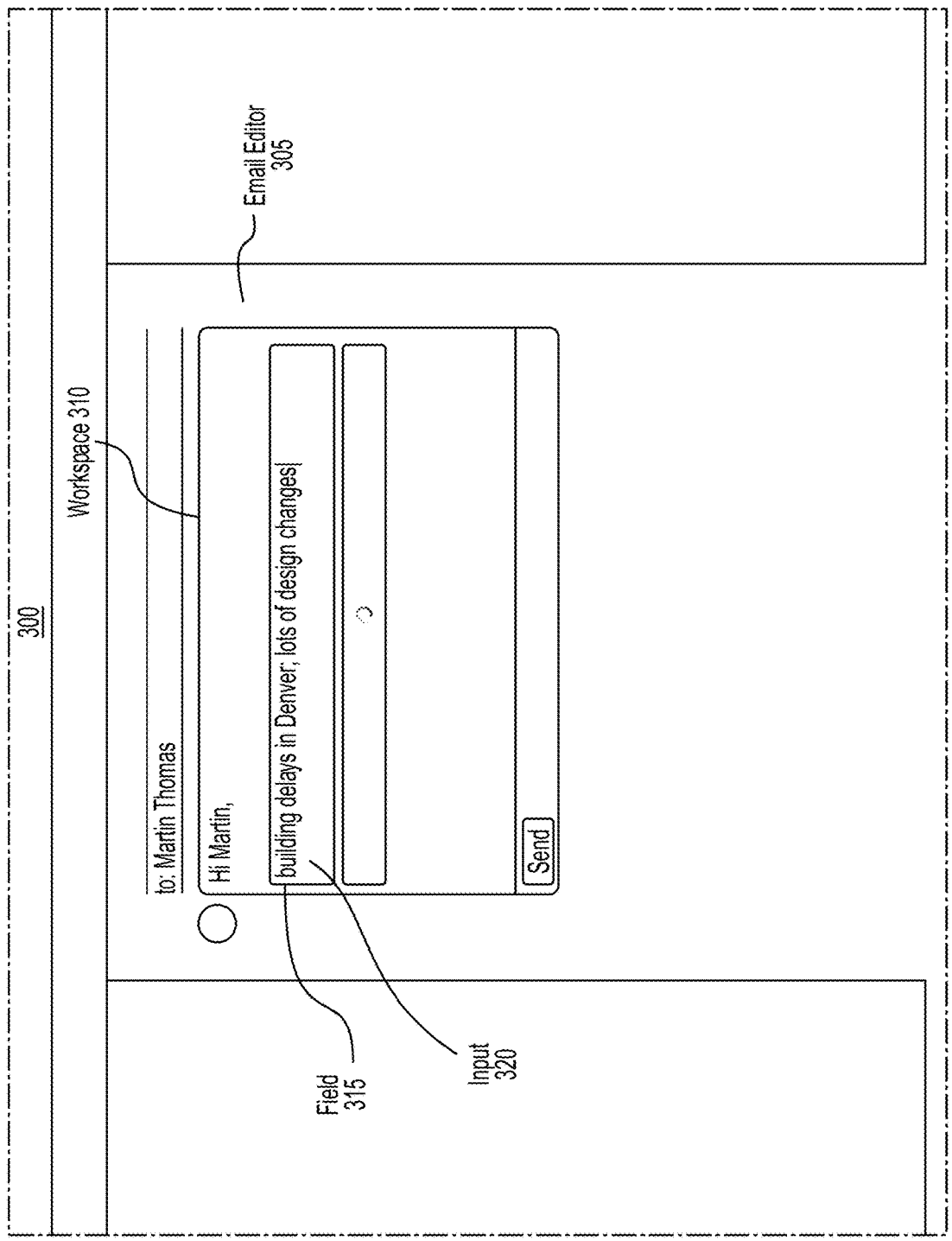
Figure 3D:
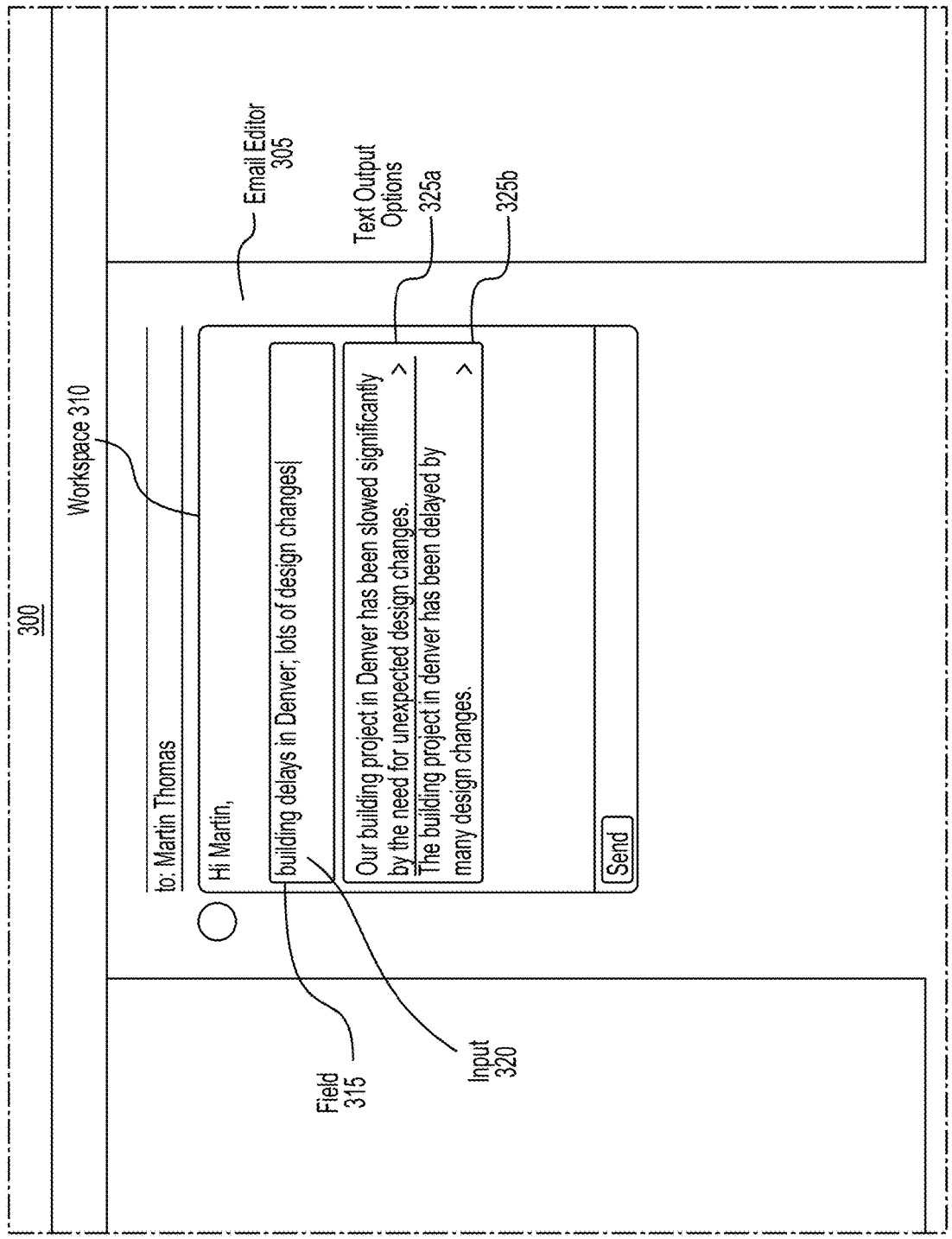
Figure 3E:
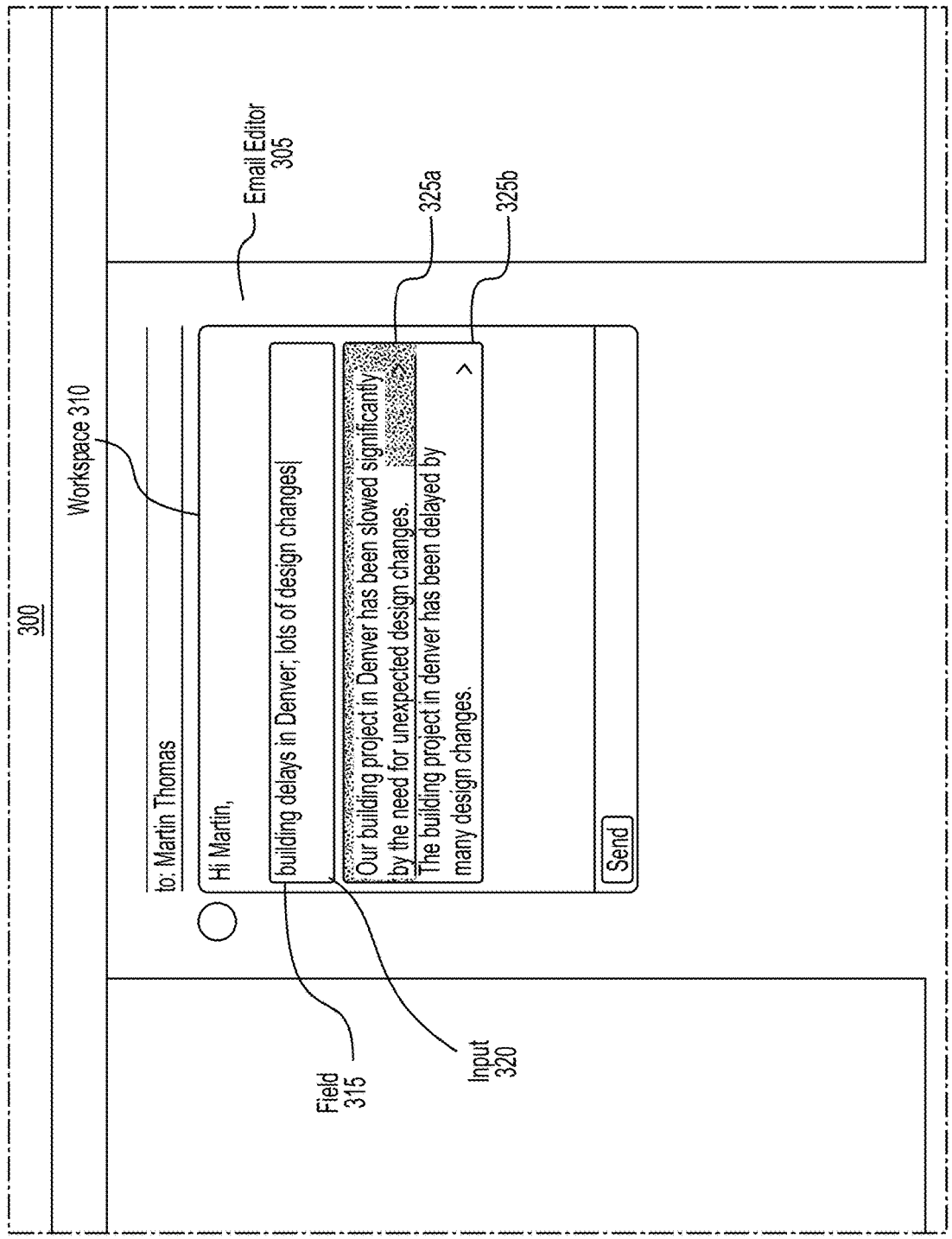
Figure 3F:
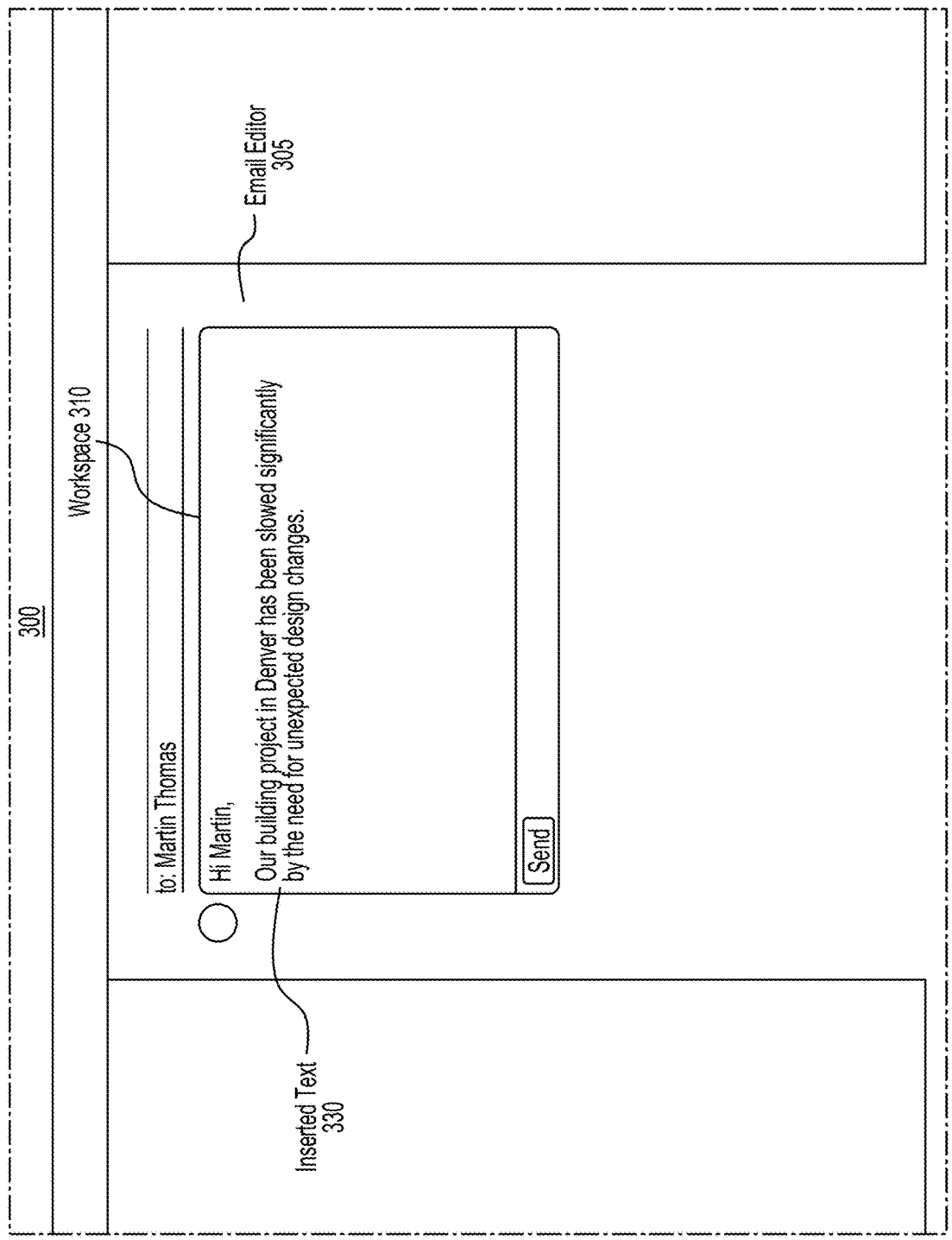

In addition to text output options that include phrases or sentence fragments, as shown in FIG. 2*e*, the disclosed writing assistant system can provide text output options in various other forms. In some cases, based on the received user input, the writing assistant can automatically construct multiple text output options that each express at least one idea associated with the received user input and where the text output options are provided in the form of complete sentences, multiple complete sentences, full paragraphs, multiple paragraphs, etc. For example, as shown in FIGS. 3*a*-3*i*, in response to received user input, the disclosed writing assistant may generate one or more text output options in the form of complete sentences that may convey an idea or information attributed to the received user input. The complete sentence options, as with other text output options of the disclosed writing assistant, may also agree with one or more contextual aspects of the received user input or other relevant text (e.g., preexisting text in a document being drafted by the user). For example, GUI 300 may be associated with an email editor 305 (or stand-alone writing assistant application or any other computer application that allows for text entry) and may include a workspace 310. As shown in FIG. 3*b*, a user can summon a field 315 in the writing assistant (e.g., by initiating typing in workspace 310, positioning a cursor relative to workspace 310, hovering a cursor over a designated area associated with the GUI, selecting a menu item associated with the writing assistant, clicking on a virtual button to initiate the writing assistant, or any other suitable technique for initiating the writing assistant application). Similar to the example above, the writing assistant may function relative to text the user enters directly into workspace 310 and/or may function in response to text entered by the user into input field 315, as shown in FIG. 3*b*. As shown in FIG. 3*c*, a user can enter text input 320 into field 315. Text input 320, provided in field 315, for example, may include one or more words, phrases, sentence fragments, sentences, clauses etc. with which the user may use to convey ideas, information, and/or to indicate context, etc. In the example shown in FIG. 3*c*, text input 320 includes the phrases, "building delays in Denver: lots of design changes." As shown in FIG. 3*d*, the writing assistant create full-sentence text outputs options 325*a* and 325*b* based on these inputted phrases included in text input 320. While two text output options are shown in FIG. 3*d*, the disclosed writing assistant may generate more or fewer text output options. As shown in FIG. 3*e*, the user can select from among the generated text output option. In this case, the user selects the text output option 325*a*, which reads, "Our building project in Denver has been slowed significantly by the need for unexpected design changes." Next, as shown in FIG. 3*f*, the writing assistant can insert the selected text output option into workspace 310 as inserted text 330.

Figure 3G:
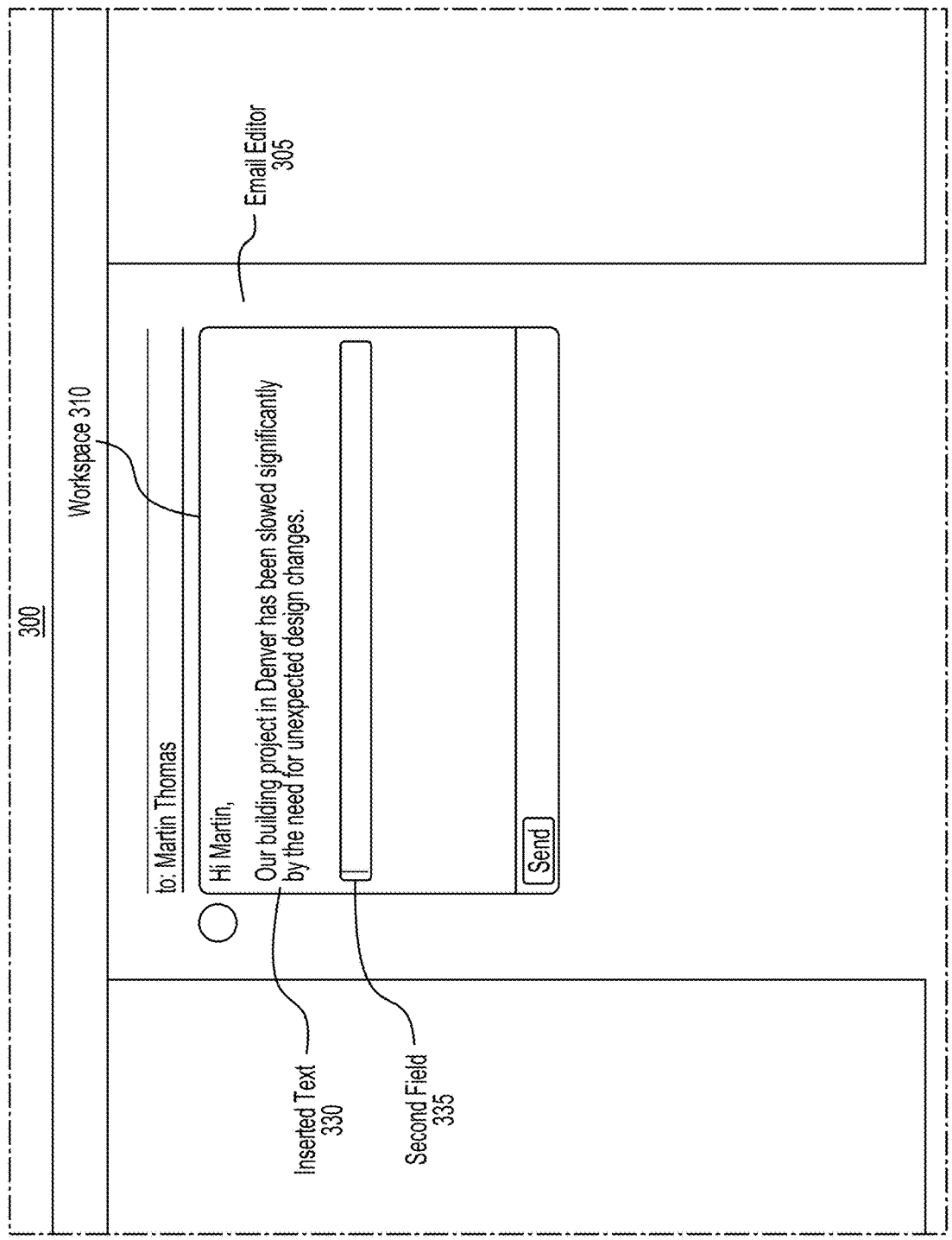

This drafting process, augmented by the writing assistant application may continue as long as the user has additional concepts or information to convey. For example, as shown in FIG. 3*g*, the writing assistant GUI 300 may include a field 335 for receiving user input. As in the example described above, field 335 may constitute a newly generated field (e.g., a second field initiated by activation of a writing assistant control element). In other cases, however, field 335 may be the same as field 315, once emptied of any previous user input, such as input 320. In some cases, selection by the user of a generated text output option (e.g., one of text output options 325a or 325b) may automatically result in field 315, 335, etc. being cleared of text input by the writing assistant application in order to prepare for the entry of additional user input into field 315, 335, etc.

Figure 3H:
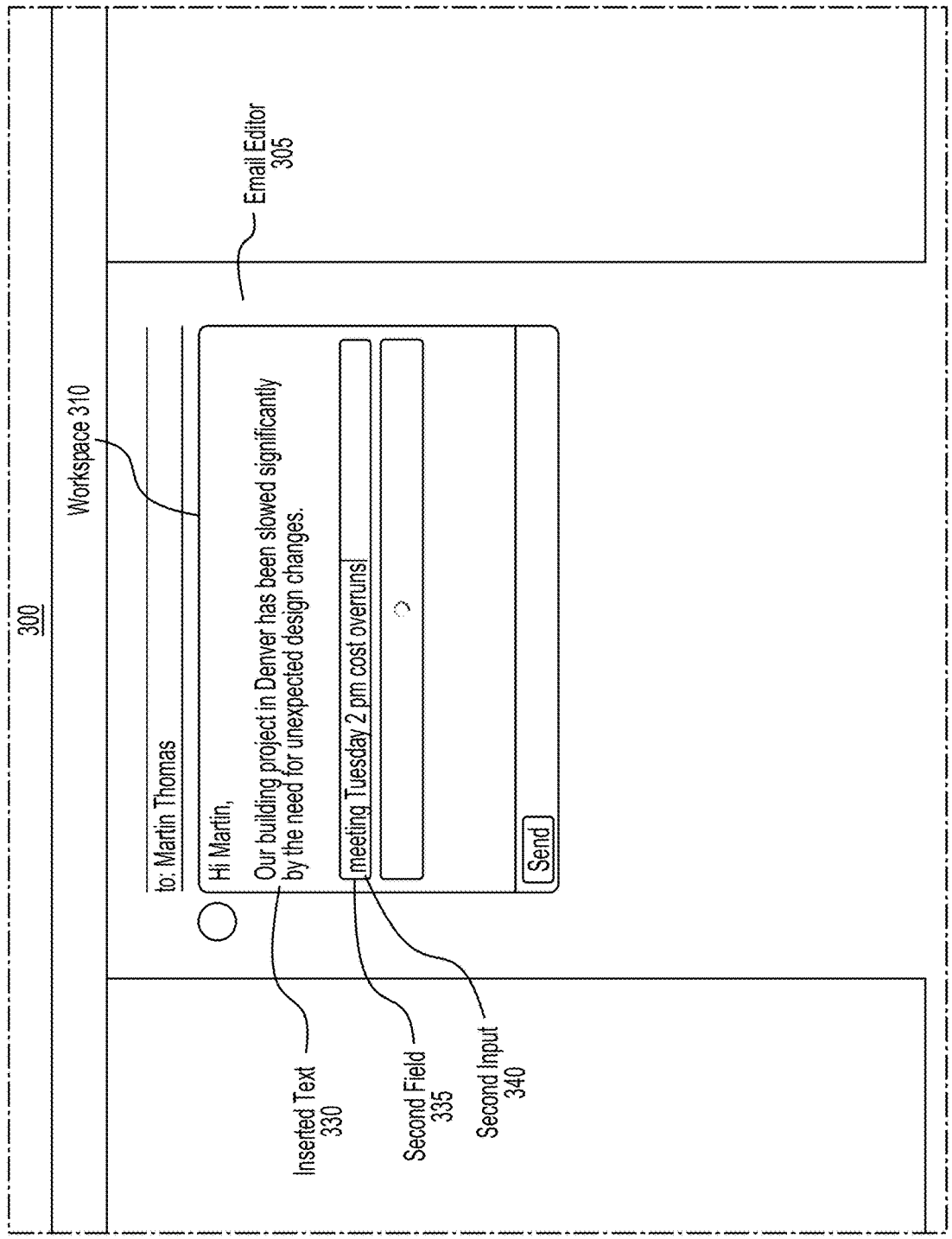
Figure 3I:
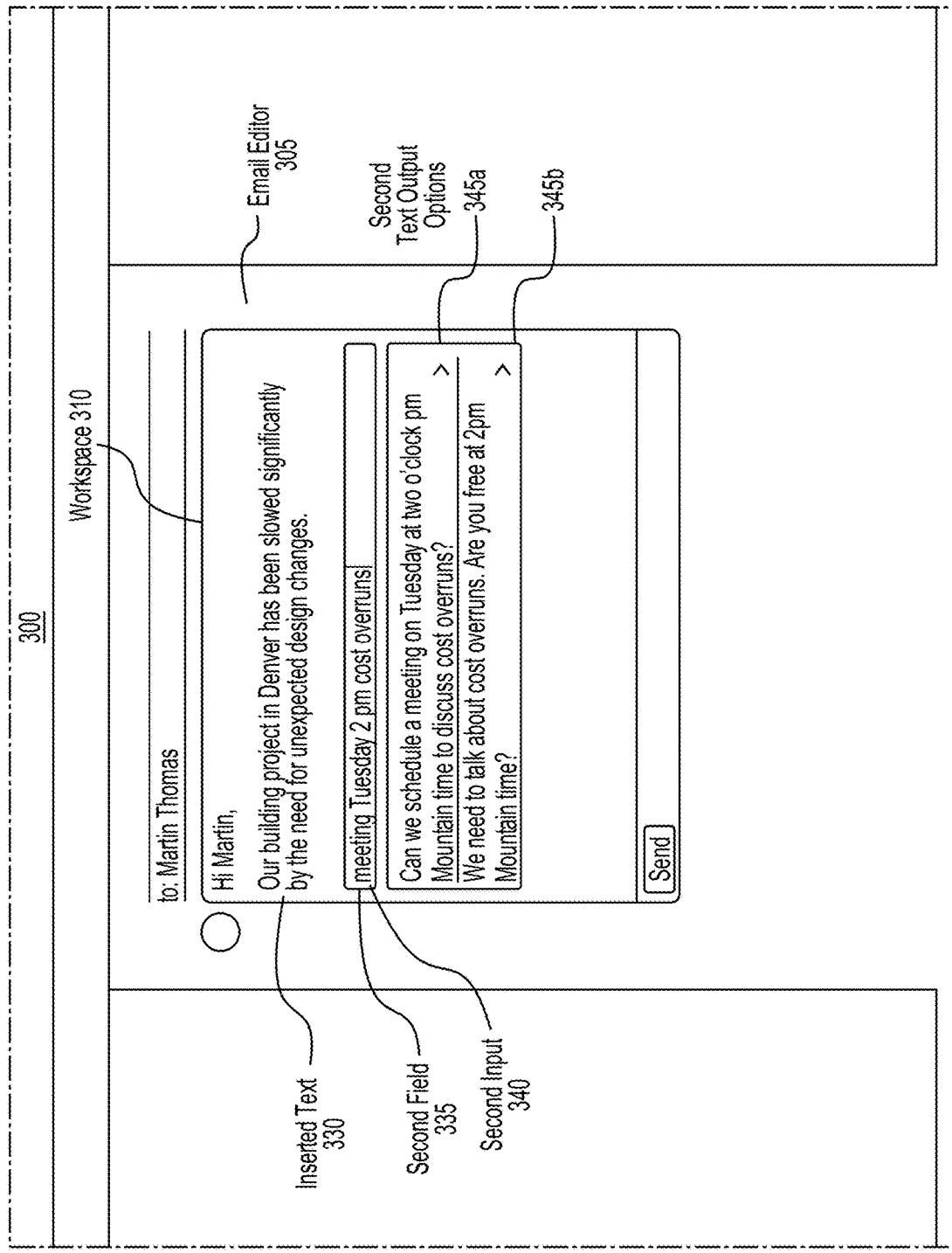

To generate a second sentence for the document, the user can provide input to field 335, and the writing assistant can generate text output options in response. As shown in FIG. 3h, the user may provide to the system, as input 340, the group of words: "meeting Tuesday 2 pm cost overruns." In response, the writing assistant may populate one or more (e.g., two or more) text output fields 345a and 345b (which may take the form of windows, text boxes, etc.) with the text output options generated by the writing assistant based on the user input 340. The writing assistant may also base the text output options upon text already existing in the document workspace 310. For example, as shown in FIG. 3i, the document being drafted includes inserted text 320 (e.g., text inserted into workspace 310 by the user's previous selection of the text appearing in field 325a) that reads, "Our building project in Denver has been slowed significantly by the need for unexpected design changes."

The writing assistant can use both the user input 340 and the inserted text 330 in generating the text output options provided in fields 345a and 345b. In some cases, contextual information may be determined by the writing assistant analyzing inserted text 330 and/or user input 340. The writing assistant may also generate the text output options to convey the same or similar ideas or information detected as included in user input 340, even where user input 340 does not include complete sentences. That is, despite not representing a complete or grammatically correct sentence or grammatically correct sentence fragment, the writing assistant can determine an idea and/or information associated with the user input 340 (in this case, that the user would like to request a meeting on Tuesday at 2 pm to discuss cost overruns associated with the building project). In response, the writing assistant can automatically generate one, two, or more complete sentence options that convey the meaning and/or information associated with the user input 340. For example, as shown in FIG. 3i, a first complete sentence options shown in field 345a may read. "Can we schedule a meeting on Tuesday at two o'clock pm Mountain time to discuss cost overruns?" Another text output option, shown in field 345b may read, "We need to talk about cost overruns. Are you free at 2 pm Mountain time?" Notably, both text output options convey the idea and information that the user is interested in a meeting at 2 pm on Tuesday regarding cost overruns. Notably, as the example of FIG. 3i shows, the writing assistant text output options may be complete sentences, despite the user input constituting less than complete sentences. Further, the text output options may include two or more complete sentence options even where the user input includes less than a single complete sentence.

As in the previous examples, the writing assistant can also generate the text output options included in fields 345a and 345b such that they agree with contextual aspects of other relevant text, such as the user input 340 and/or the inserted text 330. For example, both text output options shown in FIG. 3i, include a clarification that the time requested for the meeting is relative to the Mountain time zone. The system may include such a clarification, for example, by recognizing that the preexisting sentence related to a building project in Denver, which the system automatically recognized/determined as located in the Mountain time zone of the United States.

The text output options generated by the disclosed writing assistant systems may convey any conceivable ideas or information that may be included in or associated with a user input. For example, in some common examples, the expressed ideas of the text output options may include, but are not limited to, a time for a meeting, a request for a meeting, a purchase request, or various ideas/information conveyed by one or more entered clauses (e.g., when a delivery is expected to arrive, when a last meeting occurred, an indicator of an attribute associated with certain goods or services, among hundreds of thousands of other types of clauses).

The text options automatically generated by the writing assistant may be similar to the received user input (e.g., compare the input in field 335 of FIG. 3i to the first text output option provided in output field 345a). In other cases, however, the generated text output options, whether representing complete sentences or not, can differ significantly from the user input. In fact, in some cases, the text output options generated by the writing assistant may include none of the words from the user input and, instead, may convey the ideas, meaning, and/or information associated with the user input using entirely different words than those included in the user input.

The text output options automatically generated by the writing assistant may differ from the user input in various other ways. For example, the text output options may include a re-ordering of the subject, verb, adjectives, pronouns, or any other attributes from a collection of words associated with or included in the user input. And, as described above, the writing assistant can extract at least one higher-level attribute associated a subject associated with the user input. For example, such higher-level attributes associated with the subject may include, but are not limited to, a gender of the subject, a relation of the subject to the user, an education level indicator of the subject, or a relation of the subject to another entity. An example of this type of extraction of higher level attributes associated with the subject of a user input is shown in FIG. 1b where the writing assistant automatically determined that Jennifer Abrahams likely identifies as a female and, therefore, replaced her name in the text output options with the pronouns "her" or "she." This is a subtle, but especially powerful feature, as the text output options provided in FIG. 1b all sound more natural to a reader than if the name "Jessica Abrahams" was repeated again in the same sentence.

It should be noted that while the embodiments of FIG. 2 and FIG. 3 include fields (e.g., field 315 in FIG. 3b) for entering user input, the disclosed embodiments of the writing assistant are not limited to receiving user input via such text entry fields. Rather in some cases, and as noted above, the writing assistant may monitor text entered in workspace 210/310, for example, and may generate text output options based on text that a user may enter directly into the workspace. For example, in some cases, the writing assistant may focus on subsegments of text provided in workspace 210/310 and use those subsegments as the user input for generated text output options. Such text subsegments may include, for example, text that a user inputs in workspace 210/310 after a preceding period or other sentence ending punctuation. In other words, for each new sentence that a user wishes to include in a new document, the user may enter one or more words, sentence fragments, group of words, etc. that convey an idea, meaning, or piece of information. In response to the enter words, etc., the writing assistant can provide text output options (e.g., in the form of complete sentences, etc.) that convey a meaning, idea, and/or information of the user input and that agree with preexisting text. The user can select from among the provided options such that the selected text output option is appended to the document in place of the current user input. The user then moves on to constructing a new sentence by providing another series of words, etc. that trigger the writing assistant to generate another series of text output options associated with the newly received user input (e.g., newly entered after a period or other sentence-ending punctuation, after a carriage return, etc.). In addition to supplying user input via typed text, any other suitable input methodology may be employed for providing user input. In some cases, for example, user input may be provided via voice recognition applications.

When automatically constructing the complete sentence options (or other types of text output options), the writing assistant can use predetermined style parameter values or selected user-selected style parameter values n constructing the text output options. These style parameter values may be used to generate an initial set of text output options. Alternatively, or additionally, the writing assistant may use the style parameter values to further refine certain text output options (e.g., options selected or indicated by a user).

FIGS. 4a-4g illustrate another example of possible interaction between the writing assistant and a user during generation of text for a document. Again, an email editor 405 is shown as the environment in which the writing assistant is employed, but any other text-related computer application may also be used. In the example, of FIG. 4a, the user can summon a field 420 in a workspace 410 using any suitable technique, such as those described above. In some cases, workspace 410 may include preexisting text 415 already entered by the user (or which may already appear as part of a preexisting document, such as a Word file, etc.). As show in FIG. 4b, the user can enter text input 425 ("Thanks for the meeting with Michael") into user input field 420. In response, similar to the examples described above, the writing assistant can automatically generate text output options 430a-430c.

In this example, the text output options may be included together with various control elements, such as icons 435 and/or icons 436 in GUI 400. Such control elements may be used by the user to control various interactions with the writing assistant. For example, in order to select one of the text output options and to cause the selected text output option to be inserted into the workspace (as described in the examples above), the user may click on or otherwise select an icon 436 that corresponds with the desired text output options. In response, the writing assistant may cause the selected text output option to be inserted into the workspace.

Figure 4A:
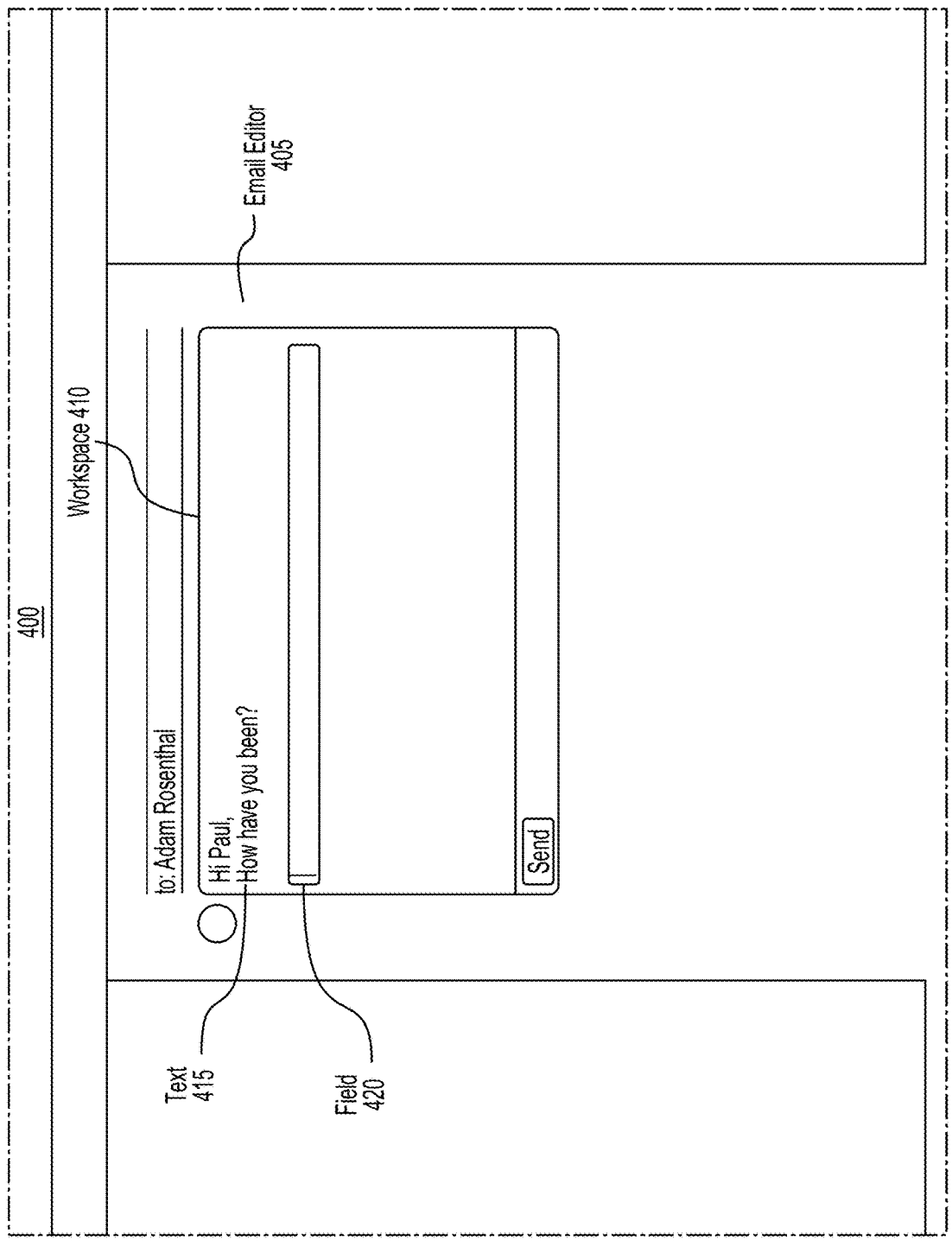
Figure 4B:
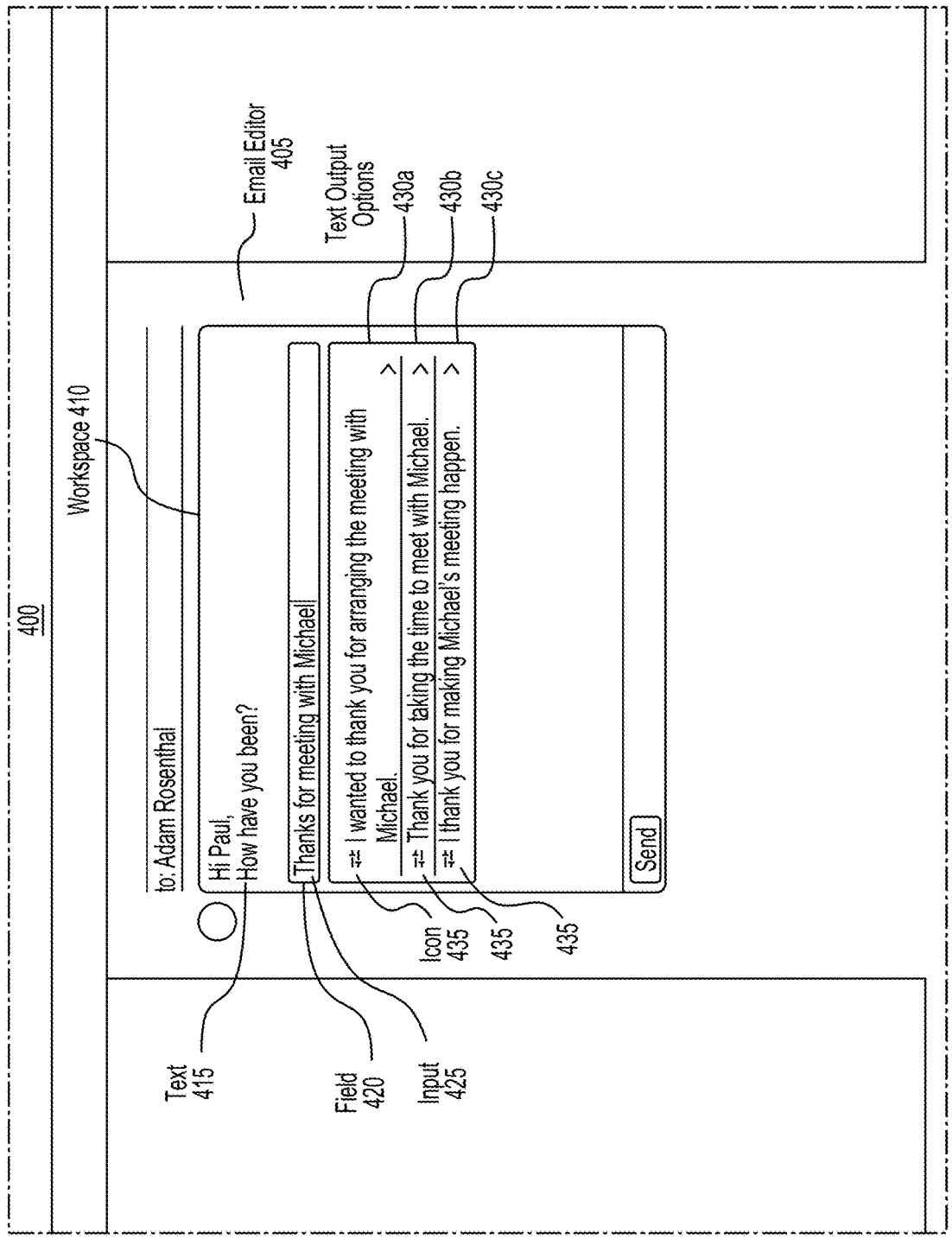
Figure 4C:
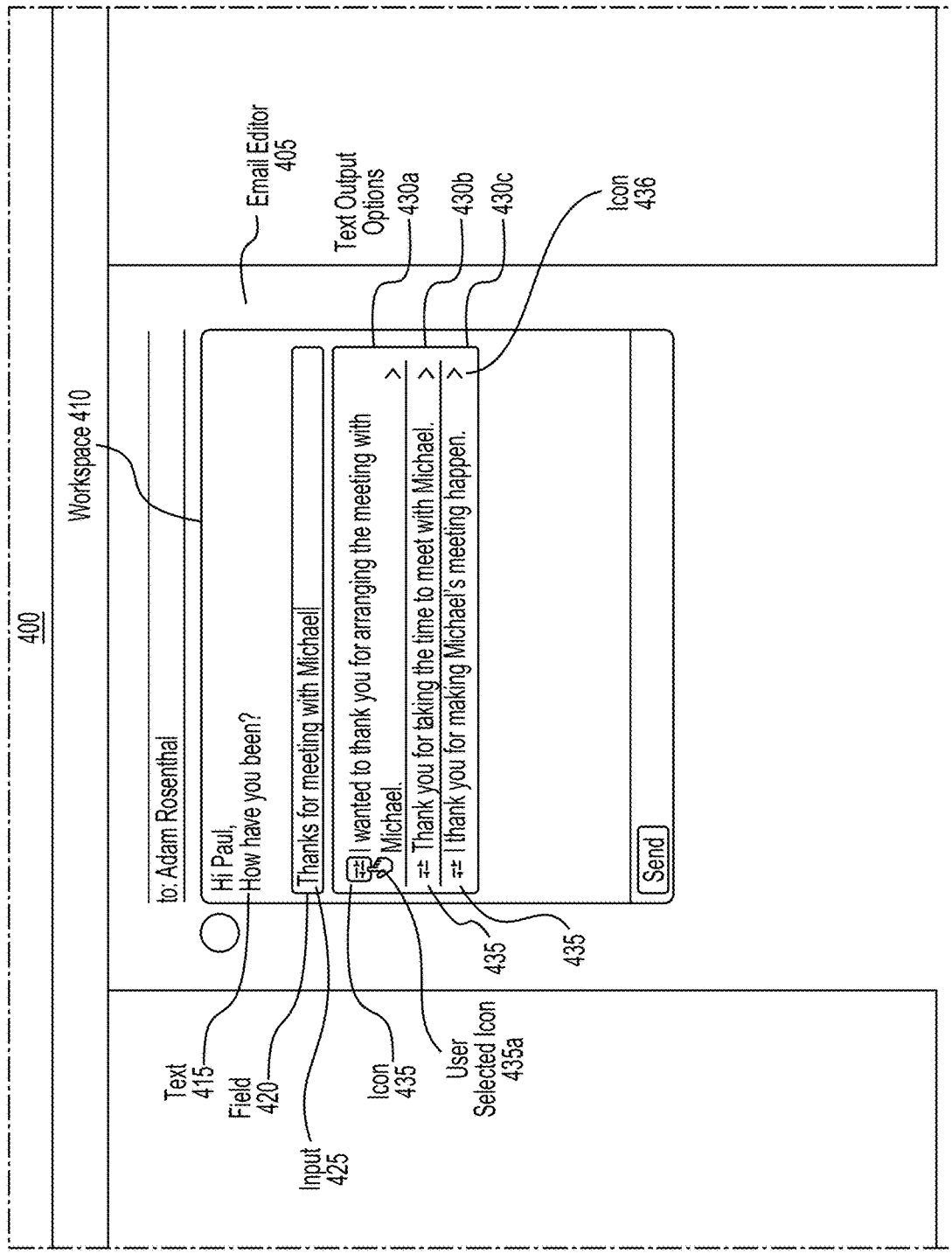
Figure 4D:
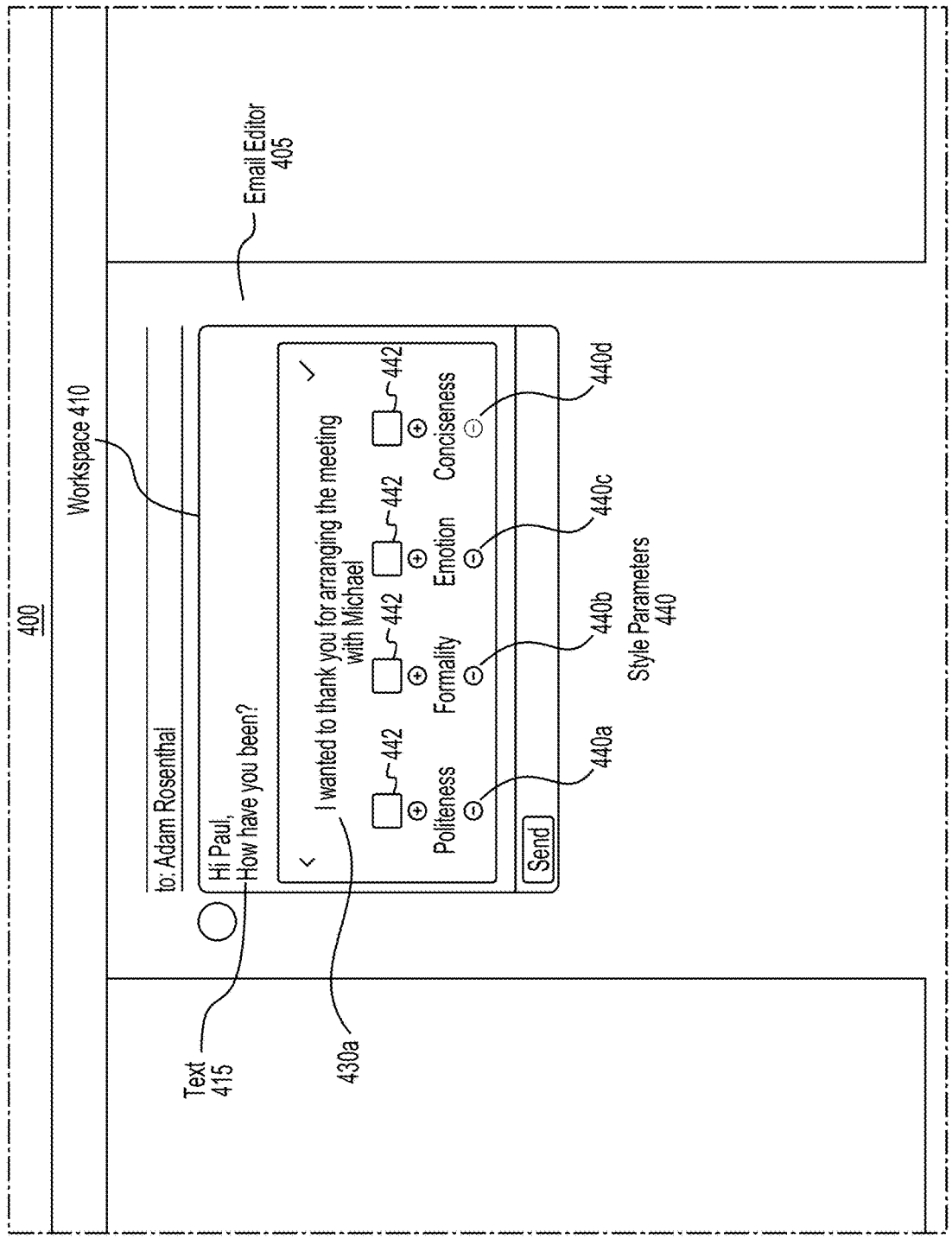

Other control elements may be included as well. For example, as shown in FIG. 4c, the user can select any of the icons 435 to initiate one or more functions associated with the selected icon. In the example shown, a user may select icon 435a (denoted by gray highlighting over icon 435a) that corresponds with a particular text output option 430a. In response to selection of icon 435a, and as shown in FIG. 4d, the writing assistant GUI 400 can display another window (e.g., a style parameter control window) that identifies style parameters 440 (e.g., parameters 440a-d) for which values may be selected by the user. The values for the predetermined style parameters (which, in some cases, can be built into the writing assistant or which may be user-selectable) may specify a level of formality, conciseness, emotion, politeness, or a level associated with any other parameter type that may be relevant to the document. For example, in some cases, the user may control the length of the text output options (e.g., complete sentences or otherwise) using the conciseness control. Alternatively or additionally, a text output option length selector (not shown) may be included to enable a user to specify a desired maximum length (e.g., 8 words, 12 words, 20 words, etc.) for the generated text output options or to specify a desired length range for the generated text output options (e.g., between 5-10 words, 11-20 words, etc.).

Figure 4E:
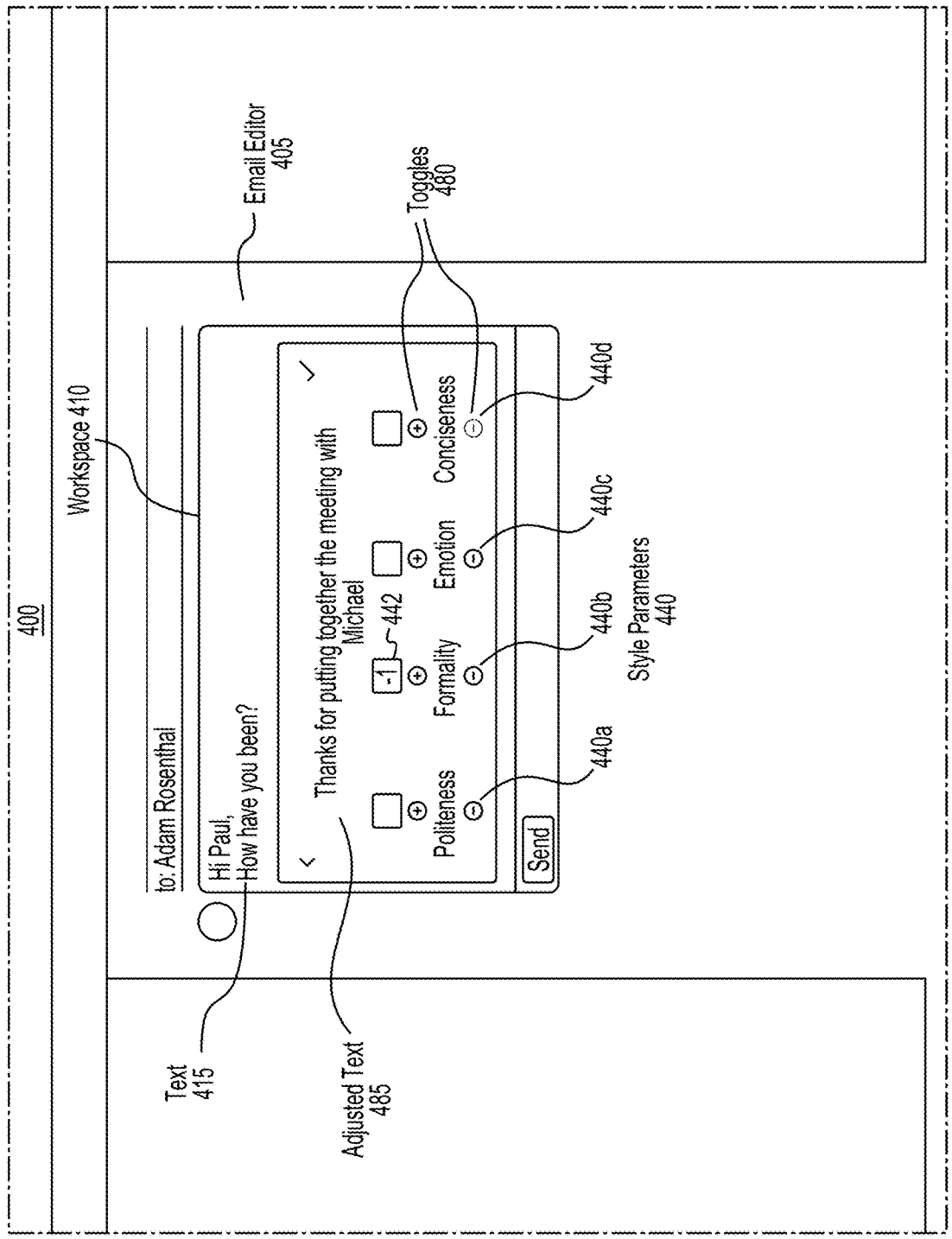

As shown in FIG. 4c, the user can edit the level of the style parameters using the displayed toggles 480 (or any other suitable GUI control elements) or by manually typing entering the adjustment herself via the modifier windows 442. For example, as shown in FIG. 4c, the user has adjusted the level of formality 440b down to "−1" (e.g., to a lower level of formality using toggles 480 or modifier window 442). This change may cause the writing assistant to automatically update the text associated with selected text output option 430a according to the change in parameter value. For example, as shown in FIGS. 4d and 4e, the reduction in level of formality may cause the writing assistant to change the selected text output option ("I wanted to thank you for arranging the meeting with Michael") to the adjusted text 485 ("Thanks for putting together the meeting with Michael").

The adjusted text 485 is less formal than the original selected text 430a. For example, as FIGS. 4d and 4e show, in response to the change in formality level, the writing assistant makes several changes, such as changing "thank you" to "thanks" and "arranging the meeting" to "putting together the meeting" to lessen the level of formality.

The user may continue to adjust the level of formality up or down, and in response, the writing assistant may continue to generate updated text for the text output option to reflect the user's change in formality level. Of course, other available parameter values may also be changed. In the example shown in FIG. 4d, the user can make adjustments to the politeness, emotion, and conciseness parameter levels (e.g., using toggles 480. And in response to a change in value of any of the available parameters, the writing assistant may generate updated text for the text output option to reflect the user's changes.

Figure 4F:
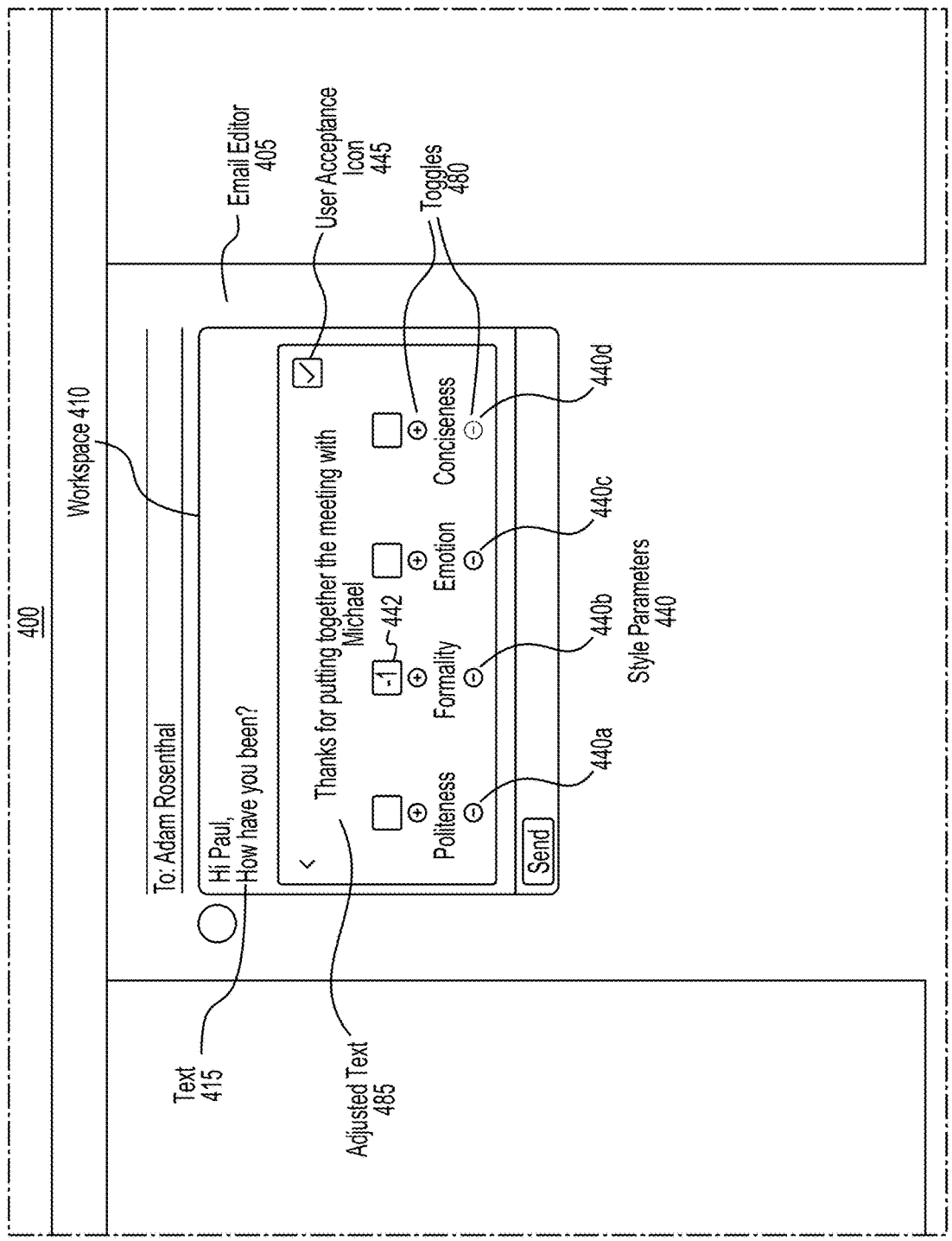
Figure 4G:
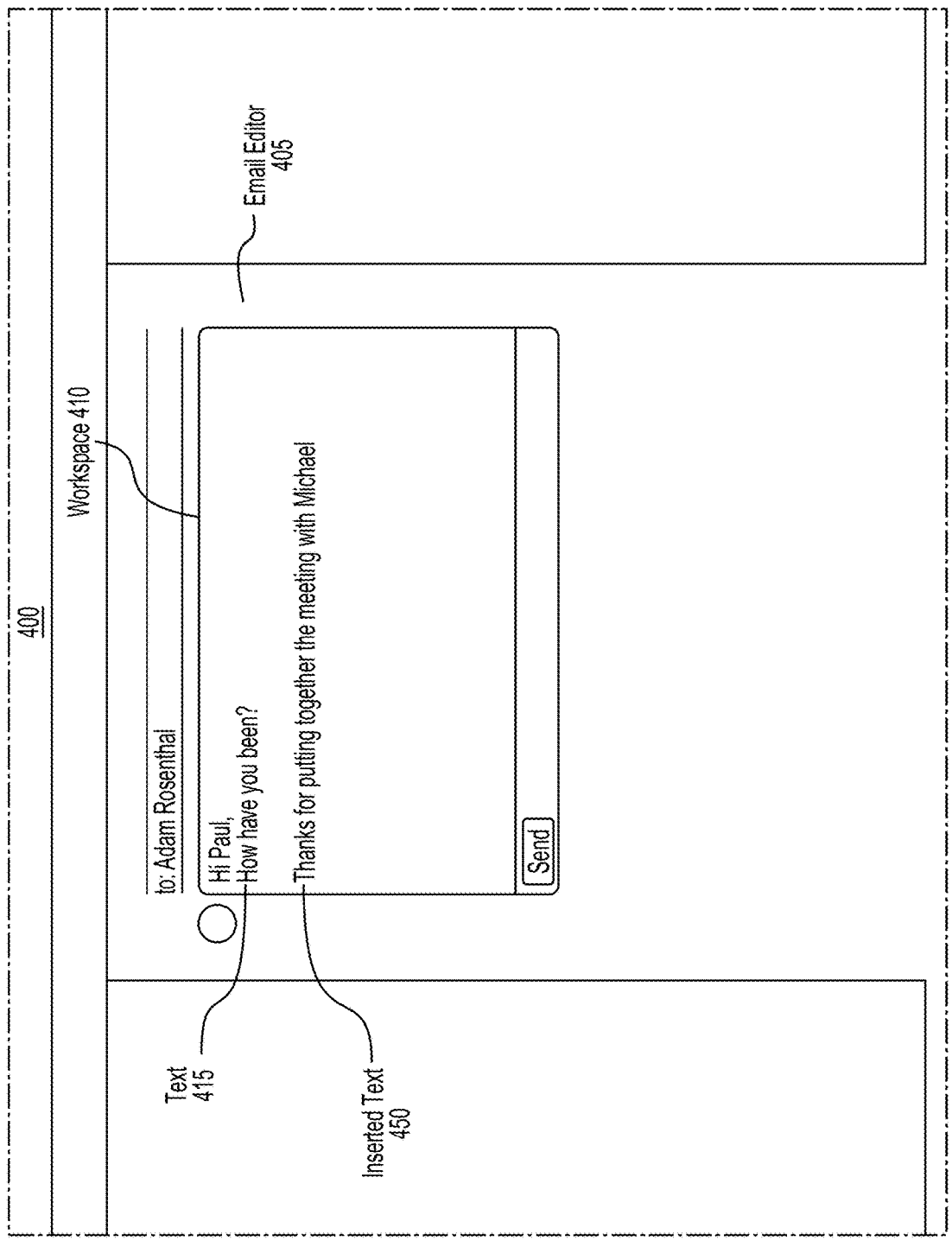

As shown in FIG. 4f, once the user is satisfied with the adjusted text 485, the user can select the adjusted/refined text output by selecting the user acceptance icon 445. As shown in FIG. 4g, the writing assistant can automatically insert the adjusted/refined text into the document or email workspace 410 as inserted text 450. This feature is not limited to style parameters such as politeness, formality, etc. The user may also specify other aspects of the text output options, such as a text output length, as described above. Further, a user-specified length for the text output options can be expressed numerically, as described above, or may be expressed more generally as short, medium, or long. For example, in the parameter level control window, the writing assistant may show the options short, medium, and long on the display for the user to choose. In another example, the writing assistant may include toggles similar to those in FIG. 4f that may allow the user to incrementally increase or decrease the number of words provided in a text output option (including a selected text output option, such as text option 430a. For example, selected text output option is 11 words long, but if a user wished to shorten or limit the length of the text output option to 10 words, the user could enter "10" in a length style parameter modifier input field (by toggle, typing, voice recognition, etc.). In response, the writing assistant would automatically refine the selected text output option to adhere to the user-imposed length limitation. For example, the writing assistant could change the selected text output option 430a to "Thank you very much for arranging the meeting with Michael." to convey the original meaning of text output option, but within the 10-word limit.

As described above, the writing assistant can automatically construct textual output options that differ from the user input in at least one respect, express a meaning, idea, or information associated with the user input, and also agree with a context associated with text elements either found in the user input or within text (e.g., preexisting text in a document workspace) that is different from the user input. Contextual agreement may have various meanings. In some cases, however, an agreement between two or more text elements may refer to grammatical agreement (e.g., the insertion of the generated text output option does not result in a grammar error relative to the preexisting text). In other cases, agreement between text elements may be achieved by the generated text output options being generated to include in the same or similar style as the text around it (e.g., preexisting text in a document workspace). Another contextual agreement may exist where a generated text output option connects coherently to the text around it once inserted into a document workspace. This form of agreement may include, but is not limited to, the generated text being related to the same general subject as the context and/or events or facts referenced in a generated text output options being consistent with events or facts referenced by preexisting text in a document workspace, for example. The consistency may be relative to a relationship (e.g., temporal, causal, teleological, explanatory, etc.) existing between generated text output options and preexisting text or user input. Contextual agreement may also exist where facts implied by generated text output options are consistent with facts implied by the preexisting text; where temporal and causal relations between facts or events referenced in generated text output options and in the preexisting text are not implausible in light of real-world constraints (e.g., a person can't perform an action after he dies, an event cannot start after it ends, a person cannot be located in two different locations at the same time, etc.). A possible test of contextual agreement between preexisting text and text output options generated by the writing assistant may include whether more than seventy percent of human evaluators are not able to discern that a generated text output option, once inserted into the preexisting text, was generated by a machine rather than by a human. In addition to controlling text style using style control parameters, the disclosed embodiments of the writing assistant may also be configured to apply a default style that is predetermined or learned based on usage. For example, the writing assistant may learn the personal style of the user or the style of a particular organization, in different contexts (e.g., based on internal business documents, external business email, personal email, etc.). In this way, the writing assistant may generate suggested text output options in a style that resembles that personal or organizational style in the specific context of the document.

Further, in addition to enabling the modification of individual text output options, the writing assistant may also be configured to enable users to modify the desired style of entire document. In response to such a selected action, the writing assistant may automatically rephrase the existing document text and all text generations in that document going forward in accordance with one or more selected style parameter values to be globally applied. Similar to other described examples, such style parameters may include formality, conciseness, politeness, emotion, sentence length, etc.

Additionally or alternatively, the writing assistant may enable users to select any piece of text, e.g., in the document being written or in another source, and choose to copy that text's style. For example, the writing assistant may detect at least one style attribute (politeness, emotion, formality, etc.) associated with the selected text and then may use or apply such a style attribute in modifying other text in the document. For example, a user may select any piece of text in the document and choose to "paste" the copied style attribute. The assistant will then automatically rephrase the target text such that its style resembles that of the source text or the assistant may offer one or more text output options that rephrase one or more segments of the target text in the style of the source text.

Figure 5A:
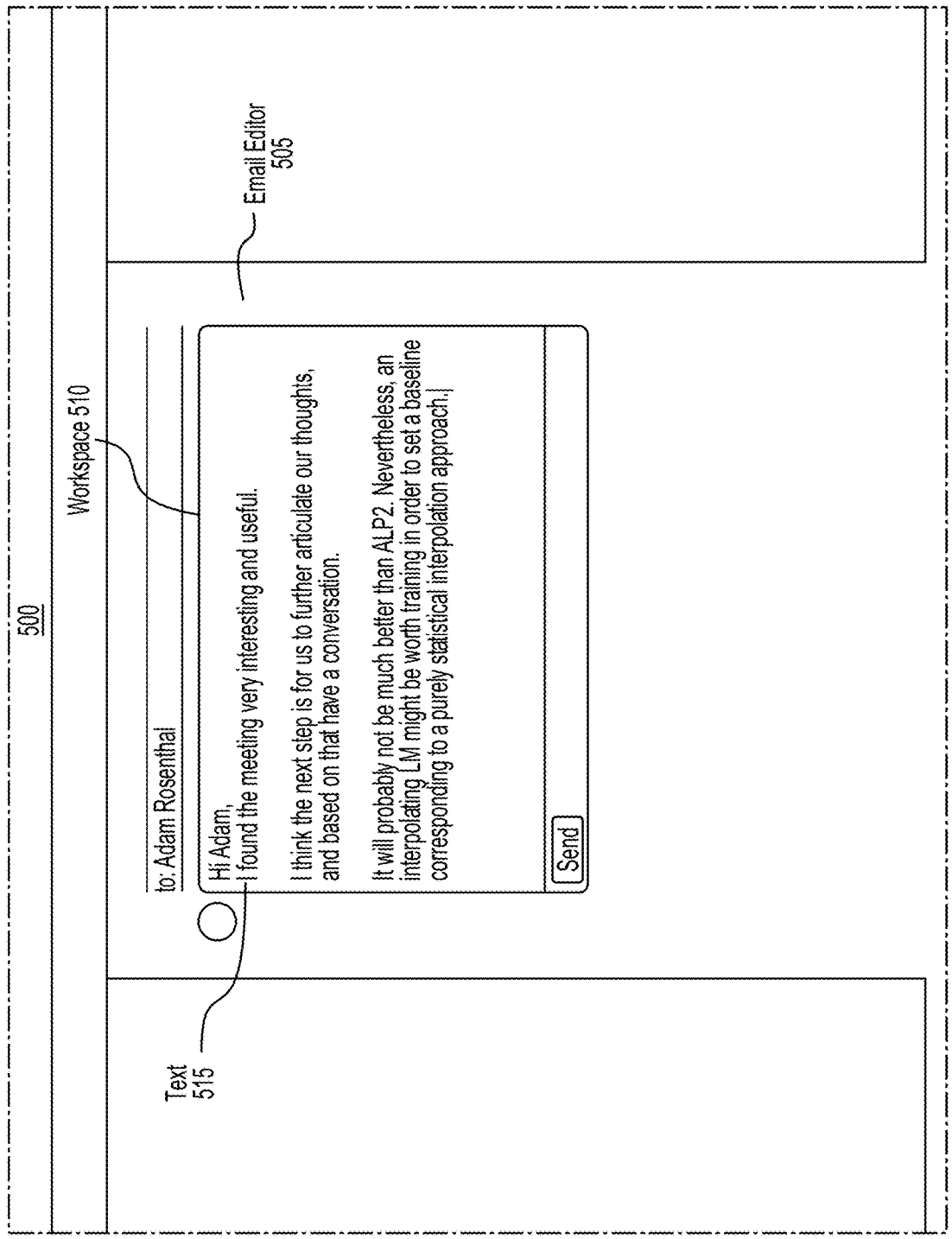

Disclosed embodiments of the writing assistant are not limited to the generation of text options based in response received text input from a user. For example, in some embodiments, various text segments (one or more words, sentence fragments, phrases, sentences, paragraphs, etc.) may be identified in an existing document (e.g., either automatically or based on user control), and in response, the writing assistant may generate one or more text output options relative to the identified text segments. FIGS. 5a-5f show one example of such functionality provided by the disclosed writing assistant applications. FIG. 5a shows an exemplary email editor 505 including a workspace 510 (although any other type of text-based computer application may be used in conjunction with the disclosed writing editor or the writing editor may be embodied as a stand-alone application). As shown in FIG. 5a, the email document includes preexisting text 515.

Figure 5B:
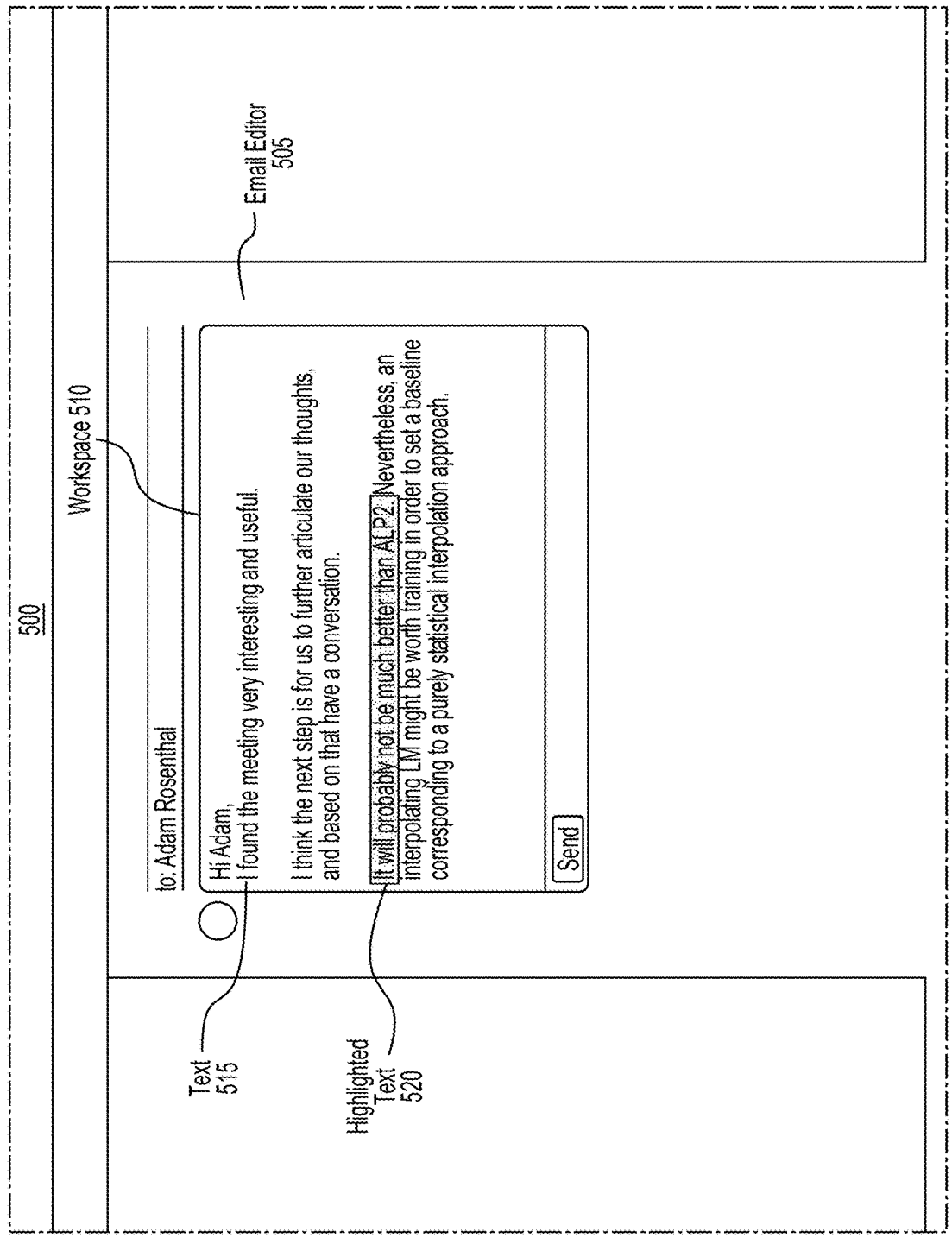

The presently disclosed embodiments of the writing assistant may automatically analyze preexisting text 515 and identify text elements for which the writing assistant may offer one or more text output options as alternatives. For example, as shown in FIG. 5b, the writing assistant may automatically analyze text 515 and identify text elements, such as highlighted text 520, for which the writing assistant may offer alternative text output suggestions. Such automatic analysis may be initiated as part of a routine called by the user so that the writing assistant scans the text and offers suggestions for fixes (e.g., two or more alternative text options for the user to consider as alternatives to the highlighted text 520).

It should be noted that there may be additional techniques for causing the writing assistant to analyze text within a preexisting document and offer suggested alternative text relative to identified text. For example, such functionality may be provided automatically as a user enters text into a workspace. That is, if a user enters a text element into a workspace that the writing assistant determines may be improved, the writing assistant may alert the user by highlighting the entered text or by any other suitable technique. In some cases, the writing assistant may automatically generate one or more alternative text output options for the user to consider. In other cases, the user may be required to confirm an interest in viewing alternative text output options for entered text by, for example, selecting a GUI interface element, etc. The writing assistant's analysis of entered text elements may be triggered by any suitable action, such as entry by the user of a period or other sentence-ending punctuation, entry of a carriage return, etc. Additionally, a user may select a GUI icon, menu entry, etc. to initiate review of drafted text by the writing assistant. Such a GUI icon may include any suitable type of virtual button, etc. Menu entries may be selected, for example, from a drop-down menu (e.g., a Review tab). The automatic analysis of preexisting text elements by the writing assistant may also be initiated by the user manually highlighting certain text elements, which may trigger the analysis by the writing assistant and the generation of text output options. In some cases, the user may initiate review of a text element by the writing assistant by highlighting a certain text element and then clicking on or otherwise selecting one or more GUI control elements, icons, buttons, or menu items.

Figure 5C:
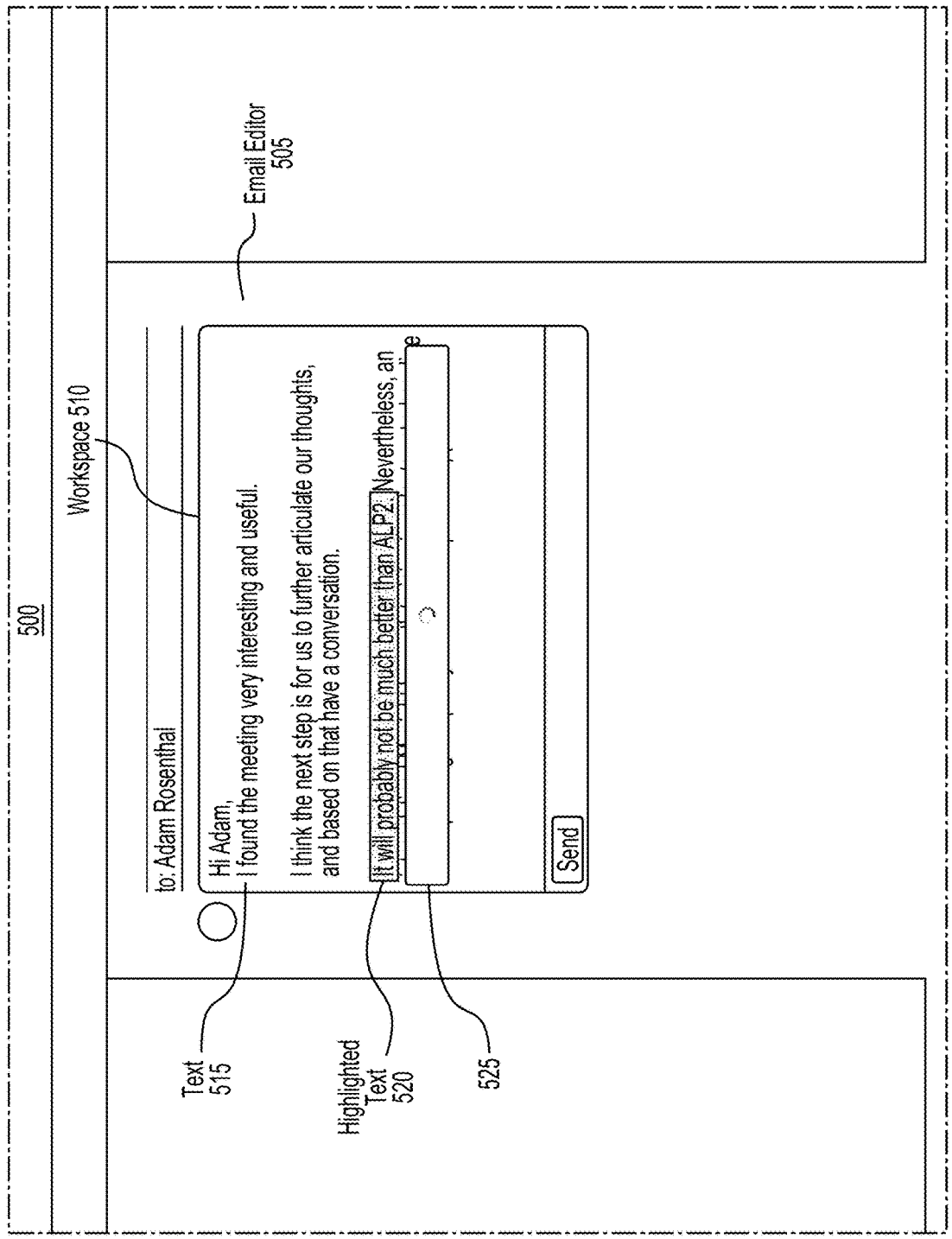

Returning to the example associated with FIGS. 5a-f, as shown in FIG. 5c, the assistant may automatically analyze the highlighted text 520 in response to any of the triggers described above or in response to any other suitable trigger for the review functionality. In some cases, an indicator 525 (e.g., a spinning wheel, hourglass, etc.) may indicate that the writing assistant is analyzing the highlighted text 520 together with text 515 (e.g., to determine context within which the generated text output options are to fit). As a result of the automatic analysis, the writing assistant can automatically generate text output options, such as text output options 530a-530c that the user may consider as possible replacements for highlighted text 520. As previously described, each of the generated text output options may differ from the text elements included in the highlighted text 520 in at least one respect, but may express a meaning associated with the text elements, while agreeing with contextual elements associated with text 515 and/or highlighted text 520.

Figure 5D:
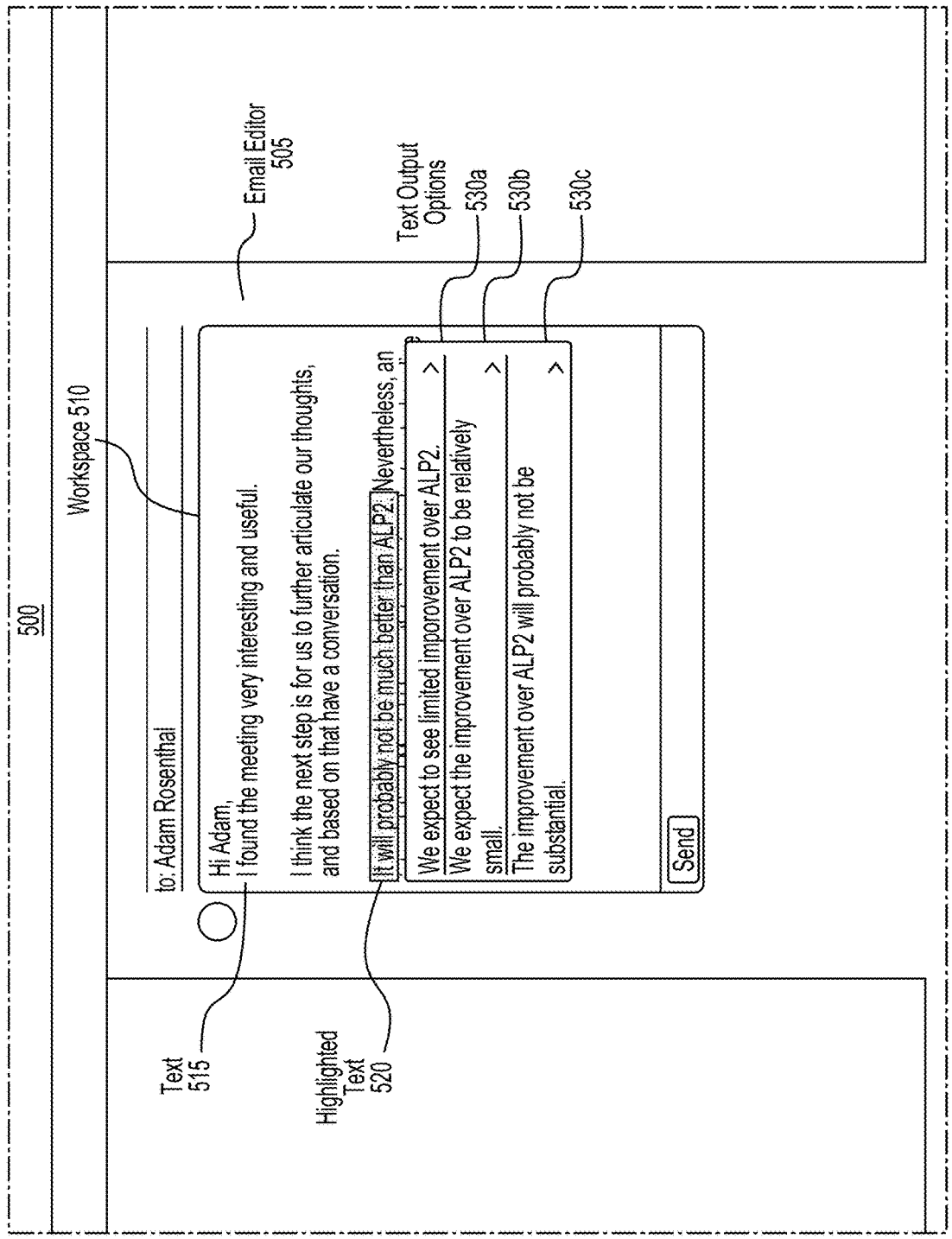

Moving to FIG. 5d, the writing assistant has generated three text output options 530a-c. Each conveys a meaning similar to meaning associated with the highlighted text 520 ("It will probably not be much better than ALP2"). Notably, however, as the generated text output options suggest, the writing assistant automatically determined that the term "It" in the highlighted text 520 may be unclear. In response, each of the generated text output options rectifies this potential confusion by clarifying that the drafter is likely referring to an expected improvement over the ALP2 system. Additionally, text output options use the pronoun "We." which agrees with the context of the preexisting text 515, which includes words such as "us" and "our." which suggest the drafter is referring to a group of people to which the drafter may belong. Additionally, each of the text output options further agrees with the context of the preexisting text 515 at least by offering a prelude of the "thoughts" that the drafter and the group to which the drafter belongs expect to later articulate to Adam Rosenthal during the proposed conversation (i.e., that the improvement over ALP2 is not expected to be significant or substantial).

Figure 5E:
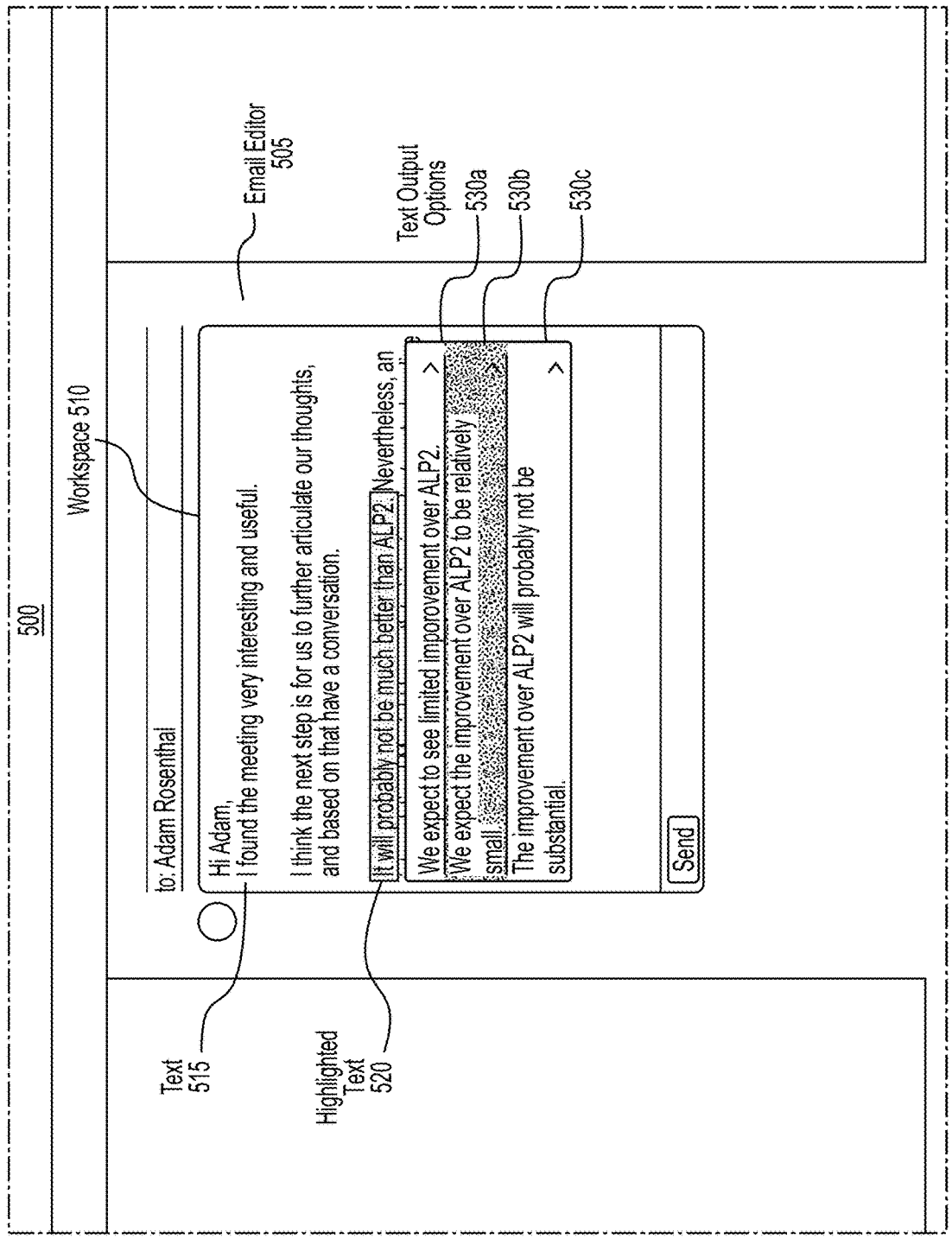

As shown in FIG. 5e, if any of the generated text output options better fits the meaning that the drafter intended to convey with the highlighted text (or that the user simply prefers over the highlighted text), the user can select one of the generated text output options as a replacement for the highlighted text. Any of the techniques and functions described above (e.g., techniques by which a selected text output option may be indicated, techniques by which a user may cause the writing assistant to further refine any of the generated text options, control of style parameters, etc.) may be incorporated into the embodiment represented by FIGS. 5a-f.

Figure 5F:
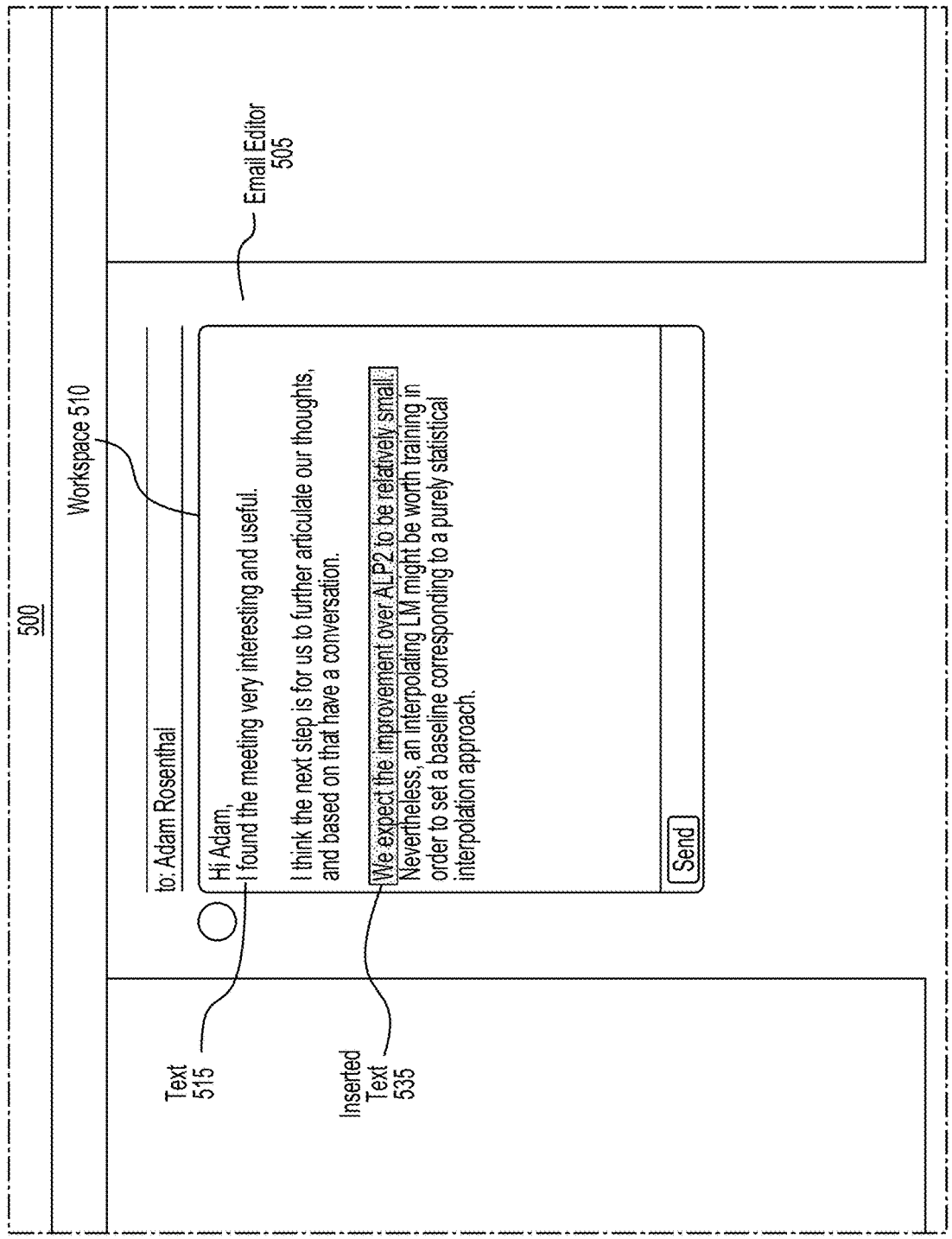

As shown in FIG. 5e, the user has selected text output option 530b. In response, the writing assistant can automatically substitute the selected text output option 530b for the highlighted text to provide inserted text 535 in workspace 510, as shown in FIG. 5f.

It is important to appreciate that the writing assistant can also analyze text in a document based on where that text is located in the document and in relation to other pre-existing text 515. For example, in some cases, highlighted text (or text for which the writing assistant as identified for potential substitution with a text output option) may appear at the beginning, middle, or end of a paragraph. In some cases, the highlighted text may appear in the middle of a sentence. In each case, the writing assistant may generate any of the text output options based on where the highlighted text (or text to be replaced) appears in the document. Sentences near the beginning of a paragraph may be framed as a topic sentence and/or may be more likely to identify subjects by name without use of pronouns. Sentences near the end of a paragraph may be framed as a conclusion, and sentences to appear in the middle of a paragraph may be framed as supporting of the a topic sentence and/or conclusion that may be included in the paragraph. These are just some examples of how the writing assistant may generate text output options based on the intended location in a document for the generated text output options.

In some cases, the writing assistant may generate text output options not as substitutes for text that already appears in a document, but rather as linking or bridging text. For example, a user may place a curser, for example, at a location in a document where the user would like the writing assistant to generate and insert text. In some cases, the user may place the cursor in the middle of a sentence. In other cases, the user may place the cursor between paragraphs, at the beginning of the document text, at the end of the document text, etc. In response, the writing assistant may generate one or more text output options for insertion at the cursor location. In such cases, rather than basing the text output options on highlighted text or user-entered text in a user input field, for example, the writing assistant may generate an original text output based on text that may precede or follow the cursor. For example, the writing assistant may draw subjects and information from the surrounding text and formulate linking or bridging text objects that synthesize those subjects and information into text that expands on or further modifies the existing text. Text appearing closer in proximity to the cursor location may have a stronger effect on the words or language elements that the writing assistant automatically selects for inclusion into the generated text output options. As a result, the generated text output options may offer text that flows with and connects naturally with the surrounding text, especially the text in close proximity to the insertion location.

Again, any of the functionality described elsewhere may be incorporated into or used with this particular example. For example, in some cases, generation of linking text by the writing assistant may be controlled with user-selected parameter values, similar to those shown in FIGS. 4a-4f. For example, if the user places a cursor at a certain location in the workspace, the user may be able to select or indicate the type of text to be inserted at the cursor location (e.g., a sentence, a paragraph, a figure caption, etc.). All of the other previously described parameter value options, among others, may also be available to the user in an embodiment in which the writing assistant automatically generates text based on a selected location in a document.

In another exemplary embodiment of the system, consistent with disclosed embodiments, the writing assistant can construct text output options based, at least in part, by accessing and relying upon sources of external information (e.g., outside of the document, outside of what the user inputs, outside of or remotely located relative to a device, such as a PC or mobile device, on which the writing assistant is implemented, etc.). As shown in FIG. 1, for example, the system may access internet sources 150, databases 170, or any other remotely located devices or data repositories, etc. via network 130.

In some cases, information retrieved or accessed from the remotely located devices or databases, for example, may be used by the writing assistant in various ways. In some instances, the writing assistant may use such information to verify aspects of preexisting text in a document and/or the generated text output options. For example, the writing assistant may use the externally available information to verify that the generated text output options do not contradict the externally available information. In other words, the writing assistant can compare facts to be included in generated sentences/text output options to verify that they are aligned with information from one or more external knowledge bases. As one example, an agent could be in Paris and France at the same time but not in Paris and England at the same time. In this example, the writing assistant may receive the location "Paris" from the user. The writing assistant can access the Internet and through search engines, social media, and/or some other type of data mining, and by using other contextual clues in the document (e.g., a company name referenced in an email, etc.), the writing assistant may automatically determine that Paris, as referenced by the user, must be a location and that it can be in Texas or France, but not in England.

Additionally or alternatively, the externally available information may also be used to augment the generated text output options. For example, when a user input refers to an entity, externally available information about that entity can be acquired and, where appropriate, incorporated into generated text output options to enhance the depth and quality of the generated text. Acquisition of information from external sources may be automatic as the user inputs information, or may be triggered by user input. For example, the inclusion of a wildcard symbol such as a "?" may prompt the writing assistant to acquire externally available information from an external source, generate text based on the acquired information, and insert the text in place of the wildcard symbol (or at least provide text output options to the user for potential selection and insertion at the site of the wildcard symbol).

The information available from external sources may also be used to ensure that the text output options generated by the writing assistant align with contextual aspects of preexisting text, user input, etc. For example, the external sources may be accessed to confirm the gender associated with an individual identified in the preexisting text or user input, to confirm facts about a referenced place name, to confirm chronology or dates, or (as previously mentioned) to verify the accuracy of facts or information. With the verification capability the writing assistant may generate text output options that may correct factual errors included in the user input or that exist in preexisting text, for example.

The external sources may be pre-selected by the user, be pre-set, or automatically selected based on the user input or the attributes associated with the user input. Relevant information in the external source can be identified automatically based on the attributes associated with the user input. For example, if the user does not want the writing assistant to access the Internet, the user may block that capability. In this case, the writing assistant may call on information that is stored locally on a personal computer, smart phone, or other client device. In another example, the user may type in a name such as "Tony Johnson." which the writing assistant will recognize as a name. Since the text includes a name, the writing assistant may access social media accounts and available search engines to retrieve information that may be relevant to Tony Johnson, especially in the context of a document being drafted. The writing assistant may, for example, find a "Tony Johnson" located in Paris, France (and may also use additional information determined from the input or written text) to determine that this is the Tony Johnson being referred to by the user input or preexisting text.

In some embodiments, the writing assistant may receive user input including one or more words and, in response, retrieve information from an external source based on attributes associated with the user input. The attributes associated with the user input can be, for example, a name of a person, a place name, or an entity name. This list of attributes is not meant to be limiting and could include any relevant attribute associated with the user input. The user input may also include a wildcard symbol. Common wildcard symbols include, but are not limited to an asterick (*), a question mark (?), etc.

The external source may be a local source or one that is housed on a remote network, another server, or another remote location. The external source could be, for example, a database containing geographical information, entity information, organizational information, demographic information, physical property information, ontological information, or event chronology information. The external source may also be a webpage or an electronic document accessible via the Internet.

The writing assistant may also receive user input including a collection of two or more words that together convey certain ideas or facts. As discussed above, the writing assistant may retrieve information from an external source based on the facts included in or implicated by the collection of words. The facts associated with the user input can include, for example, a name of a person, a place name, or an entity name (e.g., "Paris" or "Tony Johnson"). This list of facts is not meant to be limiting and could include any relevant facts associated with the user input. The user can include a wildcard symbol, such as ? or *, to trigger the system to collect information about the user input or relative to a certain portion of the user input preceding or following the symbol. For example, a user may type "Tony Johnson?" or "*Tony Johnson" to prompt the writing assistant to search for information about Tony Johnson. The writing assistant may, for example, search social media for entries corresponding to Tony Johnson and, once the system finds a relevant profile, pull information from the profile about Tony Johnson, such as his city of residence, the high school he attended, recent likes, etc. The writing assistant can use the information from Tony's profile to augment suggested text output options.

In another example, a user may call the writing assistant and write "Bono's age is ?", using the symbol '?' to specify where a piece of information should be retrieved and inserted in the sentence. In response, the writing assistant may generate sentences such as "Bono is 60 years old."

In addition to freeform input, such as a series of words, the writing assistant can receive input from a user via one or more structured input templates. Such structured input templates may facilitate entry of information important to certain types of communications. A user may manually select one or more templates to aid in information entry, or the templates may be automatically triggered based on analysis of words entered by the user. For example, the user may choose, or the assistant may detect and suggest, specific communicative intentions, such as "propose meeting" or "introduce someone." This may initiate a dedicated interaction where the writing assistant is shown on a display and a user can input the information or messages she wishes to convey in a structured or semi-structured manner.

FIGS. 6a-6o illustrate the template functionality that may be incorporated in or associated with the disclosed writing assistant. As described above, the user input may include words, phrases, sentences, etc. Within the user input, for example, the writing assistant may recognize certain words or phrases, for example, "meeting," "information," "request," "buy," "purchase," or "task" associated with an available/predetermined input template. In response to a detection of such keywords, the writing assistant may initiate one or more structured input templates to be shown on the display based on the detected word or phrase associated with a predetermined template. For example, as shown in FIG. 6a, a user may open an email editor 605 and enter the name of the email recipient (i.e., the requestee 612 from whom the user is requesting information). In this case, the user is composing an email to "Ernesto." As shown in FIG. 6b (and as described above), the user may prompt the writing assistant for a user input field 615. As shown in FIG. 6c, the user may enter input 620 ("Please send me the") into field 615. The writing assistant may recognize a type 625 associated with the input 620 (in this case a request for information). For example, the writing assistant may recognize that the phrase "Please send me the" most likely indicates that the user is sending the email to request information from the requestee 612. In response, the writing assistant may suggest a type 625 of email to compose and may automatically display one or more predetermined templates determined to relate to the type of document being drafted or may display an indication, such as a detected type 625, that the user may select in order to access available, relevant templates. In some cases, together with an indication of a detected type 625 of document, the writing assistant may generate text output options 630a and 630b. It should be appreciated that the writing assistant can simultaneously provide the indication of a detected document type 625 together with the suggested well-written, context-fitting text output options 630a and 630b.

As noted, the user can select the suggested type 625, prompting the writing assistant to display a predetermined template 680 associated with an information request, as shown in FIG. 6d. The writing assistant may auto-populate some of the information in predetermined template 680. For example, based on the email address and greeting already entered in the email, the writing assistant can determine that "Ernesto" (i.e., the requestee 612) will be the sender of the requested information. And, the writing assistant may also automatically determine that the user ("me") is to be the recipient (i.e., the requestor 639) of the information and, in response, may auto-populate the Receiver field. The input 620 may also be inserted into the predetermined template. The predetermined template, in anticipation that the user will input the information that he is requesting, also may include an information request filed 637 where the user can input the information that he wishes to receive from Ernesto.

As shown in FIG. 6e, the user can input the information (e.g., information input 643) into the information request field 637. The information can be inputted in a variety of different ways. For example, as shown in FIG. 6c, the user may enter "-avg weekly conversations & amounts" and "-team metrics—calls/hour" on separate lines. The writing assistant may analyze the information to determine the requested information, despite the incongruent formatting and incomplete sentences.

As shown in FIG. 6c, additional, available input categories 640a-640d may be displayed on the predetermined template 680. In this example, the additional input categories include purpose 640a, deadline 640b, urgency 640c, and other requirements 640d. However, it should be appreciated that these additional input categories may vary based on the type of request, etc. The examples shown here are not meant to be limiting and only display a subset of possibilities.

As shown in FIG. 6f, the user may select the input category purpose 640a. In response, as shown in FIG. 6g, the writing assistant may add a purpose input field 643 to the predetermined template 680 along with a purpose suggestion 645. The purpose suggestion may be based on the text of the email or some other information. For example, the writing assistant could present a purpose suggestion of "present it in our meeting" based off a future meeting invitation with the subject "Weekly Team Meeting" where the user and Ernesto are both attendees, among other relevant information—external and internal—as discussed previously. As shown in FIG. 6h, the user can enter his own purpose input 647 ("Quarterly report").

As shown in FIG. 6i, the user can select another input category, other requirements 640d. As shown in FIG. 6j, once the selection is made, another requirement input field 650 may be added to or displayed relative to the predetermined template 680 (e.g., unhidden). And, like the purpose input category, the writing assistant may display another requirements suggestion 653 based on a similar methodology. As shown in FIG. 6k, the user can add the other requirements input 655 ("don't forget rick's team") to the other requirements input field 655.

As shown in FIG. 6l, the user can select another input category, deadline 640b, prompting the writing assistant to add the deadline input field 657 to the predetermined template 680. And, like the purpose input category, the writing assistant may display a deadline suggestion 660 based on a similar methodology. As shown in FIG. 6m, the user can add the deadline input 663 ("tomorrow") to the deadline input field 657.

As shown in FIG. 6n, the writing assistant can use any or all of the information entered into the predetermined template 680 to create a well-written email that incorporates information entered into the template to automatically generate a text output option 665 (e.g., "text output option 1"). Like the text output options described elsewhere in this disclosure, the writing assistant may rely upon complete or incomplete sentences to create well-written text output options, which may be in the form of complete sentences. In this case, the text output option may include a greeting ("Ernesto,") and a closing ("Thanks.").

The user can modify or cause the writing assistant to refine text output option 665 in various ways. In some cases, the user may change a value associated with style parameter 667. For example, style parameter 667 may correspond to a level of formality, but it can also include any of the previously discussed style parameters. In FIG. 6n, the style parameter 667 is set to "1." As shown in FIG. 6o, the style parameter 667 can be changed to "2," which may increase a level of formality of a refined text output option 670 (text output option 2) relative to text output option 665 (text output option 1). For example, the refined text output option may list the requested information numerically, may include transitional phrases (e.g., from ("Also don't forget . . . ") to ("Please make sure that . . . ") and from ("I need it . . . ") to ("I would appreciate it . . . "), and may refine the closing (e.g., from "Thanks" to "Thanks for your help").

The writing assistant can also display additional structured input templates. For example, in some cases the writing assistant may display a secondary structured input template based on secondary user input received through the primary structured input template. And, through the secondary structured input template, the user may input tertiary information that conveys information with respect to a predetermined subject associated with the secondary structured input template. Such template generation may continue in a hierarchical or nested way such that additional templates may be displayed or made available to a user in response to any inputs included in a higher-level template. In such embodiments, the writing assistant may automatically construct complete sentence options that reference a predetermined subject and include information conveyed by secondary user input. The complete sentence options may also be automatically constructed to reference a predetermined subject of the secondary input template and to include information conveyed by tertiary input. The complete sentence options may differ from one another in at least one respect. The user can also enter a user-specified length for the complete sentence options.

The writing assistant may also be configured to automatically identify information that may be missing from input that a user may provide to the system, whether via a structured template or any other input arrangement described herein. For example, the writing assistant may receive user input through a workspace. The user input can be a collection of words that convey at least one idea. Based on analysis of the user input, the writing assistant may detect the absence of information that is not conveyed by the input but that may be relevant or important to the text or document being drafted. In such cases, the writing assistant may prompt the user, through the writing assistant workspace for example, to enter additional user input (e.g., secondary user input) associated with the missing information. For example, the missing information may include details like a time of a meeting, a time of an event, a name of a person, a name of a place, a date associated with an event, a transaction amount, among many other possibilities. Through a structured input template or any other suitable interface element, the writing assistant workspace may receive the secondary user input that may include details associated with the missing information. The writing assistant may then construct complete sentence options or any other type of text output options that convey details included within the secondary user input. All of the features described in the preceding paragraphs with respect to the input methods, secondary inputs, etc. can apply to this automatic identification of information in any combination.

The writing assistant has the ability to iteratively interact with a user in order to refine or navigate through proposed text output options generated and displayed by the writing assistant. As shown in FIGS. 7*a*-7*f* and as described above, the writing assistant can receive user input and, in response, generate text output options. The writing assistant can display the text output options to the user who can select one of the text output options for insertion into the document (e.g., in workspace 710).

Figure 7A:
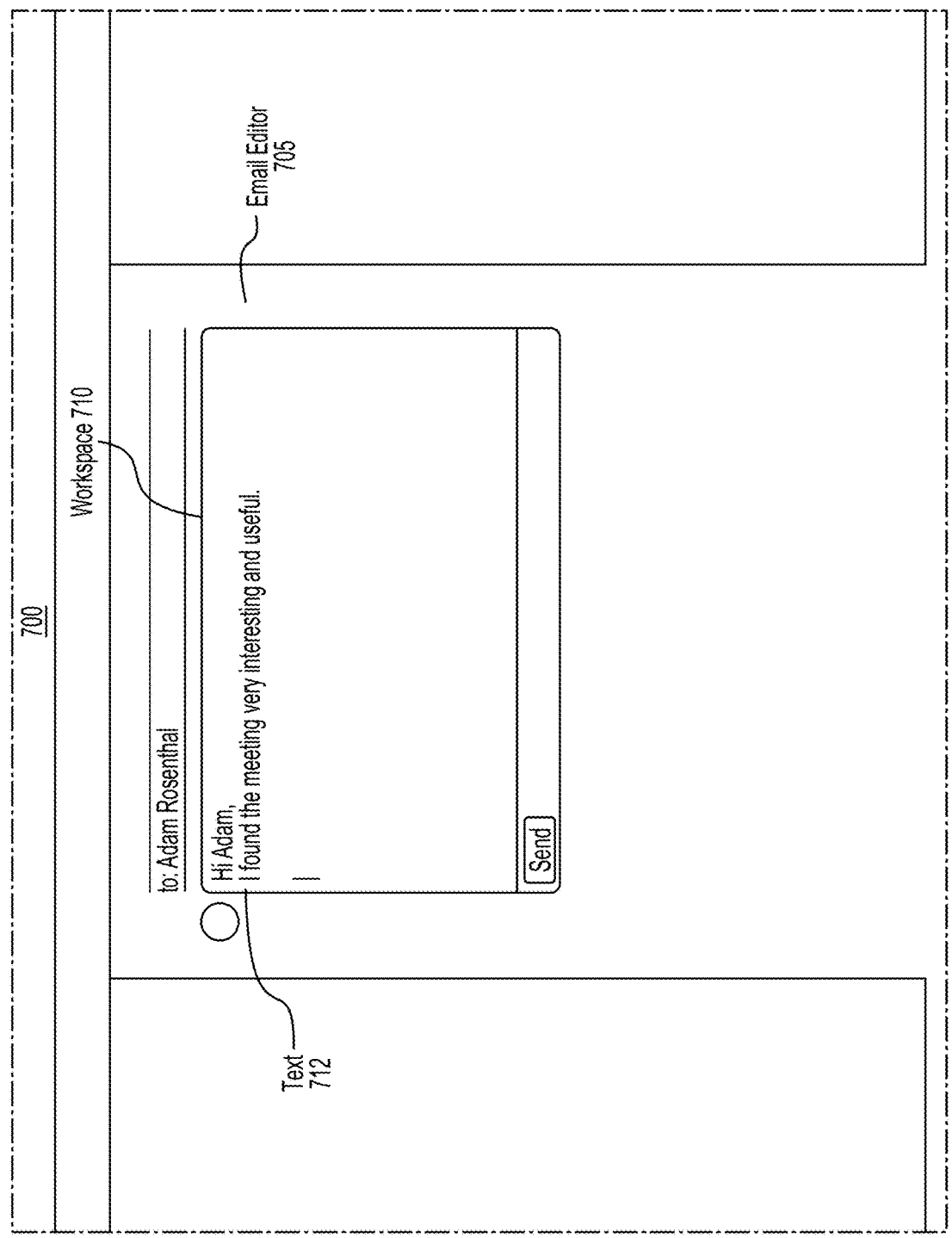
Figure 7B:
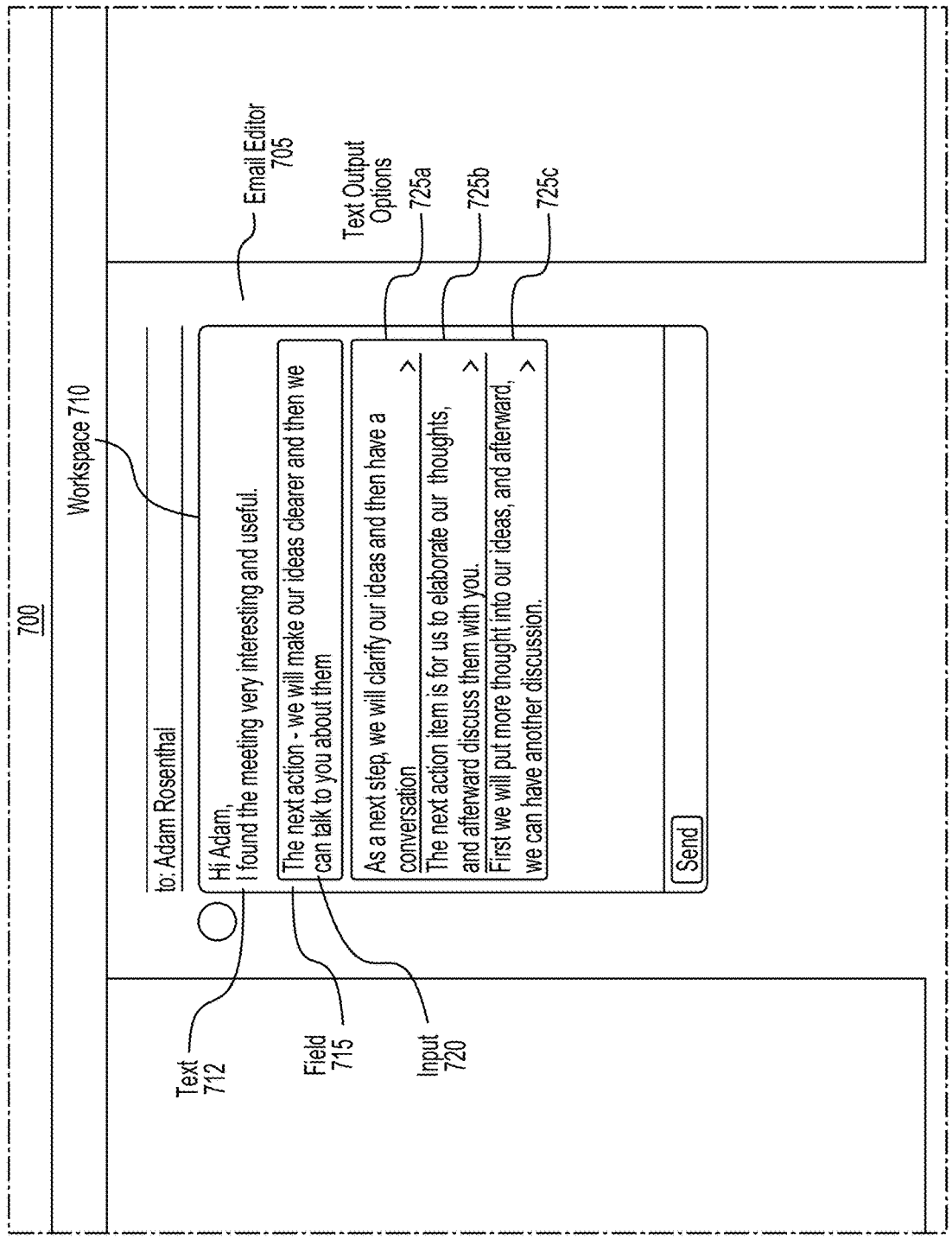
Figure 7C:
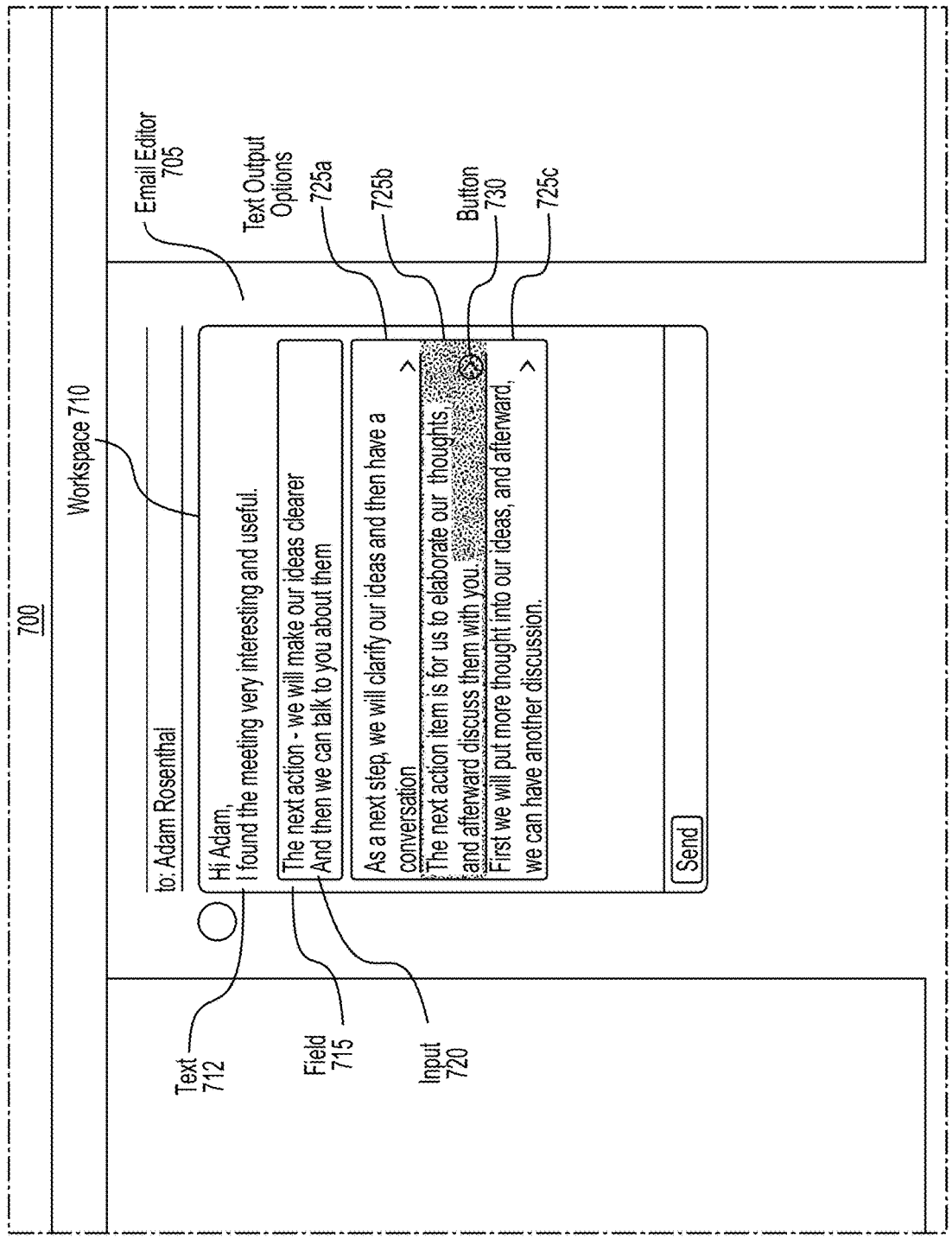
Figure 7D:
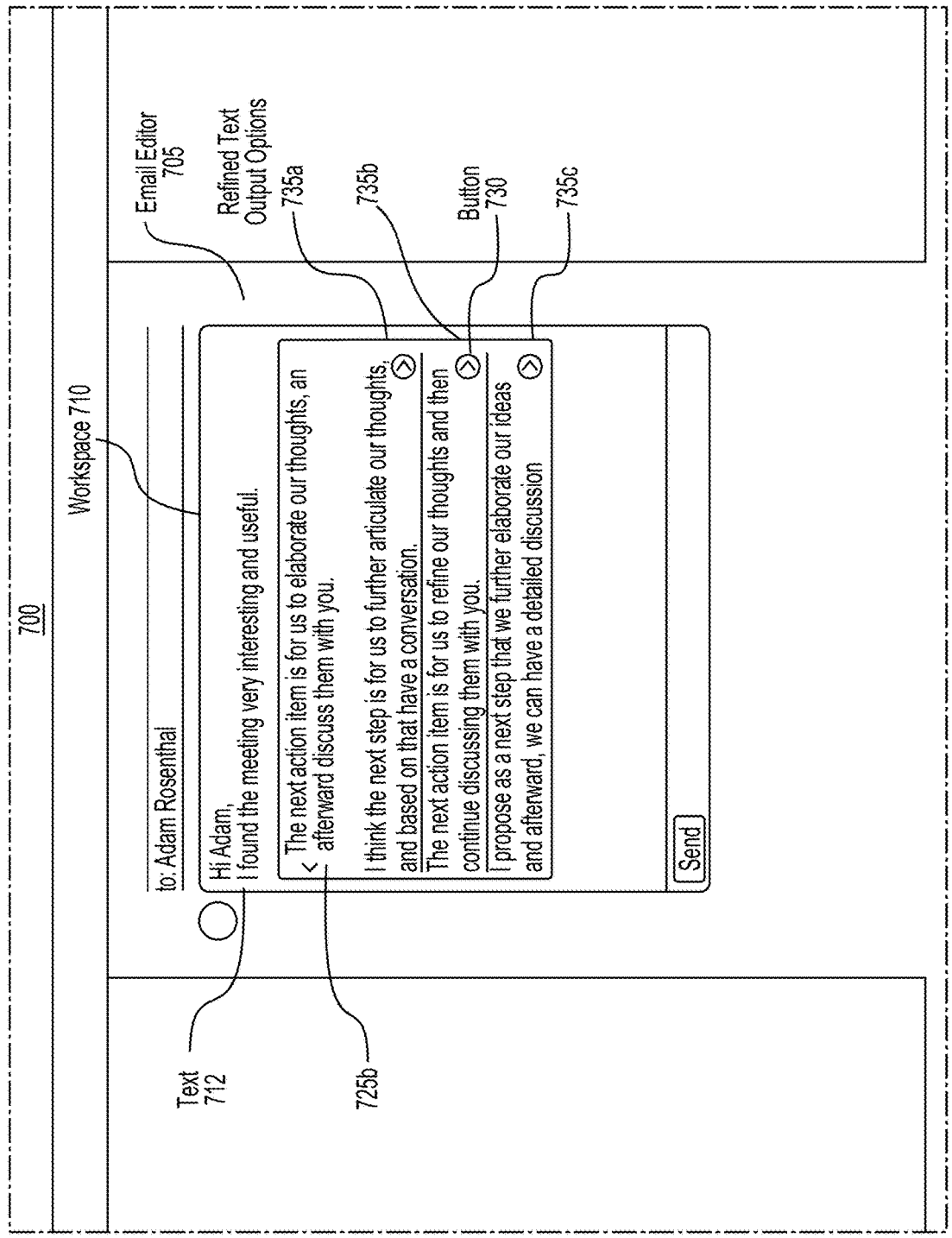

As For example, as shown in FIG. 7*a*, a user can type text 712 into workspace 710 within email editor 705. As shown in FIG. 7*b*, a user may also prompt the writing assistant to display a user input field 715 where the user can enter input 720. Similar to other embodiments disclosed herein, the writing assistant may generate well-written, context-fitting text output options 725*a*-725*c*. As shown in FIG. 7*c*, the user can further interact with the writing assistant to refine any of the generated text output options (e.g., by selecting virtual button 730 corresponding to text output option 725*b*). As shown in FIG. 7*d*, the writing assistant may use the selected text output 725*b* to generate one or more refined text output options. For example, as shown in FIG. 7*d*, the writing assistant can display the selected text output option 725*b* ("The next action item is for us to elaborate our thoughts, and afterward discuss them with you.") along with one or more refined text output options 735*a*-735*c* generated based, at least in part, on the selected text output 725*b*. In other words, In this example, if for some reason the user was not satisfied with any of text output 725*a*-725*b*, the user may select any of the initially generated text output options (e.g., text output option 725*b*) as the initially generated text output option closest to what the user envisioned for insertion into the document. In response, the writing assistant may generate one or more refined text output options (e.g., text output options 735*a*-*c*) based on the user's selection from among the initially generated text output options. This process may continue until the user finds suitable one of the generated, refined text output options.

In this example, the writing assistant may generate refined text output options 735*a*-735*c* that seek to convey the same or similar meaning as the selected text output 725*b*, but have several differences relative to text output option 725*b*. For example, the refined text output options may include different introductory language (e.g., from "The next action item is . . . " to "I think the next step is . . . " or "I propose as a next step . . . "), may include one or more synonyms (e.g., from "to elaborate . . . " to "to further articulate . . . " or "to refine . . . "), etc. As noted, this process may be iterative, and a user may continue request for refined text output options until he is satisfied with one of the options. For example, the user may select button 730 to prompt the writing assistant to generate further refined text output options and so on.

Figure 7E:
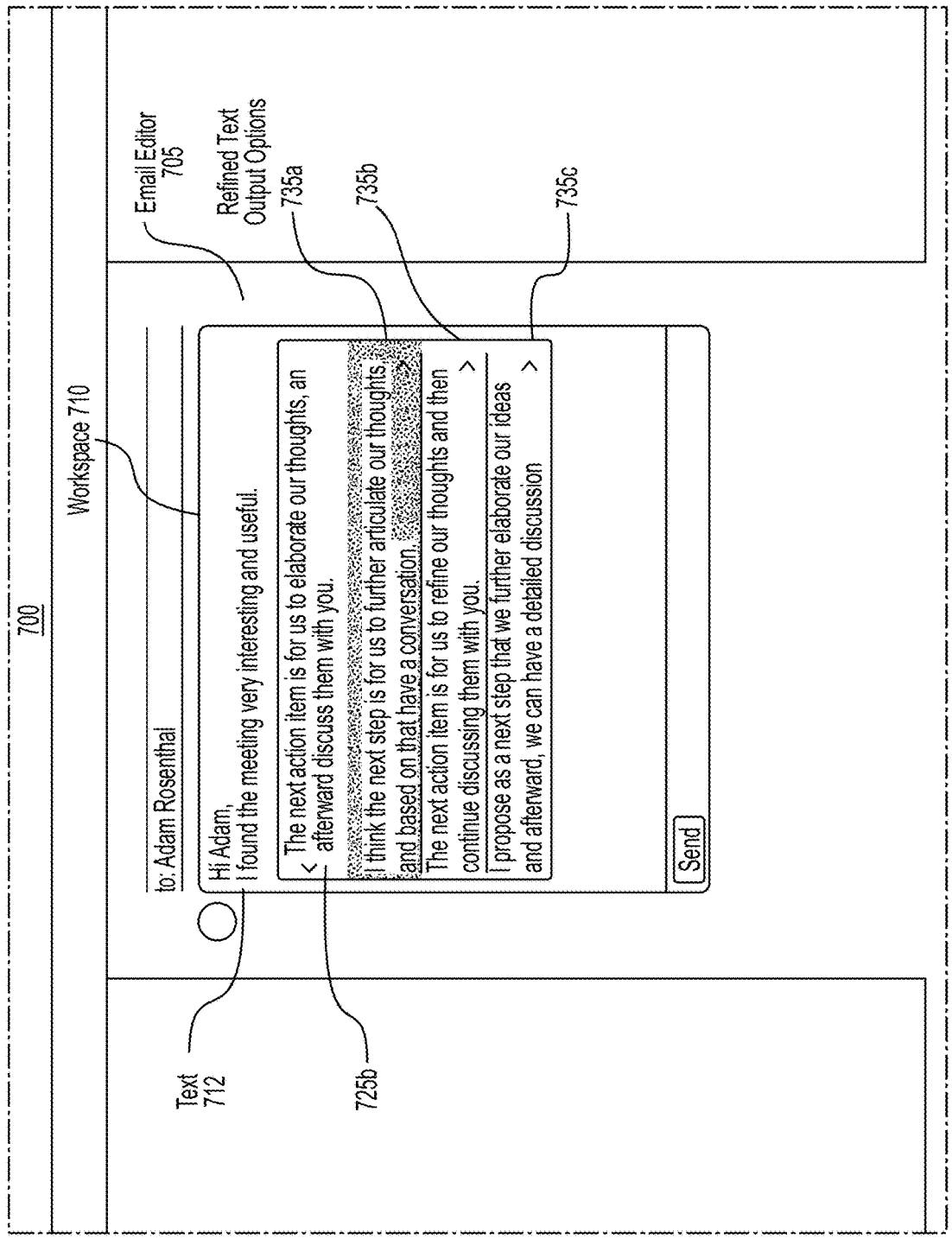
Figure 7F:
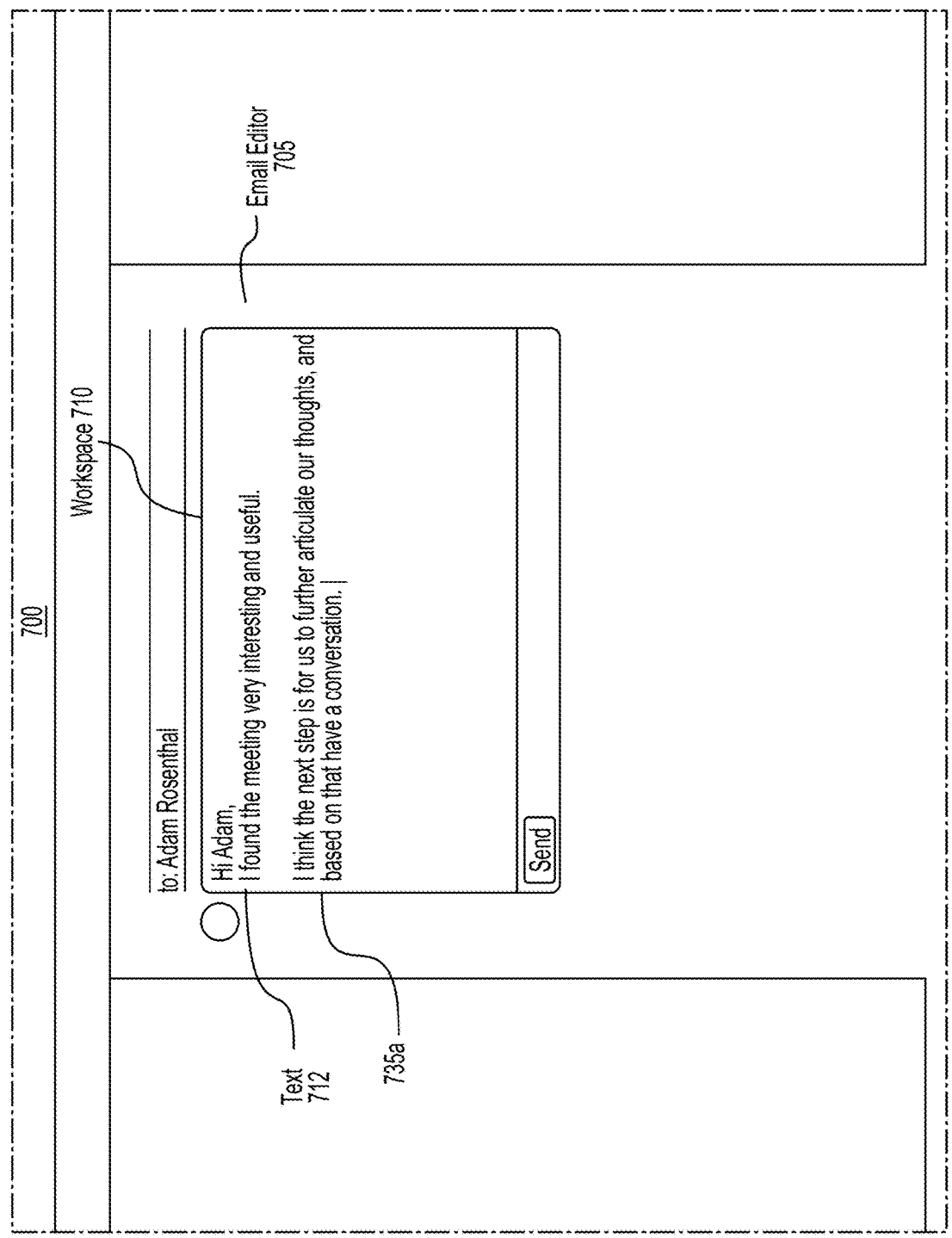

As shown in FIG. 7*e*, the user can select one of the refined text output options, such as text output option 735*a*. As shown in FIG. 7*f*, the writing assistant can automatically insert the selected refined text output option 735*a* into workspace 710, to create at least a portion of the email document.

The disclosed writing assistant may also assist a user in synthesizing multiple text elements or text passages, whether available in one or more preexisting documents or generated, in part, based on user input. In one example of such synthesis of text, and as described above, the disclosed writing assistant may offer text output options for insertion at a selected location within a text. Such text options may serve to bridge or link text that may appear prior to and after the selected insertion point. This feature may be triggered manually, for example, by a user indicating a text insertion location in a document. The text insertion location may be between two sentences, within a sentence, within a phrase, or between two paragraphs in the document. The generated text output options may be generated based solely on preexisting text appearing before and/or after the insertion location or may also be based upon textual input provided by the user.

The text output options generated by the writing assistant for incorporating into a document at a selected insertion location may link together one or more aspects of a first text element that precedes the text insertion location with one or more aspects of a second text element that follows the text insertion location. For example, a text output option may be generated in such a way that it fits into existing text in a coherent and natural way. The text output options can agree with a context associated with the first and/or second text elements and may, in some cases, be generated, in part, upon input provided by a user. For example, the generated text output options can include words, ideas, meanings, and topics conveyed by the user input, but may also agree with contextual elements associated with text preceding or following a designated insertion location in order to effectively bridge or link text surrounding the insertion location. The bridging text may include a complete sentence or, in some cases, may include sentence portions. For example, in some cases, the bridging text may include text to append to a preceding sentence, punctuation to end the augmented preceding sentence, one or more liking sentences, and/or text to append to a beginning of a sentence following the insertion point.

Contextual agreement between the generated text output options and surrounding text may have various meanings. In some cases, an agreement between two or more text elements may refer to grammatical agreement (e.g., the insertion of the generated text output option (the bridging or linking text) does not result in a grammar error relative to the preexisting text). In other cases, agreement between text elements may be achieved by the generated text output options being generated to include in the same or similar style as the text around it (e.g., preexisting text in a document workspace). Another contextual agreement may exist where a generated text output option connects coherently to the text around it once inserted into a document workspace. This form of agreement may include, but is not limited to, the generated text being related to the same general subject as the context and/or events or facts referenced in a generated text output options being consistent with events or facts referenced by preexisting text in a document workspace, for example. The consistency may be relative to a relationship (e.g., temporal, causal, teleological, explanatory, etc.) existing between generated text output options and preexisting text or user input. Contextual agreement may also exist where facts implied by generated text output options are consistent with facts implied by the preexisting text; where temporal and causal relations between facts or events referenced in generated text output options and in the preexisting text are not implausible in light of real-world constraints (e.g., a person can't perform an action after he dies, an event cannot start after it ends, a person cannot be located in two different locations at the same time, etc.). As previously noted, a possible test of contextual agreement between preexisting text and text output options generated by the writing assistant may include whether more than seventy percent of human evaluators are not able to discern that a generated text output option, once inserted into the preexisting text, was generated by a machine rather than by a human. In addition to controlling text style using style control parameters, the disclosed embodiments of the writing assistant may also be configured to apply a default style that is predetermined or learned based on usage. For example, the writing assistant may learn the personal style of the user or the style of a particular organization, in different contexts (e.g., based on internal business documents, external business email, personal email, etc.). In this way, the writing assistant may generate suggested text output options to serve as linking or bridging text in a style that resembles the personal or organizational style in the specific context of the document.

In some cases, the writing assistant may automatically insert bridging/linking text into a document at the insertion location. In some cases, however, the writing assistant may generate and display multiple text output options, and the user may select a text output option, from among the displayed text output options, to be inserted into the document at the text insertion location. In response, the writing assistant may insert the user-selected text output option at the insertion location.

Additionally or alternatively, the writing assistant may be configured to synthesize text for a document based on other types of triggering events. For example, in some cases, the writing assistant may automatically generate bridging or linking text for insertion into a document (or multiple linking or bridging text output options) based on detected movement of one or more text elements from one location of a document to another location. For example, in some cases, a user may select a portion of already drafted text to be moved from a first location in the document to a second location in the document. The user may drag and drop the selected text to the new location by highlighting the text and dragging the text (using a pointer tool, for example) to a new location in the document. Alternatively, the user may use a cut and paste function to cut text from one location in the document and paste that text at a new location in the document. The user may also use a copy and paste function to copy text from an external source and paste that text at a new location in the document. In such cases, pasting of the text in a new location may trigger operation of the writing assistant to automatically generate bridging or linking text relative to the moved text and/or text surrounding the moved text. For example, one or more modifications (word additions, word re-ordering, word omissions, new text, etc.) may be suggested relative to the moved text, and/or relative to text preceding the moved text, relative to text following the moved text. In some cases the suggested bridging or linking text may not involve changes to any of the preceding, following, or moved text, but instead may constitute new text passages to be inserted into the document before or after the moved text.

In some cases, the writing assistant may automatically assist the user with a text move. For example, the writing assistant may include a built-in selection and move function that may be activated by, for example, highlighting and right-clicking on the text. In response to receipt of such input, the writing assistant may automatically identify a new location in the document for the selected text and may offer the user an option for moving the highlighted text to the suggested new location. After the move, or in conjunction with the move, the writing assistant may generate one or more bridging text options associated with the text move in the manner described above.

Thus, in response to any movement of text within a document, the writing assistant may automatically generate bridging or linking text output options recommended to accompany the text movement. For example, when text is transplanted from one document location to another, the transplanted text often may not flow well with text in the vicinity of the new location. For example, the moved text may not agree grammatically or contextually with surrounding text. To connect the moved text in a natural way, the writing assistant (in response to detected text movement within or between documents) may generate and offer one or more text output options for insertion before or after the moved text. In some cases, the one or more suggested text output options may include one or more modifications to the moved text to promote agreement between the moved text and surrounding text at the new location.

The writing assistant may also be configured to synthesize text, whether found in existing text or included in user input, into more complex text passages. For example, in some cases, a user may provide multiple sentences and/or sentence fragments as user input. The writing assistant may organize and/or rearrange the input sentences or sentence fragments into a logical order and may generate sentences, partial sentences, or paragraphs that convey ideas or information included in the input sentences/sentence fragments, and may arrange the generated text according to the determined logical order. The text output generated by the writing assistant may form a stand-alone text block that serve as the first text associated with a document or that may be inserted into existing text in a document (either as a monolithic block or at least partially interleaved with text existing in the document). Where fragments are received as input, the writing assistant may generate sentences based on the fragments and order the generated sentences to convey information associated with the input fragments in a logical order. In any of the examples, sentences generated by the writing assistant based on input fragments may flow together in a coherent way.

In some embodiments, the writing assistant can take several pieces of text, e.g., written by a user, or retrieved from other sources, and automatically synthesize them into one coherent, fluent, and grammatical piece of text with a consistent style. For example, in an electronic workspace associated with a document, the writing assistant may identify a first text passage, including a first plurality of words, and a second text passage, including a second plurality of words. The first or second text passage can be entered into the electronic workspace using a paste function initiated by the user, by the user typing on a keyboard or dictating using a voice recognition application, or by an electronic copy function applied to a source of text residing outside of the electronic workspace. In order to synthesize text from at least the first and second text passages, the writing assistant may change the order of content in the text passages, merge sentences, split sentences, add connections between sentences or other portions of text, modify style elements, etc. Additionally or alternatively, the writing assistant may analyze the first and second text passages to determine information conveyed by the first passage and information conveyed by the second passage and may use this information to automatically generate a third text passage that conveys the information conveyed by the first and second passages. The third text passage may include textual revisions relative to the first and second passages. For example, the third passage may exclude a exclude words from the first or second passages and/or may include words not included in either of the first or second passages. Words from the first and second passages may be, for example, reordered, merged, or substituted for new words in the third passage. The third passage may include new text bridging words. The third passage may change style elements that were included in the first and second passages. In some cases, the writing assistant may automatically insert the synthesized third passage into a document or may present the third passage to a user for approval and or refinement (e.g., using any of the interactive techniques described above).

In addition to a mode in which the writing assistant provides sentence options as a user provides input, the writing assistant can also be used to parse an existing document and offer text replacement options for one or more sub-sentence elements or one or more complete sentences in the document. For example, users can select any span of text in their document and call the writing assistant, which will automatically generate, in real-time, several variations of well-written texts that are paraphrases of the selected text. The user can choose any of the options and insert them to replace the selected text in the textbox or word processor. It should be noted that any or all of the features described elsewhere relative to functionality of the writing assistant may be used in the document parsing embodiments. For example, the writing assistant may generate text output options as potential replacements for text elements automatically identified during the parsing operation. The user can use any of the described controls to change various style parameter values associated with one or more of the generated options. The user can also select a particular text output option for insertion into the document in place of all or part of the identified text. Further, the user can select a generated text output option as a trigger for causing the writing assistant to generate one or more refined text output options based on the selected text output option (an interactive process that can continue until the user is satisfied with one of the generated text output options). Additionally, the user can enter additional input (e.g., one or more words) to help guide the writing assistant in generating text output options (or refined text output options) for potential substitution for text identified during the automatic parse operation.

In some cases, automatically, or after receiving input from a user, the writing assistant can analyze the text of a document. The analysis may proceed in several ways, including sentence by sentence, among other options. The parsing may be performed as part of a global search-and-suggest operation.

Users can choose to view suggestions for sentences in their document that should be rephrased. Suggestions may be presented where the assistant can generate a paraphrase of any sentence in the document which scores better in an automatic evaluation of metrics such as quality, clarity, grammatical correctness, etc.

The contextual paraphrasing feature of the writing assistant may help users refine their text by replacing words and phrases with substitutable alternatives-words or phrases that could substitute for given words or phrases such that the text remains fluent and its meaning is preserved (e.g., substitutable). The technology behind the feature may close major gaps that exist when using lexical knowledge bases such as thesauruses as sources for substitutable alternatives for words or phrases in text. For example, not all synonyms of a given word or phrase are substitutable in a given context, and not all words or phrases that can substitute for original words or phrases in a given context are synonyms. In particular, synonym knowledge bases such as thesauruses are limited in covering relations of semantic similarity between phrases. The contextual paraphrasing feature of the disclosed writing assistant may provide both synonyms and non-synonyms that are substitutable in the given context.

For example, the writing assistant may suggest, autonomously or upon invocation by the user, possible replacements of words or phrases in the text with alternative words or phrases that are substitutable in the particular context (such that after the substitution the text remains fluent and its meaning is substantially preserved). The assistant may also recommend such replacements if they are determined to make the text more fluent.

Replacements may include contextualized dictionary synonyms: words or phrases which are synonymous with the original word or phrase according to a lexical database, and are also found to be substitutable with the original word or phrase in its particular context. For example, in 'I forgot all of the material I learned yesterday', the assistant may suggest replacing the word 'material' with the synonym 'information' (I forgot all of the information I learned yesterday), because the two synonyms are substitutable in this particular context. However, the assistant will not suggest the words 'matter' or 'substance' as substitutions, because while they are synonyms of 'material', they are not substitutable in this particular context. In 'our brains prefer instant to long-term rewards', the assistant may suggest replacing the word 'rewards' with the synonym 'payoffs' (our brains prefer instant to long-term payoffs), but it will not suggest other synonyms such as bonuses or prizes because they are not substitutable in the particular context.

Replacements may also include contextualized possible substitutions that are not lexical synonyms: words or phrases which are not lexical synonyms* of the original word or phrase, but are found to be substitutable with the original word or phrase in a given corpus generally and in its particular context. For example, in 'I enjoy doing Yoga', the assistant may suggest replacing the word 'doing' with the word 'practicing' (I enjoy practicing Yoga) (even though the words 'doing' and 'practicing' are not recognized as synonyms). In 'The pilot was driving the airplane', the assistant may suggest replacing the word 'driving' with the word 'flying' ("The pilot was flying the airplane") even though the words 'driving' and 'flying' are not synonyms. In 'thank you for the good demo', the assistant may suggest replacing the word 'good' with the phrase 'super useful' ("thank you for the super useful demo"), even though they are not synonyms. For the purpose of this description, words or phrases are not lexical synonyms of each other if that relation is not listed in common thesauruses. For example, two words or phrases may be deemed non-synonymous if they are not related as synonyms in the following leading English thesauruses: Oxford Dictionary and Thesaurus, Oxford Thesaurus of English. Longman Thesaurus of American English. Thesaurus of English Idioms. Collins English Dictionary and Thesaurus Set. Webster's American English Thesaurus. Roget's Thesaurus of English Words and Phrases, www.thesaurus.com, www.macmillanthesaurus.com, and/or The Merriam-Webster Thesaurus.

Word or phrase substitution suggestions made by the disclosed writing assistant could be of different lengths from the original words or phrases. For example, the assistant may suggest replacing a word with a phrase, a phrase with a phrase of a different length, or a phrase with a word. For example, the assistant may suggest replacing 'All in all, I think we are ready' with 'Taking everything into account. I think we are ready'. The assistant may suggest replacing 'rights ought to be protected against infringement' with 'rights should be protected against infringement'. The assistant may suggest replacing 'If you work hard you can change things' with 'If you work hard you can make a difference'. Suggestions may sometimes include substitutions that are not synonyms (according to lexical knowledge bases) of the original text but can replace the original text in the particular context while substantially preserving the meaning of the sentence as a whole. The assistant may provide completely different substitution suggestions for the same word or phrase in different contexts or contextual situations.

The technical method may include two components. First, it may include a component that may curate a static list of possible replacements for words or phrases. Second, in a given call to provide paraphrasing suggestions, the writing assistant may include a component that presents only the words or phrases from the static list determined to constitute appropriate substitutes for the original word or phrase in the given context. Words or phrases deemed to not constitute appropriate substitutes in view of the context in which the original word or phrase appears may be omitted from the output results of the paraphrasing tool.

The curation of a static list of substitutable candidates may include collecting lexical synonyms for each word or phrase from a thesaurus or collecting possible corpus-dependent replacements for words or phrases, in the following ways: (1) extracting a plurality of sentences where the word appears in the corpus (e.g., each sentence may provide an example "context" for the word or phrase): (2) for these contexts, a Masked Language Model (e.g., BERT) may be used to mask the word and attempt to predict it; (3) keep X (in the 100 order of magnitude) contexts where the MLM successfully predicts the masked word or phrase according to a threshold; (4) for these disambiguating contexts, we may look at the other words or phrases which are predicted by the MLM; (5) we may ignore known antonyms of the given word or phrase, as they appear a lot in the same context ("I adore old films" or "I can't stand old films") but are not appropriate replacements of each other. These 100 contexts can then be seen as "disambiguating contexts." ones from which it is possible to deduce the correct word. We do this to avoid contexts of the form "I made a cake" for the word "cake"-a context where there are many words that could replace "cake", a negligible amount of which are actual replacement options for "cake". However, a context like "I baked a chocolate cake for the party" is one where "cake" would be a reasonable prediction, and other reasonable predictions are indeed similar ("pic,", "muffin," etc.). The words or phrases which are predicted together with the original word or phrase enough times are considered to be the corpus-dependent contextualized replacement candidates. In summary, the corpus-dependent replacement options may include words or phrases which often appear in similar disambiguating contexts as the original word or phrase, thus sharing some sense with the word.

Upon a given call to suggest replacements for a word or phrase, the system contextualizes the replacement suggestions (i.e., the system may present as text options only the suggestions from the static list that are determined to be substitutable with the original word or phrase in the particular context associated with the original word or phrase or the text in which the original word or phrase appears). To do this, we may use the paragraph written by the user as context which we feed into our MLM, masking the word or phrase that the user wishes to replace. Our MLM gives us a list of predictions for the masked word or phrase, which we then intersect with the static list of replacement suggestions. The intersection of these two lists are meaningful replacements for the given word that are also substitutable with the original word or phrase in the particular context, and these are the suggestions that are provided to the user.

Figure 8A:
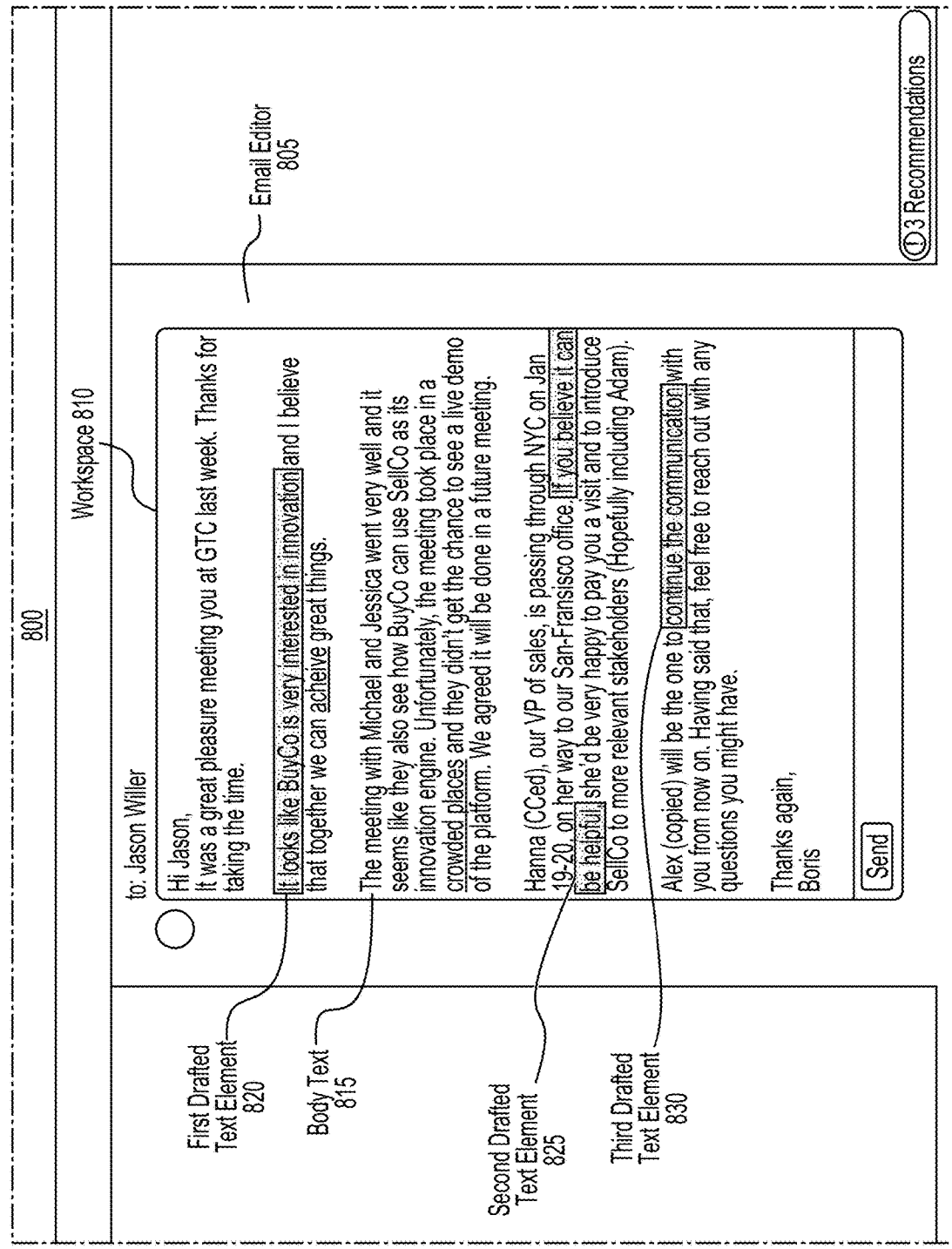
Figure 8B:
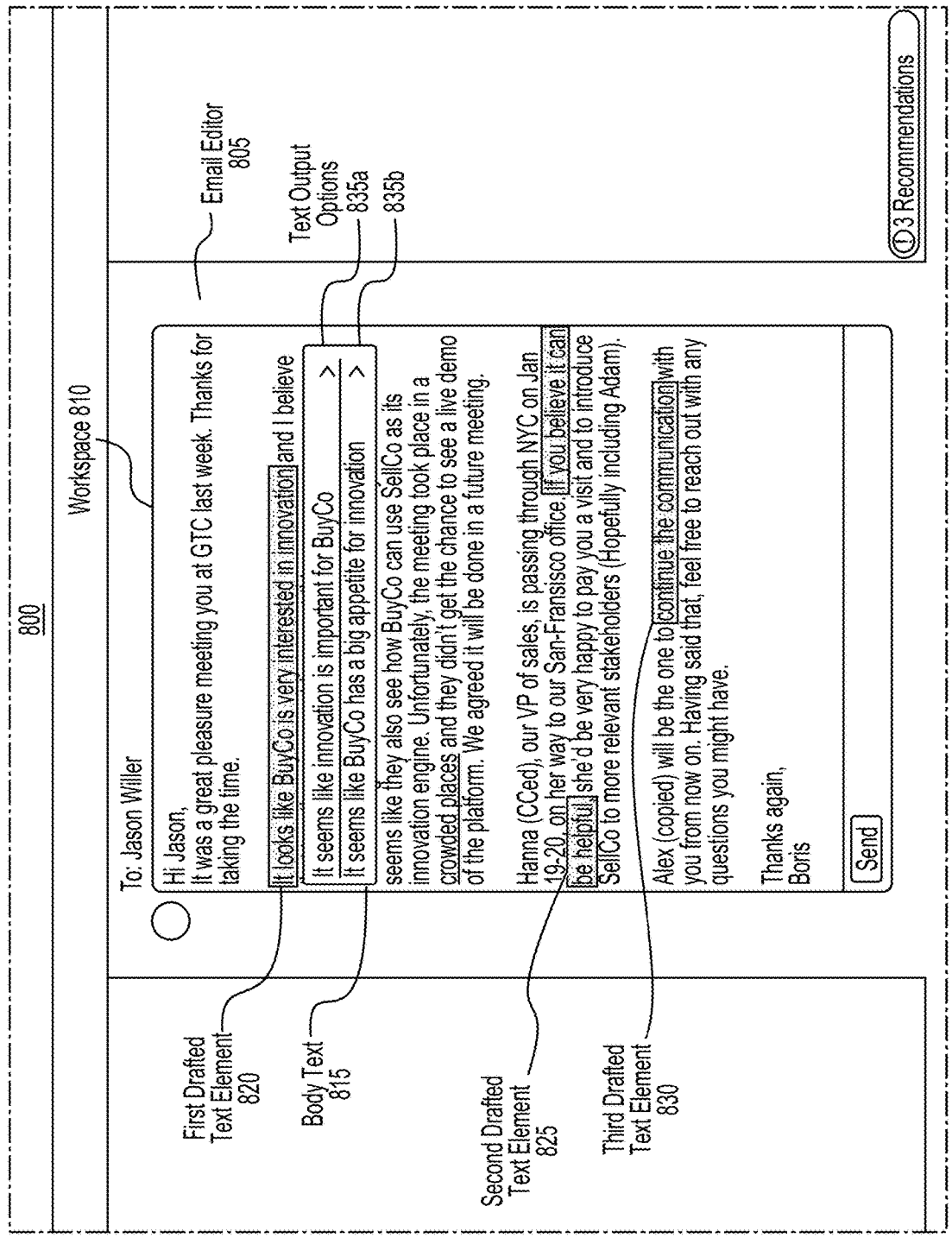
Figure 8C:
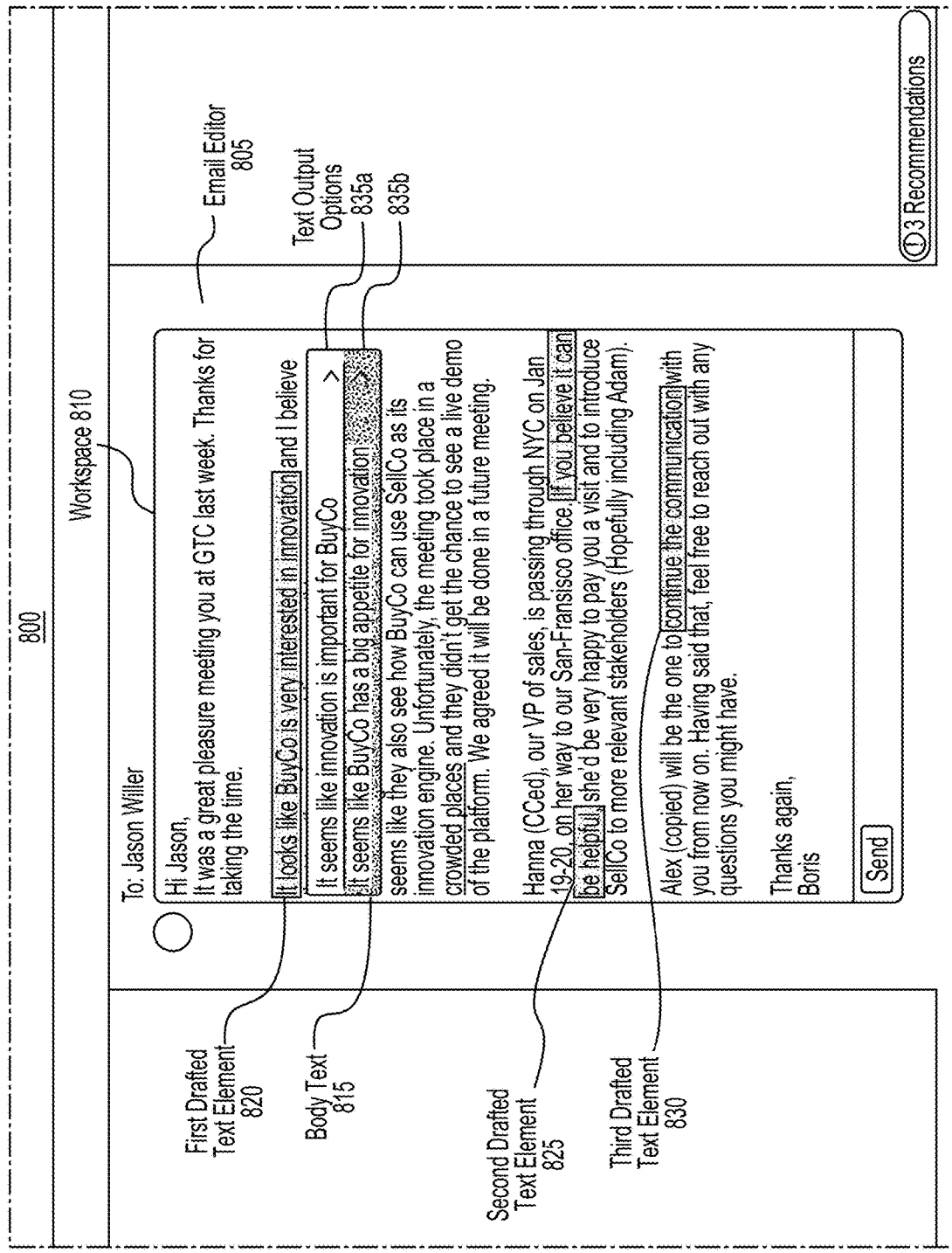

FIGS. 8a-8d illustrate another example of functionality that may be included in the disclosed writing assistant. As shown in FIG. 8a, the writing assistant can identify a first drafted text element 820 in preexisting body text 815 in workspace 810. Drafted element 820 may include portions of two or more sentences or a group of words within a sentence. The writing assistant may automatically highlight the first drafted text element on the display, or a user may manually highlight the element to be edited by the writing assistant. As shown in FIG. 8b, the writing assistant may generate text output options 835a and 835b that re-write the first drafted text element 820, fit the context of the body text 815, can be placed in the same location as the first drafted text element 820, and convey a meaning associated with the first drafted text element. As shown in FIG. 8c, the user can select one of the text output options (e.g., option 835*b*). As shown in FIG. 8*d*, the writing assistant may automatically replace first drafted text element 802 with the selected text output option 835*b*.

The writing assistant can repeat this procedure for multiple drafted text elements, as shown in FIG. 8*a* (e.g., for an automatically or manually identified second drafted text element 825 and third drafted text element 830). In FIG. 8*a*, the second drafted text element 825 and third drafted text element 830 occur after the first drafted text element 820. However, because of the iterative nature of this embodiment, the second or third drafted text elements could have occurred before the first drafted text element. This procedure can continue with third, fourth, fifth, etc., text elements and is not limited to the identified text elements described in this example. Additionally, the described process may be iterative, so that once the writing assistant parses through the document once, even if the user makes suggested changes, the writing assistant may detect additional drafted text elements to be revised, which may be located anywhere within the modified document.

For example, a user may highlight one or more sub-sentence elements or sentences in an existing text, and in response, the writing assistant may generate one or more alternative text options for possible substitution for any of the highlighted text. The text output options may be synonymous or not synonymous with the first drafted text element, or a portion thereof. They can also be generated as a replacement for the first drafted text element, or a portion thereof, or to agree with at least one contextual element associated with text in the document other than the first drafted text element. The text output options can include complete sentences and may include more or fewer words that the drafted text element. In some cases, the generated text output options may include no words from the first drafted text element. The text output options may also include one or more changes relative to the first drafted text element, a change in verb tense, an addition of at least one clause, or a substitution of one or more synonyms relative to the first drafted text element. The changes relative to the first drafted text element can include, for example, a style modification, a grammar modification, or a modification of words included in the first drafted text element.

As in previously described examples, the writing assistant can receive a user selection of a text output option and automatically insert the selected text output option into the document text in place of at least a portion of the first drafted text element. If there are two or more text output options, then the writing assistant can use the selected text output option to further refine and update the text output options (e.g., based on user selection of a GUI control associated with a text output option refinement process).

Various controls may be used to initiate and/or control the presently disclosed writing assistant system. For example, as discussed in the sections above, one or more GUIs associated with the writing assistant may include virtual buttons (e.g., icons, etc.), menus (e.g., drop down menus), among other virtual control elements that a user can interact with to control various aspects of the writing assistant. For example, a virtual control button may be included to initiate operation of the writing assistant. As shown in FIG. 4D, fields and buttons may be included in a GUI to select controllable style parameters and set values for the control parameters. Other buttons may control selection and insertion of a generated text output option into a workspace. Various other virtual buttons, fields, menus, etc. may be included for accomplishing any other tasks associated with the writing assistant.

In some cases, other types of user interface elements may be used to control one or more aspects of the writing assistant. Such interface elements may include, for example, a keyboard 902, as shown in FIG. 9A, a mouse or other pointing device, electronic pencil, etc. that may include one or more controls adapted to enable a user to interact with the writing assistant.

As shown in FIG. 9A, keyboard 902 may include a button 904 ("Assist") that when pressed may initiate the writing assistant. For example, continuing with the example of FIG. 4 above, a user may wish to make a call to the writing assistant at any time while drafting a email or other type of electronic text-based document. Before or after entering text into a workspace 912, a user may initiate the writing assistant functionality by pressing button 904, which may result in a user input field 914 being shown on the GUI display, as shown in FIG. 9B. User input field 914 may include any or all of the functionality described above relative to other user input fields. For example, in response to one or more words being entered into user input field 914, the writing assistant may generate and display one or more text output options associated with the one or more words entered into field 914.

Other controls may be included on keyboard 902. For example, a button 906 ("Style") may be used to cause the writing assistant to display one or more GUI elements associated with selection of available style parameters and associated style parameter values. For example, in some cases, after initiating operation of the writing assistant, a user press button 906 to set values for various style parameters to be used globally by the writing assistant in generating text output options. Style button 906 may also be used to select style parameters to be applied more locally. For example, a user may select/identify a particular text output option generated by the writing assistant (e.g., by highlighting the text output option or clicking on a virtual button, etc. associated with the text output option) and press Style button 906 in order to select and/or change one or more values associated with available style parameters for the particular text output option.

In other cases, a user may highlight text in a document (with or without the writing assistant being active) and press Style button 906 in order to select/set available style parameter values for the highlighted text. For example, a user may highlight a word, phrase, sentence, etc., and then press button 906. In response, the writing assistant may automatically be initiated, and a GUI may be displayed to enable the user to set various style parameter values associated with the highlighted text. In response to a selection/change in style parameter values and/or in response to any suitable user input (e.g., pressing one or more virtual buttons, pressing the Enter key, etc.), the writing assistant may generate one or more text output options generated based on the selected style parameter values as potential substitutes for the highlighted text.

In some examples, pressing button 906 may cause the writing assistant to display a GUI, as shown in FIG. 9C, for enabling a user to select or modify one or more style parameter values. Once displayed, the user may select an available style parameter or enter a value for a particular style parameter using various control elements associated with the GUI. For example, a user may place a cursor within any of input boxes 918*a*-918*d* in order to enter a specific value associated with each style parameter or to activate a drop-down menu of available values, which can then be selected. Alternatively, a user may use +/− buttons 916*a*-916*d* (or any other suitable control) to increase or decrease particular style parameter values. While the GUI of FIG. 9C shows style parameters including Politeness, Formality, Emotion, and Conciseness, any other style parameter value may be used by the described writing assistant. For example, in some cases a Length parameter for controlling a length of generated text output options may be grouped together with other style parameters.

Additionally or alternatively, one or more other control elements may be used for controlling various features of the writing assistant. For example, as shown in FIG. 9A, a keyboard 902 may include directional arrow keys 908 and a scroll wheel 910. Other input devices, such as a mouse or electrical pencil may include similar features such as a rotating wheel, up/down buttons, touch sensitive "buttons", etc. Returning to the style parameter example, keys 908 and wheel 910 may be used to select/change style parameter values. For example, when a style parameter control GUI, such as the GUI shown in FIG. 9c, is made available to a user, the user may select a particular style parameter to update by pressing the left or right directional keys 908 to cycle through the available style parameters. Once the desired style parameter is reached, the user may turn the scroll wheel 910 to change the value of the style parameter (e.g., turning left to decrease the value and turning right to increase the value). After selecting a desired value for a style parameter, the user may press wheel 910 (or hit the Enter key) to update the style parameter with the selected value.

Alternatively, in some cases, directional keys 908 may be omitted, and wheel 910 may be used to control a combination of features. In the style parameter example, a user may turn wheel 910 left or right to cycle through the available style parameters shown in the GUI of FIG. 9C. Once the desired style parameter is reached, a press to wheel 910 may enable a value selection function for the style parameter. In such a case, turning wheel 910 to the left may decrease the value and turning wheel 910 to the right may increase the value. After selecting a desired value for a style parameter, the user may press wheel 910 (or hit the Enter key) to update the style parameter with the selected value.

Keys 908 and wheel 910 (and any other included control elements) may be used to interact with any features and functions associated with the disclosed writing assistant. For example, keys 908 and/or wheel 910 may be used to scroll through available menu items or GUI elements, select various options or parameter values, etc. While the example keyboard 902 shown in FIG. 9A includes controls 904, 906, 908, and 910 included in a dedicated region of the keyboard, any suitable arrangement of the controls may be used. In some cases, buttons 904, 906, and 908 (and wheel 910) may be distributed over different areas of keyboard 902. In some cases, the described functionality associated with buttons 904, 906, and 908 (and wheel 910) may be associated with one or more other buttons of keyboard 902, such as an of the Function keys, directional arrow keys, etc.

One aspect of the writing assistant may include the generation of natural language that may be controlled or influenced by multiple pieces of text that should be naturally and smoothly incorporated into a refined text passage or text output option. There may be various techniques for assembling a writing assistant application consistent with the presently disclosed examples and embodiments. In some cases, the disclosed writing assistant may be assembled and/or configured using machine learning techniques and/or by incorporating one or more trained models. In order to provide the described functionality, the disclosed writing assistant and model(s) on which the writing assistant is based may be trained, for example, to predict text within a document from a large corpus, conditioned upon text appearing before and/or after textual elements. For example, in order to train the model(s), one or more large text corpus documents (such as one or more of several publicly available corpus documents) may be segmented into sentences. Such sentences may be randomly selected and revealed to the model(s) to serve as context for predicting the text in the other sentences within the document (e.g., sentences that appear in close proximity to a randomly selected sentence). The model(s) may thus learn to generate words conditioned on the multiple pieces of text provided by the user and to generate words, sentences, etc. that fit within context established by text in a document.

As one example of training a model on which the disclosed writing assistant may be based (e.g., a training method for autoregressive left-to-right language generators) may include selective masking of various portions of a corpus document. In some cases, such documents used for training may include just a few sentences or paragraphs. In other cases, however, such documents may be thousands or hundreds of thousands of pages long and may offer many examples of word usages, context dependencies, etc. When constructing a training set using a training document, portions of the document may be labeled to obtain two parts (e.g., a prefix and a suffix). In some cases, such splits may be introduced at the end of a sentence within the training document. The prefix begins at the beginning of the training example and ends at the beginning of the suffix, which ends at the end of the example. The training example may then be re-ordered to place the suffix tokens (e.g., text portions) at the beginning of the sequence, followed by a sequence-start token, the prefix tokens and a sequence-end token. With this technique, the model(s) may be trained to predict the tokens of the prefix while being exposed to the tokens of the suffix.

Another aspect of a method for training model(s) associated with the disclosed writing assistant may include training techniques to control a desired length of the generated text, while ensuring that the generated text does not end abruptly, but rather concludes in a natural way. One way to do this is to train the model to predict text within a document from a large corpus conditioned upon the length of ground-truth text in addition to other signals, such as preceding text. For the same autoregressive setting discussed above, this may be accomplished by assigning each token with a positional embedding prior to re-ordering each training example, such that the suffix tokens encode their true position in the full text, and therefore indicate the generation length as well. Optionally, the positional embeddings can be randomly shifted by a small amount. To handle cases where the generation is not conditioned on the suffix, the generation length may be encoded in the positional embeddings of the start-sequence token. The model(s) may thus learn to generate tokens conditioned on the length and position of text that should be generated.

Another aspect of training for the model(s) associated with the disclosed writing assistant may be directed to enabling the model(s) to determine a desired position of generated text within a predetermined text (e.g., such that the generated text is incorporated naturally and smoothly within the preexisting text). Such capabilities may be provided by training a model to predict text within a document from a large corpus conditioned upon the preceding text and additional information regarding the position of the missing text. In addition to the method described in the previous section, after converting the tokens into a continuous representation, a representation denoting the original index of each token may be added. The model(s) may thus learn to generate words conditioned on the length and position of text that should be generated.

Another aspect of model training may be directed to the generation of natural language that conveys a desired meaning. The desired meaning could be indicated by, among other things, the following: natural language phrases or sentences that express the desired meaning or intent for the meaning of the generated text; keywords that express the desired meaning or intent for the meaning of the generated text; any indication of semantic objects and relations that should be included in the generated text, such as entities (e.g. people, locations, events, etc.), relations between events (e.g. temporal, spatial, cause-effect, etc.), relations between entities (e.g. organizational, family, etc.), relations between entities and events (e.g. winner-lottery, seller-purchase, etc.).

Below is a description of a method for training a language model to capture relations between weak semantic signals and surface text. The model may be trained to predict masked spans of text in a large corpus conditioned upon the textual context and upon semantic signals automatically extracted from the masked text, which may simulate signals (in user input or extracted from the input) that indicate the desired meaning of the generated text at prediction time. The model may thus learn to generate text that expresses the meaning indicated by the input at prediction time. Semantic signals that could be extracted from the masked text may include, but are not limited to, surface semantic phenomenon, representations of semantic meaning, and/or heuristics for transforming sentences into broken or simple forms, including but not limited to, Machine Translation into Simple English, insertion of grammatical mistakes, etc. Surface semantic phenomena may include, but are not limited to, a bag of words (e.g., a set of meaning-carrying words that are used in a particular sentence), synonyms, and paraphrases of a particular sentence, that could be generated, among other methods, by back-translation. Representations of semantic meaning may include, but are not limited to, extraction of semantic frames and roles (e.g., [frame: purchase; roles: {buyer: 'john'; seller: 'Tod'; object: 'car'}]); extraction of entities (e.g., persons, events, locations, etc.); extraction of sentiments (e.g. positive, negative); extraction of dependency parsing, extraction of discourse relations between phrases (e.g., contrast, example, elaboration, etc.); word senses; word embeddings; extraction of speech act illocution or intent (e.g. 'propose meeting', 'agree to suggestion', etc.); and learned latent semantic representation.

One level of semantic meaning that may be considered is the clause level. In use, it would be desirable for the model(s) of the writing assistant to generate text conveying the same or similar meaning as the user input (or selected, preexisting text). In order to accomplish this, a semantic representation may need to capture the meaning of the user input clause-by-clause and to capture the relation between the clauses (e.g., equality, entailment, description, etc.). In addition, semantic equality can be provided at a higher resolution. For example, it may be required that the properties of the entities will be maintained between the user input and the generated text, e.g. the gender or age of the subject. In order to accomplish this, the semantic representation of the entities for the properties to be conserve may be queried.

In some examples, learning to condition on a semantic representation may be accomplished in two steps: supervised and unsupervised. In the supervised step, a dataset of annotated examples may be leveraged to train a model ("Semantic Reader") on a few Natural Language Understanding tasks which capture semantics (such as Semantic Role Labeling, Semantic Proto-Roles, Coreference, Entity Linking, etc). Once trained, the Semantic Reader may be applied to a large corpus producing predictions for the different semantic tasks. In the unsupervised step, another model (e.g., a "Semantic Generator") may be trained to generate masked text conditioned on the output of the Semantic Reader.

In addition, the Semantic Reader can be applied again to the output of the Semantic Generator for training examples in the unsupervised step, and the Semantic Generator may be trained to minimize reconstruction loss on the output of the Semantic Reader. Optionally, the Semantic Reader weights may be updated as well.

Another training method for the disclosed writing assistant models may include determining the desired meaning of generated text. Such a determination may be accomplished by using sampling methods from the language model guided by certain constraints and derived from the following metrics (among others): diversity of vocabulary, diversity of syntactic structures, the semantic similarity to the input, style, coherence, and fluency. Text generation based on a language model may require sampling from a provided probability distribution. The desired output should be likely and must rank high in terms of the above metrics. Finding an desired solution may be intractable for any reasonable generation length, so a sub-optimal algorithm may be employed that can provide an approximation. An automatic evaluation of the abovementioned metrics may be used to guide the sampling from the language model.

Another method for determining the desired meaning of generated text may involve training the language model with reinforcement learning where the model's reward is derived from any of the abovementioned metrics, for example. While training a model to predict a masked word, the model trained up to this step may be used to generate text as well. Errors from the text generation step may be propagated into the model trained to predict a masked word.

Another method of for training the model(s) of the writing assistant to determine or generate a desired meaning of generated text may include enriching text generation by using external knowledge bases. Such external knowledge bases may relate to (among other things): geographical KB—spatial relations; organizational KB such as CRM; demographic kB; ontologies; physical properties KB; Wikipedia; historical knowledge; and event graphs. Such external knowledge bases may be used, for example, to ensure semantic coherence of the generated text. For example, an agent could be in Paris and France at the same time but not in Paris and England. For this use, both in the language model training phase and in the text generation phase, we can verify that the generated text doesn't contradict the external knowledge (i.e., for text generated we will extract facts and verify that they are aligned with information from the external knowledge base). Additionally, the external knowledge bases can be used to improve the quality of the generated text by augmenting it with information from an external knowledge base or appropriately replacing certain information or object references. For example, when the generated text should refer to an entity that exists in the external knowledge base, we can replace the user's reference with an alternative reference to the same entity or add information on that entity found in the knowledge base.

Another method for generating text with the desired meaning may include using a semantically infused language model for text generation. For example, a neural network-based language model may be trained to contain contextual relations between abstract semantic features in text, in contrast with prior systems, where models can only be trained to learn contextual relations between surface-level words. For example, the presently disclosed writing assistant may include model(s) trained to learn contextual relations between words and word senses and between words and the properties of the abstract concepts invoked by the text. To achieve this, a model may be trained to predict the semantic features of masked tokens in text conditioned by their surrounding context. Using a semantically infused language model to generate text may improve its semantic coherence and plausibility. Such methods may allow us to endow the language model with a semantic signal given unlabeled text only, which may result in an ability to harness information from massive amounts of raw text.

The disclosed system and method may allow for endowment of a language model with a semantic signal given unlabeled text only, thus enjoying the ability to harness information from massive amounts of raw text. The disclosed trained language models, infused with such semantic knowledge gained from pretraining, may achieve enhanced performance on natural language tasks with merely a fraction of parameters compared with other systems. Types of semantic signals that could be infused into language models using the following described technology may include: using the method described above to learn contextual relations between surface-level words and additional semantic features, including word senses; real-world properties of concepts invoked by the text (e.g. size, color, etc.); entity types (e.g., organization, person, animal, feeling, etc.); entity links (what different words refer to the same entity described in the text); the sentiment (e.g. positive, negative, neutral); discourse relations between phrases (e.g. contrast, example, elaboration, etc.); and multiword expressions (the sense of multiple words taken together). Word senses can include a system and method for the generation of a semantically infused language model that captures contextual relations between words and word senses and supersenses. The model may be trained to predict word senses of masked tokens in a corpus given the textual context. The 'correct' word senses may be derived from an ontology or a lexical knowledge base such as Wordnet.

An additional component of the system and method may include enforcing prediction coherency. Having extended the pretraining setting to a multitask one, where semantic information is predicted in parallel to surface-level word information, we developed a global consistency constraint validation procedure. We effectively enforce the predictions of the different semantic tasks to be consistent with one another. For example, an independently predicted pair of word and sense for a masked position should be plausible (e.g., the predicted word could have that sense, a predicted part-of-speech label should be consistent with an independently predicted parse tree structure, etc.). The process may increase the accuracy of semantic information prediction.

Additionally, the system and method may allow for infusing a language model with semantic features through a model's loss function. We formulate the loss function when training a masked language model such that the model is rewarded to some extent for predicting hypernyms and synonyms of the masked words, and not merely for precisely predicting the word. Specifically, our loss function is "forgiving" in an exponentially decaying manner as a function of the distance of the predicted words from the masked word in the WordNet graph. For example, it punishes predictions of WordNet synonyms, hypernyms, or hyponyms of the masked words much less than it punishes predictions of unrelated words.

Additionally, the system and method may allow for saving time and money by using micro BERT models, and then scaling up. We developed a gradual pretraining strategy where various hyperparameter ablations are performed on significantly smaller and cheaper models, and only then leading experiments are performed on common expensive models.

Automated (or semi-automated) text generation holds great promise for society, by helping people write better and more productively. In order to unlock this potential, however, text generators need to evolve to become more controllable. Impressive as it is, text generated by prior systems is far from perfect. In particular, the prior models' output tends to diverge from the human-written input as the generation progresses. Sooner or later, the prior generators go off-topic, lose coherence, or contradict the preceding text. Such behaviors are a major problem for a user trying to convey a message or express an idea.

There is no natural way for a user to restrict this tendency to diverge in the outputs of prior language generation systems. This divergence, for example, is inherent to their left-to-right, extrapolating method of operation. Metaphorically speaking, the user can give these models a starting point and a vague sense of direction, but not a final destination, let alone a route to follow.

The disclosed writing assistant is designed to enable a user to effectively control the "route" used by the writing assistant in generating its text output options. And as described in the sections above, if a user does not feel that the system has reached the intended "final destination" by offering a text output option that conveys an intended meaning, information, etc., the user can provide additional or different directions about the route until the writing assistant metaphorically reaches the intended final destination. Such control is not offered by prior language generation systems.

To provide this type of controllability, the disclosed writing assistant may be based upon an interpolating language model. That is, given a human-written beginning (prefix) and human-written ending (suffix), the writing assistant can generate synthetic text (body) that fits between them with a desired length. Thus, the writing assistant may offer at least two new "knobs" for tuning its output: the suffix, for keeping the generated text on topic, and the length, for controlling the amount of text inserted between the prefix and the suffix.

In some cases, the writing assistant may be trained relative to publicly available text. For example, one or more models associated with the disclosed writing assistant may be trained on OpenWebText, a freely-available clone of OpenAI's WebText dataset. In order to train the model to generate text conditioned on a prefix and a suffix, the order of the text may be manipulated in different training examples.

What follows is a more technical description of an exemplary implementation of aspects of the writing assistant. For example, in some cases, the disclosed writing assistant may be based on a model with 24 layers with 16 attention heads and 1024-dimensional hidden states, which amounts to 345 million parameters. The same vocabulary and BPE tokenization scheme may be employed. One goal may include providing a generative model of natural language allowing for sampling according to the conditional distribution:

$$P(x_{p+1}, \ldots, x_{n-s} | x_1, \ldots, x_p; x_{n-s+1}, \ldots, x_n)$$

where $(x_i)_{i=1}^n$ is a sequence of tokens, $(x_i)_{i=1}^p$ is the prefix, $(x_i)_{i=n-s+1}^n$ is the suffix and $(x_i)_{i=p+1}^{n-s}$ is the body. For comparison, certain prior systems sample from $P(x_{p+1}, \ldots, x_n | x_1, \ldots, x_p)$, conditioned only on the prefix tokens, with some also sampling on additional metadata fields.

The disclosed writing assistant may adopt an autoregressive formulation of language modeling, decomposing the probability of a sequence $(x_i)_{i=1}^n$ into a product of the conditional probabilities of generating each token given the previous tokens $$P(x_{p+1}, \ldots, x_{n-s} | x_1, \ldots, x_p; x_{n-s+1}, \ldots, x_n) = \prod_{i=p+1}^{n-s} P(x_i | x_1, \ldots, x_{i-1}; x_{n-s+1}, \ldots, x_n)$$

To condition the output on the suffix, the input sequences can be arranged such that the first s tokens are the suffix, followed by the prefix, separated by <begin> and <end> tokens. In order for the model to properly "stitch" the generated text to the suffix, the starting position of the suffix may be indicated, thereby dictating the sequence length. This can be done by assigning the suffix (prefix) tokens with positional embeddings corresponding to their original positions at the end (beginning) of the sequence, rather than their position in the rearranged sequence.

The model may be trained to minimize the cross-entropy loss when predicting the input sequence. In some cases, backpropagating the loss on the suffix tokens, corresponding to the first s tokens in the input sequence, may be avoided. The training sequences may be generated as follows:

1. For each document in OpenWebText, we can sample $[N/n_{max}]$ sequences of consecutive sentences (Sentok may be used, in some cases, for sentence segmentation), where N is the total document length. The sampled sequence length n, including two special tokens (<begin> and <end>), is uniformly distributed in $[n_{min}, n_{max}]$. We set the minimum and maximum sequence lengths as $n_{min}=32$ and $n_{max}=512$ tokens respectively.
2. For each sequence, we can extract a suffix containing m sentences from the end, such that m is uniformly distributed in $[1, \min(M-1, m_{max})]$, where M is the total number of sentences in the sequence. Thus, at least one sentence is reserved for the prefix. We trained with at most $m_{max}=3$ sentences in the suffix. To train the model to be able to predict given only a prefix, we didn't extract a suffix for 10% of the sequences.
3. The final input sequence may be composed by concatenating the extracted suffix tokens, a <begin> token, the prefix tokens and finally an <end> token.
4. The first s+1 tokens, corresponding to the entire suffix and the <begin> token, may be assigned positions n−s+δ to n+δ (inclusive). The remaining tokens, corresponding to the prefix and the <end> token, are assigned positions 1 to n−s−1 (inclusive). The random shift δ is introduced to soften the length constraint, effectively allowing the model some leeway at inference time. We sampled the position shift uniformly in [0.0.1×n].

The model may be refined using Adafactor and certain hyperparameters. For example, a learning rate schedule may be used with a linear warmup over the first 10,000 steps to a maximum learning rate of $3 \times 10^{-4}$ followed by linear decay over the remaining steps. The model may be trained for 800,000 steps with a batch size of 512, corresponding to approximately 20 epochs over OpenWebText. Training, in some examples, took roughly 3 days on a 128-core TPUv3 pod. At the end of training, the loss on both the training set and a held-out set continued to decrease, so further training may improve the model's performance.

As additional context for the disclosed writing assistant and its capabilities, the ability to learn from large unlabeled corpora has allowed neural language models to advance the frontier in natural language understanding. However, existing self-supervision techniques operate at the word form level, which serves as a surrogate for the underlying semantic content. The disclosed writing assistant is based on techniques employing weak-supervision directly at the word sense level. In some cases, a model on which the writing assistant may be based may be referred to as SenseBERT, which is a model pre-trained to predict not only the masked words (as described above) but also their WordNet supersenses. As a result, the disclosed writing assistant may be based on a lexicalsemantic level language model, without the use of human annotation. SenseBERT may achieve significantly improved lexical understanding, as compared to prior systems.

One starting point for the disclosed model and its training may include the use of self-supervision, which may allow the network to learn from massive amounts of unannotated text. As noted above, one self-supervision strategy may include masking some of the words in an input sentence and then training the model to predict them given their context. Other strategies for self-supervised learning may include, for example, unidirectional, permutational, or word insertion-based methods.

The disclosed writing assistant may be based on models that apply weak-supervision directly on the level of a word's meaning. By infusing word-sense information into a pre-training signal (e.g., a BERT pre-training signal), the model may be explicitly exposed to lexical semantics when learning from a large unannotated corpus. The resultant sense-informed model may be referred to as Sense-BERT. For example, a masked-word sense prediction task may be added as an auxiliary task in BERTs pretraining. Thereby, jointly with a standard wordform level language model, a semantic level language model may be trained that predicts the missing word's meaning. This method does not require sense annotated data. Self-supervised learning from unannotated text may be facilitated by using WordNet, an expert constructed inventory of word senses, as weak supervision.

The disclosed models and their training may focus on a coarse-grained variant of a word's sense, referred to as its WordNet supersense, in order to mitigate an identified brittleness of fine-grained word-sense systems, caused by arbitrary sense granularity, blurriness, and general subjectiveness. Word-Net lexicographers organize all word senses into 45 supersense categories, 26 of which are for nouns, 15 for verbs, 3 for adjectives and 1 for adverbs. Disambiguating a word's supersense has been studied as a fundamental lexical categorization task. In the disclosed embodiments, the masked word's allowed supersenses list from WordNet may be employed as a set of possible labels for the sense prediction task. The labeling of words with a single supersense (e.g., 'sword' has only the supersense noun.artifact) is straightforward. The network may be trained to predict this supersense given the masked word's context. As for words with multiple supersenses (e.g., 'bass' can be: noun, food; noun, animal; noun, artifact; noun, person; etc.), the model may be trained to predict any of these senses, leading to a simple yet effective soft-labeling scheme.

Compared to prior systems, the disclosed models on which the writing assistant may be based may significantly outperform those systems by a large margin on a supersense variant of the SemEval Word Sense Disambiguation (WSD) data set standardized in Raganato et al. (2017). Notably, SenseBERT receives competitive results on this task without fine tuning; i.e., when training a linear classifier over the pretrained embeddings, which serves as a testament for its self-acquisition of lexical semantics.

Furthermore, SenseBERTBASE surpasses prior systems in the Word in Context (WiC) task (Pilehvar and Camacho-Collados, 2019) from the SuperGLUE benchmark (Wang et al., 2019), which directly depends on word-supersense awareness.

In some examples, a single SenseBERTLARGE model has achieved state of the art performance on WiC with a score of 72.14, improving the score of certain prior systems by 2.5 points. For example, certain BERT models trained with current word-level self-supervision, burdened with the implicit task of disambiguating word meanings, often fails to grasp lexical semantics, exhibiting high supersense misclassification rates. The weakly-supervised word-sense signal used in the presently disclosed models, for example, may allow SenseBERT to significantly bridge this gap.

Moreover, SenseBERT may exhibit an improvement in lexical semantics ability (reflected by the Word in Context task score) even when compared to models with WordNet infused linguistic knowledge.

Further details regarding a method for integrating word sense-information within SenseBERT's pre-training is described. The input to BERT is a sequence of words $\{x^j \in \{0,1\}^{D_W}\}_{j=1}^N$ where 15% of the words are replaced by a [MASK] token. Here N is the input sentence length, $D_w$ is the word vocabulary size and $x^{(j)}$ is a 1-hot vector corresponding to the $j^{th}$ input word. For every masked word, the output of the pretraining task is a word-score vector $y^{words} \in \mathbb{R}^{D_w}$ containing the per-word score. BERT's architecture can be decomposed to (1) an internal Transformer encoder architecture wrapped by (2) an external mapping to the word vocabulary space denoted by W.

The Transformer encoder operates over a sequence of word embeddings $v_{input}^{(j)} \in \mathbb{R}^d$, where d is the Transformer encoder's hidden dimension. These are passed through multiple attention-based Transformer layers, producing a new sequence of contextualized embeddings at each layer. The Transformer encoder output is the final sequence of contextualized word embeddings $v_{input}^{(j)} \in \mathbb{R}^d$.

The external mapping $W \in \mathbb{R}^{d \times D_w}$ is effectively a translation between the external word vocabulary dimension and the internal Transformer dimension. Original words in the input sentence are translated into the Transformer block by applying this mapping (and adding positional encoding $p^{(j)} \in \mathbb{R}^d$):

$$v_{input}^{(j)} W x^{(j)} + p^{(j)} \quad (1)$$

The word-score vector for a masked word at position j is extracted from the Transformer encoder output by applying the transpose: $y^{words} = W^T v_{input}^{(j)}$. The use of the same matrix W as the mapping in and out of the transformer encoder space may be referred to as weight tying.

Given a masked word in position j, BERT's original masked-word prediction pre-training task is to have the softmax of the word-score vector $y^{words} = W^T v_{input}^{(j)}$ get as close as possible to a 1-hot vector corresponding to the masked word. This may be done by minimizing the cross-entropy loss between the softmax of the word-score vector and a 1-hot vector corresponding to the masked word:

$$\mathcal{L}_{LM} = -\log p(w|\text{context}), \quad (2)$$

where w is the masked word, the context is composed of the rest of the input sequence, and the probability is computed by:

$$p(w|\text{context}) = \frac{\exp(y_w^{words})}{2a}, \quad (3)$$

where $y_w^{words}$ denotes the $w^{th}$ entry of the word-score vector.

Jointly with the above procedure for training the word-level language model of SenseBERT, the model may be trained to predict the supersense of every masked word, thereby training a semantic-level language model. This may be done by adding a parallel external mapping to the words supersenses space, denoted $S \in \mathbb{R}^{d \times D_s}$, where Ds=45 is the size of supersenses vocabulary. Ideally, the objective is to have the softmax of the sense-score vector $y^{senses} \in \mathbb{R}^{D_s}$: $=S^T v_{output}^{(j)}$ get as close as possible to a 1-hot vector corresponding to the word's supersense in the given context.

For each word w in our vocabulary, the WordNet word-sense inventory may be employed for constructing A(w), the set of its "allowed" supersenses. Specifically, we apply a WordNet Lemmatizer on w, extract the different synsets that are mapped to the lemmatized word in WordNet, and define A(w) as the union of supersenses coupled to each of these synsets. As exceptions, we set A(w)=Ø for the following: (i) short words (up to 3 characters), because they are often treated as abbreviations, (ii) stop words, as WordNet does not contain their main synset (e.g. 'he' is either the element helium or the hebrew language according to WordNet), and (iii) tokens that represent part-of-word.

Given the above construction, a combination of two loss terms may be employed for the supersense-level language model. The following allowed-senses term may maximize the probability that the predicted sense is in the set of allowed supersenses of the masked word w:

$$\mathcal{L}_{SLM}^{allowed} = -\log p\left(s \in A(w)|\text{context}\right) = -\log \sum_{s \in A(w)} p(s|\text{context}), \quad (4)$$

where the probability for a supersense s is given by $$p(s|\text{context}) = \frac{\exp(y_s^{senses})}{\sum_{s'} \exp(y_{s'}^{senses})}. \quad (5)$$

The soft-labeling scheme given above, which treats all the allowed supersenses of the masked word equally, may introduce noise to the supersense labels. We expect that encountering many contexts in a sufficiently large corpus may reinforce the correct labels whereas the signal of incorrect labels may diminish. To illustrate this, consider the following examples for the food context:
1. "This bass is delicious"
   (supersenses: noun.food, noun.artifact, etc.)
2. "This chocolate is delicious"
   (supersenses: noun.food, noun.attribute, etc.)
3. "This pickle is delicious"
   (supersenses: noun.food, noun.state, etc.)

Masking the marked word in each of the examples results in three identical input sequences, each with a different sets of labels. The ground truth label, noun.food, appears in all cases, so that its probability in contexts indicating food is increased whereas the signals supporting other labels cancel out.

While $\mathcal{L}_{SLM}^{allowed}$ pushes the network in the right direction, minimizing this loss could result in the network becoming overconfident in predicting a strict subset of the allowed senses for a given word, i.e., a collapse of the prediction distribution. This is especially acute in the early stages of the training procedure, when the network could converge to the noisy signal of the soft-labeling scheme.

To mitigate this issue, the following regularization term may be added to the loss, which may encourage a uniform prediction distribution over the allowed supersenses:

$$\mathcal{L}_{SLM}^{reg} = -\sum_{s \in A(w)} \frac{1}{|A(w)|} \log p(s|\text{context}), \quad (6)$$

i.e., a cross-entropy loss with a uniform distribution over the allowed supersenses.

Overall, jointly with the regular word level language model trained with the loss in eq. 2, the semantic level language model may be trained with a combined loss of the form:

$$\mathcal{L}_{SLM} = \mathcal{L}_{SLM}^{allowed} + \mathcal{L}_{SLM}^{reg}. \quad (7)$$

Though in principle two different matrices could have been used for converting in and out of the Transformer encoder, the BERT architecture employs the same mapping W. This approach, referred to as weight tying, has been shown to yield theoretical and practical benefits. Intuitively, constructing the Transformer encoder's input embeddings from the same mapping with which the scores are computed improves their quality as it makes the input more sensitive to the training signal.

Following this approach, and inserting our newly proposed semantic-level language model matrix S in the input in addition to W, as shown in FIG. 10B (contrast with FIG. 10A), such that the input vector to the Transformer encoder (eq. 1) is modified to obey:

$$v_{input}^{(j)} = (W + SM)x^{(j)} + p^{(j)}, \quad (8)$$

where $p^{(j)}$ are the regular positional embeddings as used in BERT, and $M \in \mathbb{R}^{D_s \times D_w}$ is a static 0/1 matrix converting between words and their allowed WordNet supersenses $A(w)$.

The above strategy for constructing $v_{input}^{(j)}$ may allow for the semantic level vectors in S to come into play and shape the input embeddings even for words which are rarely observed in the training corpus. For such a word, the corresponding row in W is potentially less informative, because due to the low word frequency the model did not have sufficient chance to adequately learn it. However, since the model learns a representation of its supersense, the corresponding row in S is informative of the semantic category of the word. Therefore, the input embedding in eq. 8 can potentially help the model to elicit meaningful information even when the masked word is rare, allowing for better exploitation of the training corpus.

At the pre-processing stage, when an out-of vocabulary (OOV) word is encountered in the corpus, it may be divided into several in-vocabulary subword tokens. For the self-supervised word prediction task (eq. 2), masked sub-word tokens may be straightforwardly predicted. In contrast, word-sense supervision may be meaningful only at the word level. We compare two alternatives for dealing with tokenized OOV words for the supersense prediction task (eq. 7).

In the first alternative, called 60K vocabulary, we augment BERT's original 30K-token vocabulary (which roughly contained the most frequent words) with an additional 30K new words, chosen according to their frequency in Wikipedia. This vocabulary increase may allow us to see more of the corpus as whole words for which supersense prediction is a meaningful operation. Additionally, in accordance with the discussion above, our sense-aware input embedding mechanism can help the model extract more information from lower frequency words. For the cases where a sub-word token is chosen for masking, we may only propagate the regular word level loss and may not train the supersense prediction task.

The above addition to the vocabulary may result in an increase of approximately 23 M parameters over the 110 M parameters of BERTBASE and an increase of approximately 30 M parameters over the 340 M parameters of BERT$_{LARGE}$ (due to different embedding dimensions d=768 and d=1024, respectively).

It is worth noting that similar vocabulary sizes in leading models have not resulted in increased sense awareness. As a second alternative, referred to as average embedding, we may employ BERT's regular 30K-token vocabulary and employ a whole-word-masking strategy. Accordingly, all of the tokens of a tokenized OOV word may be masked together. In this case, the supersense prediction task may be trained to predict the WordNet supersenses of this word from the average of the output embeddings at the location of the masked sub-words tokens.

Words that have a single supersense may serve as good anchors for obtaining an unambiguous semantic signal. These words teach the model to accurately map contexts to supersenses, such that it is then able to make correct context-based predictions even when a masked word has several supersenses. We therefore favor such words in the masking strategy, choosing, for example, 50% of the single-supersensed words in each input sequence to be masked. We may stop if 40% of the overall 15% masking budget is filled with single-supersensed words (which rarely happens), and in any case the choice of the remaining words to complete this budget may be randomized. As in the original BERT, 1 out of 10 words chosen for masking may be shown to the model as themselves rather than being replaced with [MASK].

A SenseBERT pretrained as described above may have an immediate non-trivial bi-product. The pre-trained mapping to the supersenses space, denoted S, may act as an additional head predicting a word's supersense given context, as shown in FIG. 10.

A semantic-level language model may be attained that predicts the missing word's meaning jointly with the standard word-form level language model. The resultant mapping is shown in FIGS. 11A-B, which illustrate a UMAP dimensionality reduction of the rows of S, which corresponds to the different supersenses. A clustering according to the supersense part of speech is apparent in FIG. 11A. Finer-grained semantic clusters may further be identified, as shown for example in FIG. 11B.

SenseBERT's semantic language model may allow prediction of a distribution over supersenses rather than over words in a masked position. FIGS. 12A-B show the supersense probabilities assigned by SenseBERT in several contexts, demonstrating the model's ability to assign semantically meaningful categories to the masked position.

Finally, we demonstrate that SenseBERT enjoys an ability to view raw text at a lexical semantic level. FIG. 12B shows example sentences and their supersense predictions by the pretrained model. Where a vanilla BERT would see only the words of the sentence "Dan cooked a bass on the grill", SenseBERT would also have access to the supersense abstraction: "[Person] [created] [food] on the [artifact]". This sense-level perspective can help the model extract more knowledge from every training example, and to generalize semantically similar notions which do not share the same phrasing.

The disclosed models and writing assistant have been shown to offer significant performance improvements over existing systems (e.g., based on various standardized benchmark tests). Such performance increases may be achieved, for example, by the introduction of lexical semantic information into a neural language model's pre-training objective. This may result in a boosted word-level semantic awareness of the resultant model, referred to herein as SenseBERT, which considerably outperforms a vanilla BERT on a SemEval based Supersense Disambiguation task and has achieved state of the art results on the Word in Context task. Notably, this improvement was obtained without human annotation, but rather by harnessing an external linguistic knowledge source. This work indicates that semantic signals extending beyond the lexical level can be similarly introduced at the pre-training stage, allowing the network to elicit further insight without human supervision.

The systems and methods described above are presented in no particular order and can performed in any order and combination. For example, various embodiments of the writing assistant may include a combination of all of the features and functionality described above, or in some cases, the writing assistant may offer any subset of described features and/or functionality.

The above-described systems and method can be executed by computer program instructions that may also be stored in a computer readable medium that can direct a computer, other programmable data processing apparatus, or other devices to function in a particular manner, such that the instructions stored in the computer readable medium produce instructions which when implemented cause the writing assistant to perform the above-described methods.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the above-described methods.

It will be understood from the foregoing description that modifications and changes may be made in various embodiments of the present invention without departing from the invention described in this specification. The descriptions in this specification are for purposes of illustration only and are not to be construed in a limiting sense. The scope of the present invention is limited only by the language of the following claims.

What is claimed is:

1. A non-transitory computer readable medium including instructions that when executed by one or more processing devices cause the one or more processing devices to perform a method including:
   initiating a writing assistant application in response to input received from a user, the writing assistant application being associated with at least one graphical user interface element shown on a display;
   receiving a first user input, wherein the first user input includes a collection of two or more words that convey at least one idea;
   automatically constructing, using one or more trained models providing a natural language generation function, a first complete sentence option that expresses the at least one idea;
   causing the first complete sentence option to be shown to the user via the display; and
   receiving a second user input, and in response to the received second input, causing a second complete sentence option, different from the first complete sentence option, to be shown on the display.

2. The non-transitory computer readable medium of claim 1, wherein the method further includes:
   receiving a user selection of the second complete sentence option and automatically inserting the second complete sentence option into an electronic document.

3. The non-transitory computer readable medium of claim 1, wherein the collection of two or more words include a sentence fragment.

4. The non-transitory computer readable medium of claim 1, wherein the collection of two or more words include a complete sentence.

5. The non-transitory computer readable medium of claim 1, wherein automatically constructing the first complete sentence option includes generating a plurality of first complete sentence options including the first complete sentence option.

6. The non-transitory computer readable medium of claim 5, wherein the second user input includes a selection of the first complete sentence option from among the plurality of first complete sentence options.

7. The non-transitory computer readable medium of claim 6, wherein the second complete sentence option is a refined version of the first complete sentence option.

8. The non-transitory computer readable medium of claim 1, wherein method further includes causing a virtual button to be shown via the display in association with the first complete sentence option and wherein the second user input includes a selection of the virtual button.

9. A computer-implemented method for generating multiple text output options, the method including:
   initiating a writing assistant application in response to input received from a user, the writing assistant application being associated with at least one graphical user interface element shown on a display;

receiving a first user input, wherein the first user input includes a collection of two or more words that convey at least one idea;

automatically constructing, using one or more trained models providing a natural language generation function, a first complete sentence option that expresses the at least one idea;

causing the first complete sentence option to be shown to the user via the display; and receiving a second user input, and in response to the received second input, causing a second complete sentence option, different from the first complete sentence option, to be shown on the display.

10. The method of claim 9, further including:

receiving a user selection of the second complete sentence option and automatically inserting the second complete sentence option into an electronic document.

11. The method of claim 9, wherein the collection of two or more words include a sentence fragment.

12. The method of claim 9, wherein the collection of two or more words include a complete sentence.

13. The method of claim 9, wherein automatically constructing the first complete sentence option includes generating a plurality of first complete sentence options including the first complete sentence option.

14. The method of claim 13, wherein the second user input includes a selection of the first complete sentence option from among the plurality of first complete sentence options.

15. The method of claim 14, wherein the second complete sentence option is a refined version of the first complete sentence option.

16. The method of claim 9, wherein method further includes causing a virtual button to be shown via the display in association with the first complete sentence option and wherein the second user input includes a selection of the virtual button.

* * * * *